(12) United States Patent
Williams et al.

(10) Patent No.: US 9,588,963 B2
(45) Date of Patent: Mar. 7, 2017

(54) SYSTEM AND METHOD OF GROUPING AND EXTRACTING INFORMATION FROM DATA CORPORA

(71) Applicant: IQINTELL, LLC, Huntington Beach, CA (US)

(72) Inventors: Frank John Williams, Los Alamitos, CA (US); Walter Edward Williams, San Jose (CR)

(73) Assignee: IQINTELL, INC., Huntington Beach, CA (US)

( * ) Notice: Subject to any disclaimer, the term of this patent is extended or adjusted under 35 U.S.C. 154(b) by 0 days.

(21) Appl. No.: 14/678,294

(22) Filed: Apr. 3, 2015

(65) Prior Publication Data
US 2015/0363384 A1  Dec. 17, 2015

Related U.S. Application Data

(63) Continuation-in-part of application No. 12/661,612, filed on Mar. 18, 2010, now Pat. No. 9,063,923.

(60) Provisional application No. 61/210,396, filed on Mar. 18, 2009, provisional application No. 61/974,628, filed on Apr. 3, 2014.

(51) Int. Cl.
| | |
|---|---|
| *G06F 17/27* | (2006.01) |
| *G06F 17/21* | (2006.01) |
| *G10L 21/00* | (2013.01) |
| *G10L 25/00* | (2013.01) |

(52) U.S. Cl.
CPC ................. *G06F 17/2785* (2013.01)

(58) Field of Classification Search
CPC .. G06F 17/2785; G06F 17/2705; G06F 17/27; G06F 17/2735; G06F 17/274; G06F 17/277; G06F 17/30684; G06F 17/2765; G06F 17/2795; G06F 17/21; G06F 17/271; G06F 17/2755; G06F 17/2775; G06F 17/3061
USPC ............................ 704/9, 10, 270, 270.1, 275
See application file for complete search history.

(56) References Cited

U.S. PATENT DOCUMENTS

| | | | | |
|---|---|---|---|---|
| 6,405,162 | B1 * | 6/2002 | Segond ............... | G06F 17/5045 703/24 |
| 6,675,159 | B1 * | 1/2004 | Lin ..................... | G06F 17/2705 |
| 7,512,596 | B2 * | 3/2009 | Hajela ............... | G06F 17/30622 |
| 7,539,619 | B1 * | 5/2009 | Seligman ........... | G06F 17/2755 704/2 |
| 7,571,383 | B2 * | 8/2009 | Nomiyama ....... | G06F 17/30634 707/999.003 |
| 7,860,706 | B2 * | 12/2010 | Abir ................... | G06F 17/2872 704/4 |
| 8,229,958 | B2 * | 7/2012 | Waldo ............... | G06F 17/30011 707/780 |
| 8,392,456 | B2 * | 3/2013 | Waldo ............... | G06F 17/30011 707/722 |
| 2001/0014902 | A1 * | 8/2001 | Hu ..................... | G06F 17/2785 715/236 |

(Continued)

*Primary Examiner* — Edgar Guerra-Erazo
(74) *Attorney, Agent, or Firm* — Apogee Law Group P.C.

(57) ABSTRACT

A system for annotating words of a data corpus based upon their particular concept and their corresponding grammatical sense with Conceptual Numerical Identifiers (CNIs) from a Conceptual Dictionary, pairing the words based on conceptual inter-relating network (CIRN) rules, and determining if a selected plurality of paired words are grammatically, syntactically, and linguistically correct by matching CNIs from each pair of words.

31 Claims, 40 Drawing Sheets

(56) References Cited

U.S. PATENT DOCUMENTS

| | | | |
|---|---|---|---|
| 2003/0216919 A1* | 11/2003 | Roushar | G06F 17/277 704/260 |
| 2007/0073745 A1* | 3/2007 | Scott | G06F 17/30737 |
| 2007/0106499 A1* | 5/2007 | Dahlgren | G06F 17/30401 704/10 |
| 2007/0214125 A1* | 9/2007 | Williams | G06F 17/30734 |
| 2007/0214199 A1* | 9/2007 | Williams | G06F 17/30737 |
| 2007/0266009 A1* | 11/2007 | Williams | G06F 17/30672 |
| 2007/0299831 A1* | 12/2007 | Williams | G06F 17/30654 |
| 2008/0071737 A1* | 3/2008 | Williams | G06F 17/30864 |
| 2008/0082511 A1* | 4/2008 | Williams | G06F 17/3064 |
| 2008/0091411 A1* | 4/2008 | Williams | G06F 17/2795 704/9 |
| 2008/0109416 A1* | 5/2008 | Williams | G06F 17/30864 |
| 2008/0140634 A1* | 6/2008 | Williams | G06F 17/30979 |
| 2008/0140635 A1* | 6/2008 | Williams | G06F 17/30554 |
| 2008/0140649 A1* | 6/2008 | Williams | G06F 17/30687 |
| 2008/0275694 A1* | 11/2008 | Varone | G06F 17/2785 704/9 |
| 2009/0089058 A1* | 4/2009 | Bellegarda | G06F 17/277 704/251 |
| 2010/0106728 A1* | 4/2010 | Waldo | G06F 17/30722 707/741 |
| 2011/0301941 A1* | 12/2011 | De Vocht | G06F 17/2715 704/9 |
| 2012/0254160 A1* | 10/2012 | Waldo | G06F 17/30722 707/722 |

* cited by examiner

700 → 1st Sentence: John called Tom.

| $CNI_{John} = 100.123$ | $CNI_{called} = 500.123$ | Rule 12a |
|---|---|---|
| $CNI_{Tom} = 300.123$ | $CNI_{called} = 500.123$ | Rule 06a |

FIG. 7A

702 → 2nd Sentence: Mary called Tom.

| $CNI_{Mary} = 312.123$ | $CNI_{called} = 500.123$ | Rule 12a |
|---|---|---|
| $CNI_{Tom} = 300.123$ | $CNI_{called} = 500.123$ | Rule 06a |

FIG. 7B

704 → 3rd Sentence: Tom called Mary.

| $CNI_{Tom} = 300.123$ | $CNI_{called} = 500.123$ | Rule 12a |
|---|---|---|
| $CNI_{Mary} = 312.123$ | $CNI_{called} = 500.123$ | Rule 06a |

FIG. 7C

706 → Query: who called Mary?

| Functional "Who" | $CNI_{called} = 500.123$ | Rule 12a |
|---|---|---|
| $CNI_{Mary} = 300.123$ | $CNI_{called} = 500.123$ | Rule 06a |

FIG. 7D

708 → Answer: Tom

| $CNI_{Tom} = 300.123$ | $CNI_{called} = 500.123$ | Rule 12a |
|---|---|---|
| $CNI_{Mary} = 312.123$ | $CNI_{called} = 500.123$ | Rule 06a |

| Num | Word | Lang | Cntry | Lang | Cntry | Gram | N | G | Description |
|---|---|---|---|---|---|---|---|---|---|
| 1962958663 | Kokako | 1 | | 1 | | 999478.000 | | | xml 1.1 New Word as noun |
| 1962958638 | pato | 2 | | 2 | | 116937.000 | | | xml 1.2 a bird |

2300

2302

This exemplary puzzle has three classes and three things per class (the real Einstein Puzzle has 5 classes and 5 items per class) For example:

1) There are three homes: Red, blue, yellow.
2) There are three individuals: an American, a Russian and a German.
3) There are three animals: a dog, a cat, and a mouse Clues:
A) The American lives in the second house
B) The German has a dog
C) The cat lives in the third house Question: What color is the house where the mouse lives?

SYSTEM AND METHOD OF GROUPING AND EXTRACTING INFORMATION FROM DATA CORPORA

RELATED APPLICATION(S)

This application claims priority of U.S. Provisional Patent Application Ser. No. 61/974,628, filed on Apr. 3, 2014, entitled "SYSTEM AND METHOD OF GROUPING AND RETRIEVING INFORMATION FROM DATA CORPORA," and is a continuation-in-part of U.S. patent application Ser. No. 12/661,612, filed on Mar. 18, 2010, entitled "METHOD FOR IDENTIFYING THE INTEGRITY OF INFORMATION" that claims priority to U.S. Provisional Patent Application Ser. No. 61/210,396, filed on Mar. 18, 2009 that are all incorporated in their entirety in this application by this reference.

BACKGROUND OF THE INVENTION

1. Field of the Invention

The invention is related generally to a system for and method of efficiently searching data corpora, and more particularly, to grouping data corpora comprising multiple information elements representing as identifiable concepts and storing the grouped data in a database from which information may be efficiently extracted in response to a query.

2. Related Art

With the increased usage of the Internet and other electronic networks, there has been an exponential growth in the volume of data that is available to be collected, stored, and analyzed. There are vast volumes of communications throughout the world that may be transmitted wirelessly from satellites and base stations and may also pass through underground and undersea cables of international, foreign, and domestic networks and thus are susceptible to being intercepted, deciphered, and analyzed. These volumes of data may include financial information, stock transactions, business deals, foreign military and diplomatic secrets, legal documents, as well as more mundane, personal data trails, such as credit card transactions, private e-mails, cell phone calls, Google searches, and other digital data that may pass over wireless networks.

Aside from the Internet, there is also the deep web or deepnet—data beyond the reach of the public, all of which data which may be highly encrypted. This includes password-protected data, U.S. and foreign government encrypted communications, and noncommercial secured file-sharing between known and trusted peers. Various intelligence communities throughout the world have an incentive to collect and store this data where possible, and once these communications are captured, stored, and decrypted, the "data-mining" may begin. This may include searching for target addresses, locations, countries, and phone numbers, as well as watch-listed names, keywords, and phrases, etc., in e-mails. Any communications that arouse suspicion, for example, those to or from targeted entities, may be automatically copied or recorded and collected for further, more thorough searching and analysis.

Most of this data is in the form of machine-readable natural language text, that is, language spoken by people and understood by them in their respective languages, e.g., English, French, Chinese, etc., as opposed to artificial programming languages, such as C++, Java, Visual Basic, etc. Natural language processing (NLP) is that subcategory of Artificial Intelligence (AI) that relates to programming computers to "read" and understand natural language text in the same manner that humans read and understand human language. NLP includes approaches related to information retrieval, machine translation, and language analysis, with the last comprising semantics, parsing, and parts-of-speech tagging.

Conventional searches of large data corpora are generally text-based, i.e., key-word searches. An example of a text-based search is a Boolean search, that is, a term is included in a document or it is not. The use of key-words in combination with Boolean operators or connectors such as AND, OR, NOT, and NEAR may be used to search for documents that contain multiple terms and to exclude documents with certain terms in order to limit, widen, or further define a search. Using basic Boolean operators, a Web searcher can improve his search results, but generally may also retrieve multiple results, many of which are imprecise and may not conceptually match the search topic(s).

Boolean searches may be improved through the use of various mathematical operations or calculations to improve search results. These calculations and operations may, in general, be either on-page or off-page. Examples of the former include determining the frequency of the search terms in the searched documents and also the location of the term in a document, e.g., its title, a description of the document, its content, etc. Examples of off-page techniques include frequency counts of terms used in prior document searches and ranking documents based on citations by other documents in large databases. Many of these techniques require complex mathematical iterations that are constantly being modified and improved. However, these techniques are primarily suited for search engines that search large databases of documents such as are found on the World Wide Web, and are still essentially text-based searches that do not deal with the problem of determining the meaning of words (i.e., word-sense disambiguation).

Another approach to improve search results has been to use synonym-based searching, that is, finding synonyms of the key-word(s) being searched, i.e., words with the same-part-of-speech (nouns, verbs, adjectives and adverbs) having the same meaning, i.e., are interchangeable with the key-word(s) being searched, and forming a synset with these words. For example, {car; auto; automobile; motorcar} may form a synset because these four words can be used to refer to the same concept. In applications focused on information retrieval, searching using synonyms may give more and better results but different senses of the keywords is not necessarily required so long as the sense of the keyword in the search query is the same as the sense of the keyword in the retrieved document.

Each of the synsets may be related to other synsets by semantic conceptual relationships. For example, a more general concept (or hyperonmy synset) of the {car} synset may be: {motor vehicle; automotive vehicle}, a more specific concept (or hyponymy synset) may be: {squad car; patrol car; police car} and {taxi; cab; taxicab}, and parts of the whole (or meronymy synset) may be: {gasoline engine; car door; car window; car seat}. By means of these and other semantic/conceptual relations, all word meanings related to a single concept can be interconnected; however this results in a huge hierarchical network or wordnet.

Examples of lexical databases that may be used in synonym-based searching is WordNet®, which is a large lexical database of the English language, and EuroWordNet, which is a multilingual lexical database with wordnets for several European languages. Generally, in WordNet® each synset is limited to one particular part-of-speech, while in other lexical databases different parts-of-speech may be found in a single synset.

As for word-sense disambiguation (WSD), this refers to the process of identifying which sense of a word (i.e., its meaning) is used in a sentence, when the word is polysemous, i.e., the word has multiple meanings. The importance of WSD is that words that are ambiguous must be given their correct meaning based on the context in which they occur, e.g., their placement in a sentence. For example, the word "plant" may refer to an industrial, chemical, or electrical plant, or a living organism. A third meaning may be the verb "plant," whose meanings include setting seeds or plants into the ground. This is ambiguity at the lexical level. Ambiguity may also be exhibited at the semantic level (e.g., the headline: stolen painting found by tree) or the pragmatic level (e.g., can you repair the car?).

In order to understand the true nature of a query represented by keywords, the search engine must be able to select the correct sense of a word in a given context where that word is polysemous. In machine translation applications, choosing the wrong meaning of a polysemous word results in wrong translations, and in the case of search engines, the wrong information will be retrieved. Additionally, search engines, to operate more efficiently and accurately, should retrieve documents including related terms, such as "flora" when searching "plant" having the meaning of a living organism.

The process of WSD generally requires two things: a dictionary that specifies the senses that are to be disambiguated (the most commonly-used such dictionary is WordNet®) and a corpus of natural language data that is to be disambiguated. There are numerous techniques from the fields of NLP and machine learning (ML) that may be employed to help improve the accuracy of search engines and translation machines when dealing with WSD. Almost all these approaches normally work by defining a window of n content words (for example, n=10) around each word to be disambiguated in the corpus, and statistically analyzing those n surrounding words using a lexical database such as WordNet®. Another variation of the window used, rather than counting words, is to select a syntactic span, such as a sentence or a phrase. In order to provide better search and translation results, NLP and ML techniques in general attempt to identify the parts of a sentence, convert verbs to various tenses, find relationships between words in a given sentence, disambiguating between synonyms and near-synonyms, and extracting meaning from context. A NLP search engine would in theory find targeted answers to user questions (as opposed to a keyword search).

Conventional approaches to WSD that include dictionary- and knowledge-based methods may rely primarily on dictionaries, thesauri, and other lexical knowledge bases without using any corpus evidence, or may use a secondary source of knowledge such as a small annotated corpus as seed data in a bootstrapping process. Unsupervised methods are those that do not rely on external information and may work directly from raw unannotated corpora. Unsupervised methods are also known under the name of word sense discrimination.

In general, dictionary-based and knowledge-based approaches require algorithms that find similarities between multiple definitions and a current context, such as the word's position in a semantic network. An example of such an algorithm is the Lesk algorithm based on the hypothesis that words used together in text are related to each other and that the relation can be observed in the definitions of the words and their senses. Two (or more) words are disambiguated by finding the pair of dictionary senses with the greatest word overlap in their dictionary definitions, as may be found in the Oxford English Dictionary, the Merriam-Webster 7th New Collegiate Dictionary, or WordNet®. For example, when disambiguating the words in "pine cone," the definitions of the two words that both include the words "evergreen" and "tree" (at least in one machine-readable dictionary) are most likely the appropriate senses. Thus, such approaches require algorithms to process multiple sentences in diction for each word in a sentence and then compare all those sentences for the same words appearing in the definition.

All of these methods of WSD generally require voluminous dictionaries and complicated algorithms and thus are complex and laborious and cannot be improved without considerable effort. Moreover, when certain elements of a method are modified to improve results, the method may then be less accurate when applied to other data corpora. In view of the foregoing, there is an ongoing need for providing systems and methods of creating and maintaining searchable databases that when queried by a user produce results that are precisely and accurately responsive to the user's query.

SUMMARY

To address the foregoing problems, in whole or in part, and/or other problems that may have been observed by persons skilled in the art, the present disclosure provides systems, apparatus, instruments, devices, methods, and/or processes, as described by way of example in implementations set forth below.

A system for identifying words' indexes on a database, annotating the words' indexes, grouping the annotated words' indexes according to a set of ordered rules, and storing the grouped annotated words' indexes in a database for subsequent analysis, additional processes, and extraction is disclosed. The system comprises a Conceptual Index Dictionary, which is a dictionary wherein each word is associated with an index here introduced as a Conceptual Numerical Indexing Identifier (or CNI for short) that distinguishes every word based on their particular concept and their corresponding grammatical sense also known as a part of speech (POS). In an example implementation of a system in accordance with the present invention, a group or string of words, such as a sentence, is analyzed by a processor that matches each word with its corresponding CNI in the Conceptual Index Dictionary; and for those words that have CNI; the corresponding CNI is annotated instead of the word because a word can be inconsistent in its meaning and use. If the word has several meanings, i.e., is polysemous, then the Conceptual Index Dictionary will have multiple differing CNIs. For example, the polysemous word "duck" has multiple CNIs, such as a first CNI for the meaning of a bird, and another CNI for the meaning of evading/avoiding something. Any words not recognized by the Conceptual Dictionary may be stored in a temporary database for possible subsequent use or analysis.

In the next stage of the system, the words' CNIs corresponding to the words in the sentence are grouped to form sets by applying Conceptual Sets Logic (CET Logic). For example, in "red cars and yellow submarines" the CNI of the adjective red is grouped with the CNI of its corresponding noun car; while the CNI of the adjective yellow is grouped with the CNI of its corresponding noun submarine. In this fashion CNIs don't stand alone, but instead they are grouped with other CNIs. For example, the CNIs of adjectives are grouped with the CNIs of the nouns that the adjectives modify; the CNIs of adverbs are grouped with the CNI of verbs that the adverbs modify; the CNIs of nouns are grouped with the CNIs of verbs that nouns interact with, etc. CET Logic comprises stored predefined, ordered rules that are applied to the strings of CNIs that end up forming sets, like pairs, triplets or others. In addition, if words' CNIs are grouped based on one of the many CET Logic rules, then the group is associated with the type of CET Logic Rule. For example, if the CNI of red is grouped with the CNI of car because of a CET Logic Rule type 12$j$, then 12$j$ is associated with the group comprising the CNI of red and the CNI of car. In this fashion, the CNI group of red and car is a 12$j$ type group. The different groups that CNIs formed with one another are called Conceptual Sets, CNI Sets or CETs for short. For example, the group type 12J that the CNIs of red and car formed is called a CET; and the 12$j$ group that the CNI of yellow formed with the CNI of submarine is another CET. In this fashion, words are converted into CNIs which later form different types of groups (CETs) according to a predefined series of rules called CET Logic. These CETs may then be stored in a temporary database that may be referred as the Indexed CETs Database. Those CNIs that were not grouped may be then dropped, may be identified as non-group forming CNIs, may be used to identify missing CET Logic rules, may be used to identify new meanings of words, or may be used to identify the string of words (sentence) as non-understandable as exemplify by the next paragraph.

The system may also include a tallying module, wherein the CNIs of the sentence being analysed may be tallied to determine if the sentence (or string) is conceptually consistent and linguistically correct. This determination is made by comparing the CNIs of each CET with the CNIs of all other CETs, until all CETs of the sentence can be interconnected. In general, if all CETs of a sentence can be interconnected using their respective CNIs, then that sentence or string of words is conceptually coherent. For example, the sentence "the red car crashed" is grammatically correct and can be understood by a human user when read because all CETs of the sentence can be interconnected using the CNIs. Sentences or strings that cannot be interconnected are not grammatically correct and may be illogical, contain new words, new meanings, or new grammatical senses, or are otherwise linguistically defective. Both types of sentences and groups may be stored in databases for later use, which database may be referred to as a Tallied Indexed CETs database and a Non-Tallying CETs Database, respectively.

As for the Tallied Indexed CETs Database, this may be utilized as a permanent source of annotated data for data collection, knowledge acquisition, question answering, deductions, inductions, abductions, contradiction detection, anomaly detection, and information extraction. As additional data corpora are processed using the Conceptual Index Dictionary and CET Logic, additional CETs may be added to the Tallied Indexed CETs Database. This database may be queried using queries that are designed to extract useful information from the database or obtain answers to questions as described in more detail herein below. Notably, there are several types of indexes and indexing procedures that may be used to enhance the retrieval of data from the Tallied Indexed CETs Database. For example, a compound index can be created which includes the type of CET and each CNI within the CET. Another exemplary type of index involves arranging the CNI in ascending order while incorporating the type of CET in between the two CNIs. Another example, involves creating an index table of the CET types and the CNIs within each also involving the order in which the CNIs are placed within the CET. In general, different designs of indexes and indexing procedures can be used to produce different kinds of results such as search and retrieval of all synonyms versus search and retrieval of exact concepts and words. The data in the Non-Tallying CETs Database may be used to generate new CNIs in the Conceptual Index Dictionary, create new CET Logic rules for inclusion or simply for identified for deletion.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figure(s). The components in the figures are not necessarily to scale, emphasis instead being placed upon illustrating the principles of the invention. In the figures, like reference numerals designate corresponding parts throughout the different views.

FIGS. 7A-7E are schematic depictions of an example of a process of answering a question using a query of a database in accordance with the present invention.

FIG. 14A is a diagram that depicts an Entry Table 1410 with table data that comprises many columns and many rows in accordance with the present invention as shown in FIG. 1.

FIGS. 18A, 18B, and 18C are illustrations that depict learning and discovering New Words upon data entry in accordance with the present invention as shown in FIG. 1 is depicted.

FIG. 23A is an illustration that depicts a variation of the Einstein Puzzle (Zebra Puzzle) solved with the use of permutations in accordance with the present implementation of the invention of FIG. 1.

FIG. 23B is an illustration of the permutations that the CB-DCE system has created for each of the categories of the Einstein Puzzle in accordance with the present implementation of the invention of FIG. 1 is depicted.

DETAILED DESCRIPTION

The foregoing description of implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

Figure 1:
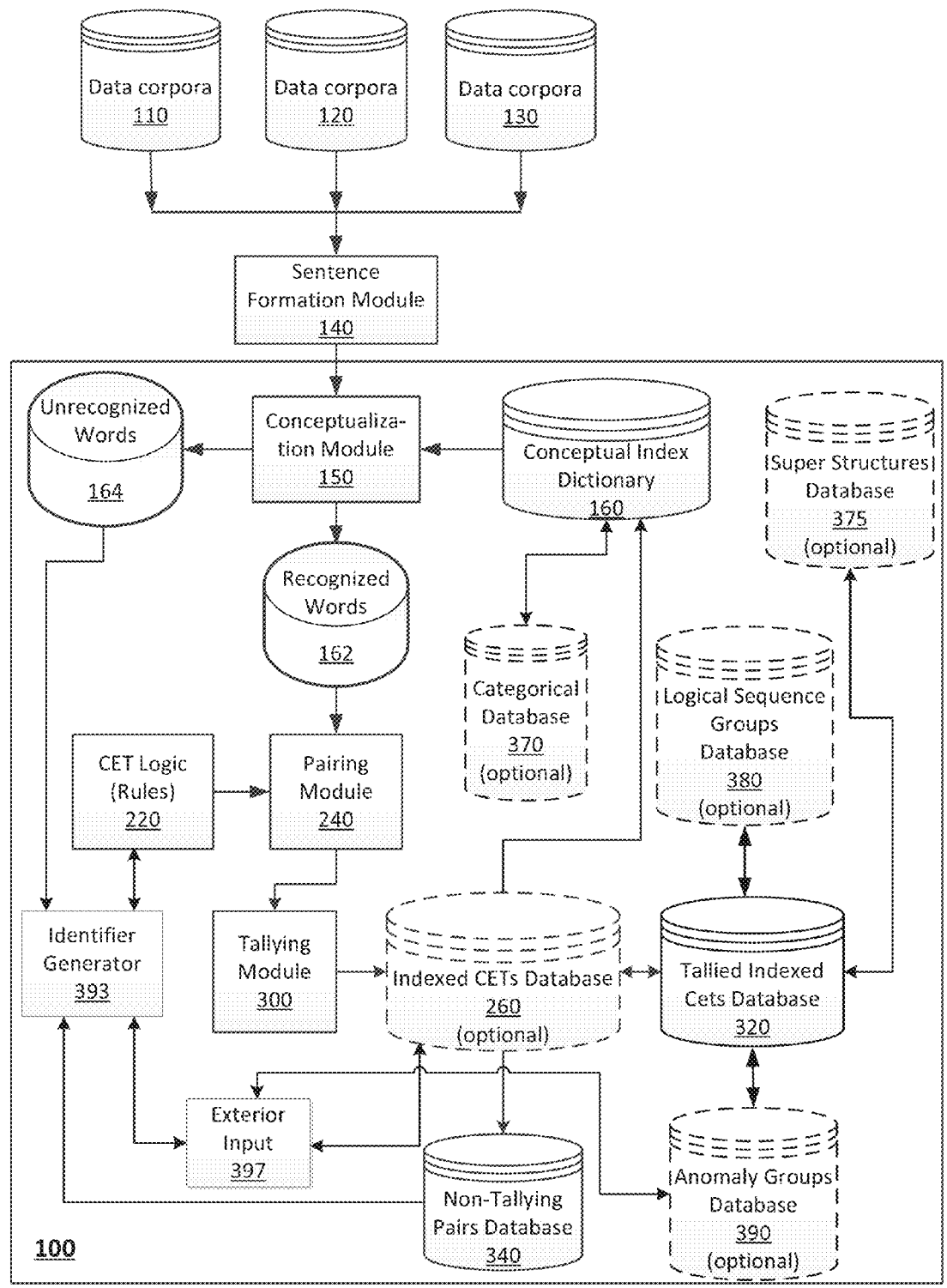
FIG. 1 is a block diagram of an example of an implementation of an improved system for annotating, grouping, and extracting information from data corpora in accordance with the present invention.

FIG. 1 is a block diagram of an example of an implementation of an approach for grouping and extracting information from data corpora in accordance with the present invention. In FIG. 1, data corpora 110, 120, and 130 are data sources each containing machine-readable data, which may be read by the Concept-Based Data Collection and Extraction (CB-DCE) system 100. Each data corpora may be in any language (i.e. English, Spanish, French, German, etc. . . . ), including multiple data types (i.e. sound, text, and textual images) and if not already in grammatical sentence format, the data corpora may be segmented into sentences in Sentence Formation module 140.

In an example implementation, CB-DCE system 100 may process the data of data corpora 110, 120, and 130 sentence by sentence with Conceptualization Module 150. Conceptualization Module 150 is in signal communication with Conceptual Index Dictionary (also called the Conceptual Dictionary) 160, which may be a database containing a plurality of words representing a natural language, where each word is associated with a word index that is a numerical identifier (numerical identifier) that is referred to as a Conceptual Numerical Identifier (CNI) in the current implementation. In the current example of a CB-DCE system implementation, the CNI may comprise 12 digits, consisting of nine to the left of a decimal point and three to the right. It is appreciated by those skilled in the art that while the CNI illustrated herein has 12 digits, this numerical choice was made for the purpose of illustration only. The number of digits, as well as the placement of a decimal point (or not utilizing a decimal point) may be arbitrarily chosen by the designer of the CB-DCE system 100.

Each word in the Conceptual Dictionary 160 may be conceptually represented as one of the four main parts of speech elements such as a noun, adjective, adverb and verb, as indicated by the associated CNI. There may be other elements, such as operational or functional words. These may include words, symbols, characters, etc., such as "before", "in", ";", "and", "&", "is", and "the", that act as filters, connectors, separators, etc., between grammatical elements. Although these operational words may have CNIs to identify them and may be processed as the main POS, they may not have the same conceptual importance or forms CETs that would be saved. There may yet be other types of elements that are symbols used as short hand notation in words, such as the "$" symbol that means dollars, U.S. dollars, and money. Such symbols would be associated with a CNI identifier and processed the same as words. Other symbols, like numbers, do not have CNIs but are annotated into the CETs with specialized identifiers such as "num" so they can be differentiated from CNI which are numbers too.

The Conceptual Index Dictionary 160 may be generated manually, for example, by starting with lexical databases such as Roget's Thesaurus, WordNet®, and EuroWordNet, to generate the words and associated CNIs for the Conceptual Index Dictionary 160. However, this process is very laborious and costly. Therefore, in other implementations, a CB-DCE system may be configured to implement a self-driven conceptual dictionary dynamically built by a processor from a collection of documents that may include one or more lexical databases.

In Conceptualization Module 150, each word being analyzed is compared against the Conceptual Index Dictionary 160 and if a match is found, the word is associated or replaced with its appropriate CNI. If a word is polysemous, there may be multiple matches. For example, the word "bank" may have at least three meanings in the Conceptual Index Dictionary 160 as a depository financial institution, sloping land beside a body of water, and a flight maneuver of an aircraft. There may also be two more meanings as: bank as in banking an aircraft, and bank as in doing business with a bank. Thus, in the case of the word "bank," there would be five matches found in Conceptual Index Dictionary 160, which generates five items consisting of the word "bank" and the appropriate CNI. These 5 items may be stored in Recognized Words data file 162. Words that do not match with any words of the Conceptual Index Dictionary 160 may be stored in Unrecognized Words data file 164, which words may be later re-examined as described in more detail hereinbelow.

Once all words of a sentence are conceptualized, for example, words are replaced by their CNI or their CNI is accessible or their grammatical identifier is available or their categories are available, they pass from Recognized Words data file 162 to a Pairing Module 240, which is in signal communication with CET Logic (Rules) module 220. CET Logic (Rules) module 220 comprises conceptual inter-relating network (CIRN) rules that define a conceptual relationship between at least a pair of words. An example of a very basic CIRN rule may be the following:

If X=>noun→human, if the first analyzed element is a noun and the noun is such that belongs to the category of human also mark the noun 12a, and X+1=> and if the next element to the right is a verb in present tense then also mark action 12a the resulting CET may be represented by: $E_x$; $E_{x+1}$; 12a; where $E_x$ is the CNI of the first word of the pair; $E_{x+1}$, is the CNI of the second word, and 12a represents the type of the CIRN rule that is used to pair the elements.

In general, the CIRN rules may be stored in a table or other data structure within CET Logic (Rules) module 220. For the English language, a working prototype of the CB-DCE system 100 may operate efficiently and accurately with approximately 625 CIRN rules in the table. Generally, the CIRN rules are ordered, i.e., they are operated on in a predetermined sequence. Also, there may be several different types or forms of CIRN rules; as an example, one form of CIRN rule may operate to destroy or modify pairs previously formed by other CIRN rules; while other CIRN rules can operate only on the previous operation of prior CIRN rules. The CIRN rules may operate on and determine the relations between pairs of words based solely on the respective CNIs of each word and/or the classes (ontologies) to which those CNIs belong.

The pairing of elements using the Conceptualization Module 150 and the Conceptual Index Dictionary 160 operates at a first level of word-sense disambiguation. As an example, consider the words "Frank" (the personal name), "frank" (the sausage), "frank" (the adjective candid), and "runs" (an action). The words "Frank" (the personal name) and "frank" (the sausage) may each be paired with the word "runs" under the CIRN rule noted above because the first word is an noun and the second word is a verb; however, the word "frank" (the adjective candid) will not because an adjective preceding a verb would not be paired under this CIRN rule. Since English grammar requires the adjective can be placed before the noun. Therefore the pair of "frank" (the adjective candid) and the word "runs" will not be formed and this time and will not be involved in any further processing.

Once all words' CNIs of a sentence are grouped (CETS are created), the CETs pass to a Tallying Module 300, which determines if all CETs of the sentence are interconnected. This is done by tallying each CET of a sentence with at least one other CET of the sentence. For example, if the sentence consists of two CETs; the CETs may be considered interconnected if there is a CNI common to both CETs. If interconnected, the sentence consisting of the two CETs is then grammatically and syntactically correct and therefore can be understood by a human (if presented with words rather than CNIs).

If the sentence consists of three or more CETs, the process is the same in that each CET must be connected to at least one other CET by matching CNIs. Essentially, if Tallying Module 300 cannot connect all of the CETs of the sentence being analyzed based on matching CNIs, then that sentence is grammatically incorrect and cannot be understood by a human user. Basically, this is any sentence that has at least one CET that remains unconnected after processing by the Tallying Module 300.

Figure 2:
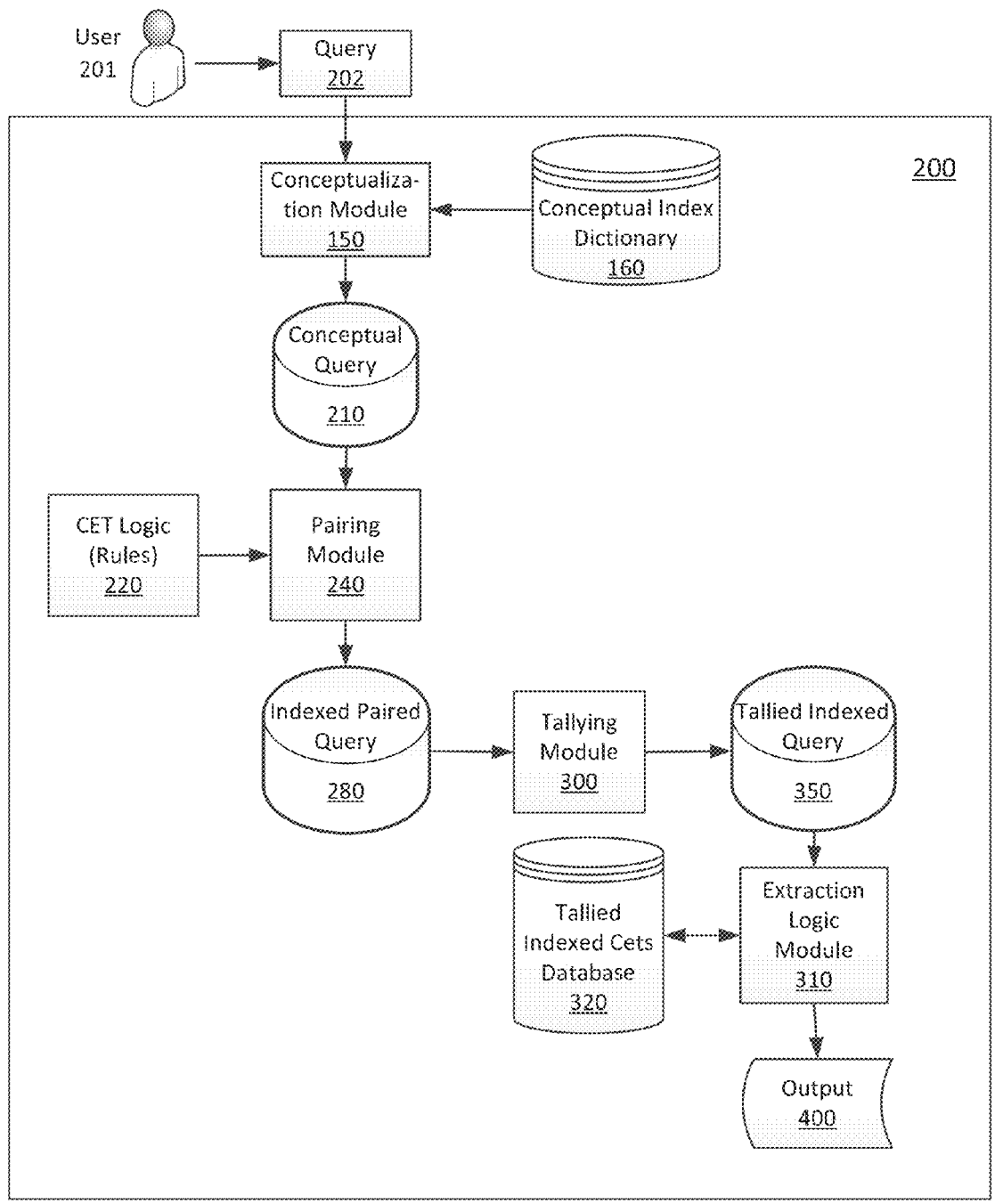
FIG. 2 is another block diagram of an example of an implementation of the system of FIG. 1 in accordance with the present invention that includes elements for querying databases.

The interconnected CETs of a sentence, that is understandable by humans, are then stored in the Tallied Indexed Cets database 320, which database may then be accessed for information extraction as shown in FIG. 2. Over time, additional CETs may be added to the Tallied Indexed CETs database 320. As for those CETs that are not interconnected, these CETs may be stored in Non-Tallying Cets database 340 for later processing. This processing may include examining the CNIs and associated words, modifying, adding, or deleting entries in the Conceptual Index Dictionary 160, and/or modifying or adding CIRN rules as needed to address non-grouped CNIs. Further, databases 380 and 390 may be used for anomalies and sequencing (inductions and deductions). If additional user inputs are needed to add new words or meanings, it may be accomplished via the identifier generator module 393 and exterior input module 397.

Notably, there are several types and forms for indexing or creating indexing tables of the data in the Tallied Indexed CETs database 320. For example, each CNI, CET, type of CET (CIRN rule), section of CNI or order of CNI within the CETs, can be used as individual elements or as pairs to create specific indexes to quickly retrieve data. For example the exemplary CET comprising CNI-1; CNI-2; 12J can be indexed as individual elements. As a result of this indexing methodology, a query that creates the same CET (CNI-1; CNI-2; 12J) retrieves the exemplary CET, a second query for 12J can retrieve the exemplary CET, a third query of CNI-1 in the first order retrieves the exemplary CET, and a fourth query for CNI-2 in the first order, does not retrieve the exemplary CET. Particularly, this type of indexing methodology allows a combination of independent indexes as needed that allows the performance of specialized searches upon demand.

Turning to FIG. 2, a block diagram of an example of another implementation of a CB-DCE system 200 in accordance with the present invention is shown. CB-DCE system 200 includes additional elements for querying a Tallied Indexed CETs database 320 as shown in FIG. 1. Conceptualization Module 150 and Conceptual Index Dictionary 160 are the same elements as in FIG. 1. However, in this example of an implementation of CB-DCE system 200, a user 201 enters a query 202 in the form of natural language text into CB-DCE system 200. This natural language text is processed in the same manner as the data of data corpora 110, 120, and 130 of FIG. 1, resulting in indexed CNIs stored in Conceptual Query data file 210.

These words' CNIs pass from Conceptual Query data file 210 to Pairing Module 240, which is in signal communication with CET Logic (Rules) module 220, both of which are again the same elements as in FIG. 1. In the same manner as in FIG. 1, the CNIs of Conceptual Query data file 210 are grouped using the CIRN rules stored in a table within CET Logic (Rules) module 220. The grouping of CNIs using the Conceptualization Module 150 and the Conceptual Index Dictionary 160 involves a first level of word-sense disambiguation to eliminate words that are not grammatically or syntactically correct under the CIRN rules. The CETs that are formed under the CIRN rules may be stored in Indexed Paired Query data file 280.

Once all CNIs of a sentence are grouped, the grouped CNIs (CETs) pass to a Tallying Module 300, which determines if all CETs of the query are interconnected. This is done by tallying each CET in the query with at least one other CET in the same query. Generally a query may comprise of two or more CETs, and each CET must be connected to at least one other CET by at least one matching a CNI in both CETs. If all of the CETs of the query are found to be interconnected, and all CNIs of non-functional words are present within at least one CET, that is, it is understandable by a human user; the CETs may then be stored in the Tallied Indexed Query data file 350.

The CETs from Tallied Indexed Query data file 350 are then input into Extraction Logic module 310, which is in signal communication with Tallied Indexed Cets database 320. Extraction Logic module 310 is configured to extract information from the Tallied Indexed Cets database 320 by searching through the indexed tables of the Tallied Indexed Cets database 320 with the CETs stored in the Tallied Indexed Query data file 350. This process of information extraction may take many forms, e.g., text searching, synonym searching, CET searching, questions and answers, as well as logical sequencing, anaphora resolution, and finding and resolving anomalies and contradictions in the Tallied Indexed Cets database 320. Moreover, this process of information extraction may also include, a user interface whereby a CB-DCE system 200 prompts the user to answer queries or select options for further processing, and in response to the user's input, the CB-DCE system 200 continues processing the user's query, all of which is described in greater detail herein below.

Figure 3A:
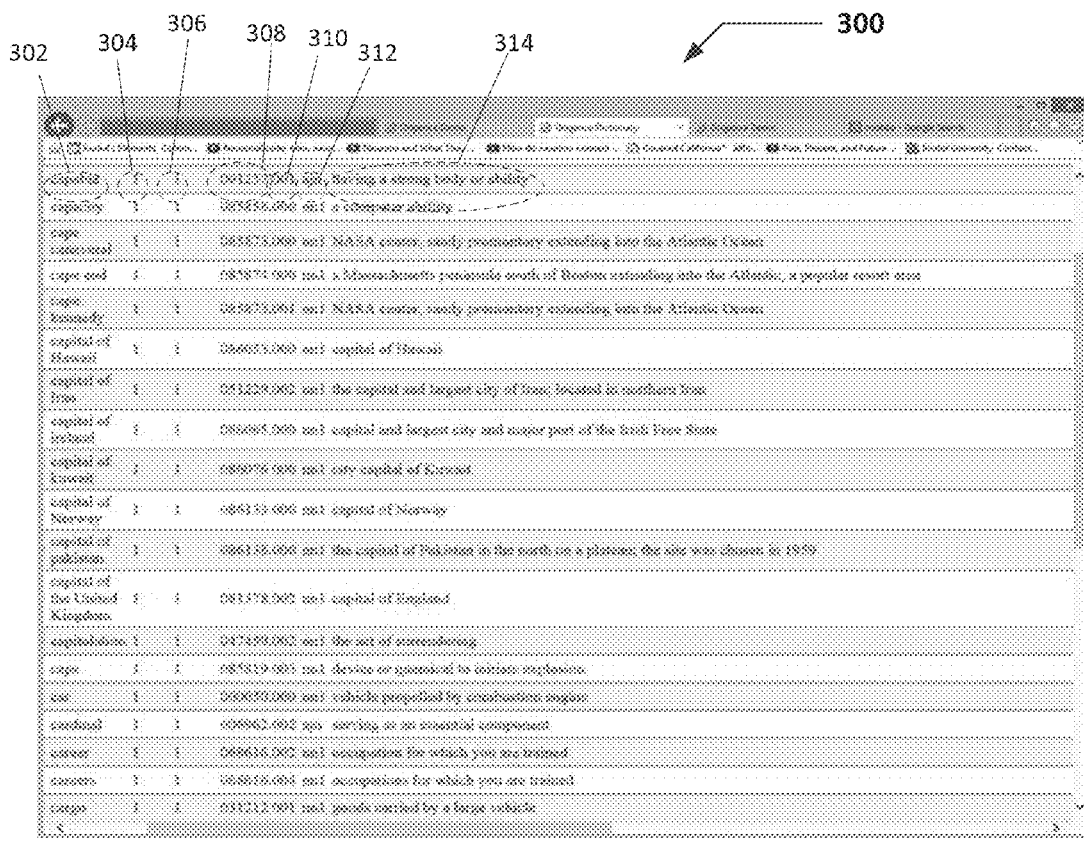
FIG. 3A and FIG. 3B are depictions of a graphical user interfaces (GUIs) displaying formatted portion of an example of a Conceptual Dictionary database in accordance with the present invention as shown in FIG. 1.
Figure 3B:
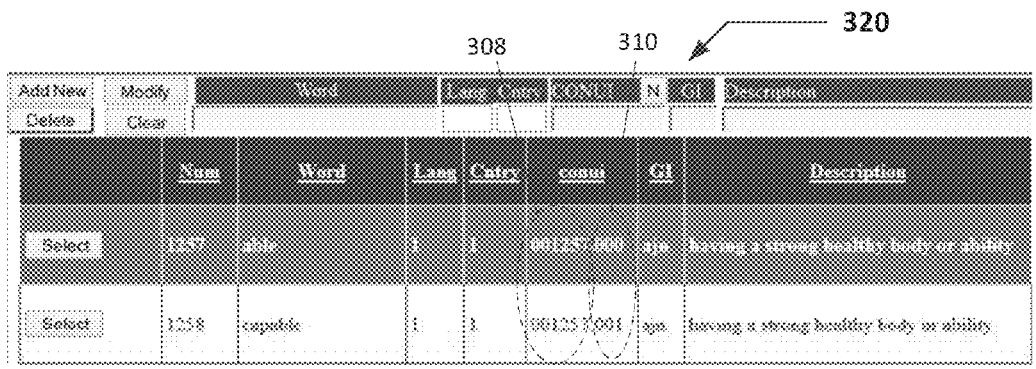

FIGS. 3A and 3B are depictions of a graphical user interfaces (GUIs) 300 and 320 displaying formatted portion of an example of a Conceptual Index Dictionary database in accordance with the present invention, such as, for example, Conceptual Index Dictionary 160 of in FIG. 1. Column 302 of GUI 300 contains a list of the words of a Conceptual Dictionary; for example, the word in the first row of GUI 300 is "capable." Its CNI is 000257.001, is also associated with the elements from Columns 304 and 306. The "1" in Column 304 indicates the language of the word or CNI, in this, case, English. The "1" in Column 306 indicates the country of the language. For example, words in English belonging to Australia and those belonging to the USA can be used or differentiated if needed. Column 308 contains that head portion of the CNI or "001257" while Column 310 contains the tail portion of the CNI or "0.001" which together identify the word "capable" with its specific meaning in the Conceptual Index Dictionary 160. This 9-digit identifier or CNI may also be referred to as an Engineered Encyclopedic Globalized Grammatical Index ("eeggi"). Column 312 contains a grammatical identifier that is used to identify certain characteristics of the corresponding words. As an example, "nn1" may refer to a type of noun and "ajn" may refer to an adjective, of which there may be several types. Column 314 of the GUI 300 contains text that provides the definition or meaning of the corresponding word of the Conceptual Index Dictionary.

For example, the word "bank" would have the same head 6-digit identifier for all instances of the word that appears in the Conceptual Index Dictionary, which may mean five words with five different senses as explained above. The three digits that appear in column 310 may differentiate between the different senses of the word "bank." Also one or more these three digits may be used differentiate between two different words that have the same meaning. For example, "Cape Canaveral" in the third row and "Cape Kennedy" in the fifth row mean the same geographical location; hence they are identified by the same 6-digit head identifier—"085873."However, the decimal digits distinguish "Cape Canaveral" which is "0.000" from "Cape Kennedy" which is distinguished by decimal "001."

FIG. 3B is an example of the GUI in FIG. 3A which filtered results based on the 6-digit head CNI "001257". The GUI 320 displays the words "able" and "capable" which are synonyms in the Conceptual Index Dictionary. As illustrated the head portion 308 of both CNIs is the same value "001257" while the Tail Portions 310 of both CNI are different values or "0.000" and ".001" respectively for each word. In this fashion each word has its unique CNI but the heads of both CNIs can group synonyms which are words with identical meanings.

It is appreciated by those skilled in the art that GUI 300 of FIG. 3A is a formatted display of a Conceptual Index Dictionary and that while all of the data displayed in the columns of FIG. 3A are stored in the Conceptual Index Dictionary, the data may be stored in different formats or sequences. For example, CNIs may be stored as a single arithmetic value without a decimal point and the alphanumeric identifier of column 312 may be stored solely as a numeric value that is converted to the appropriate alphanumeric identifier.

Figure 4:
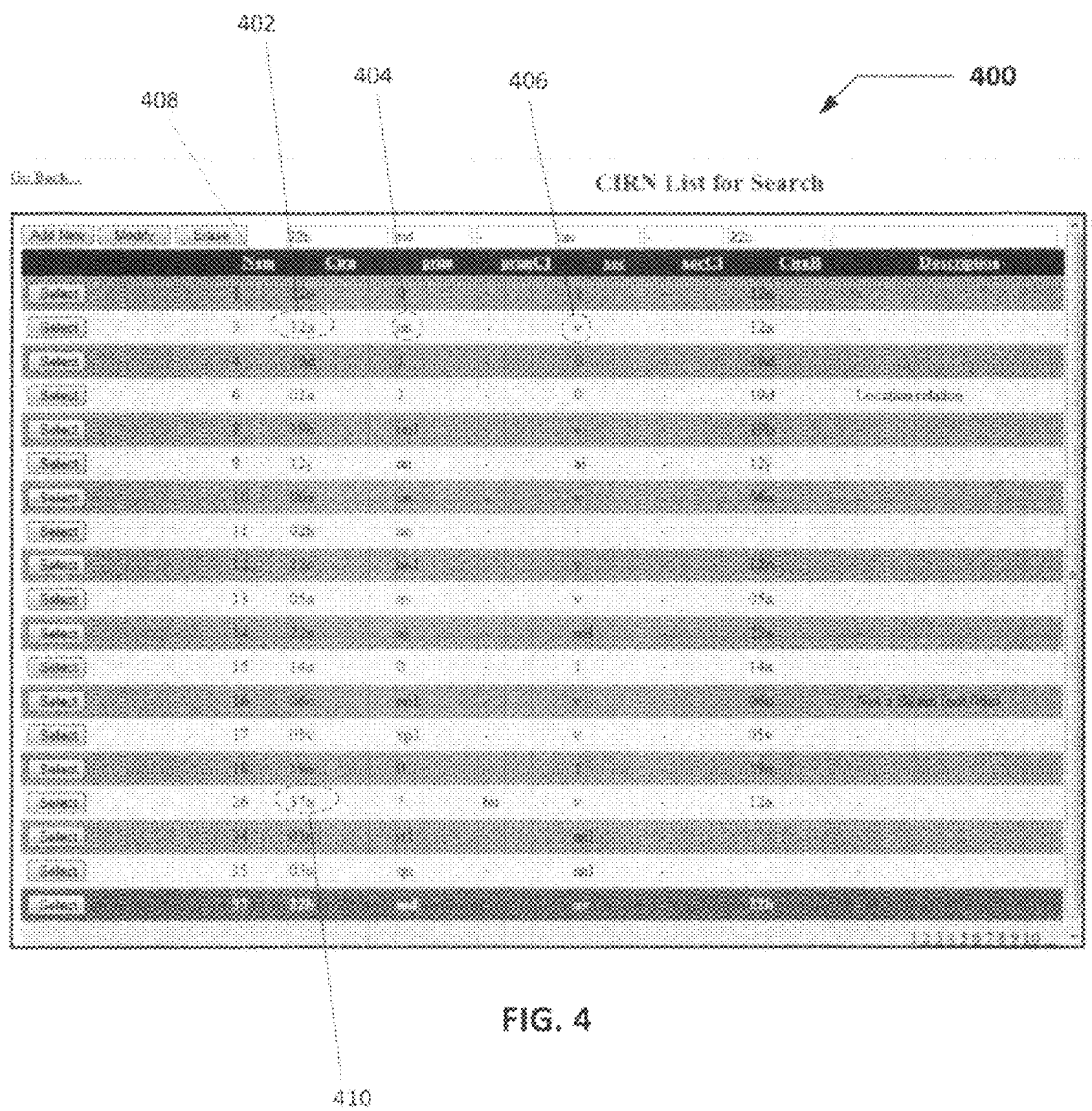
FIG. 4 is a depiction of a GUI displaying a formatted portion of an example of a CET Logic (Rules) database in accordance with the present invention as shown in FIG. 1.

FIG. 4 is a depiction of a GUI 400 displaying a formatted portion of an example of a CET Logic (Rules) database in accordance with the present invention as shown in FIG. 1. GUI 400 displays a partial list of CIRN rules that may be found in a CET Logic (Rules) database. Column 402 of GUI 400 contains a list of the numbers that each identifies a type of CIRN rule, for example, rule 12a in the second row of GUI 400. Columns 404 and 406 of GUI 400 identify the type of conceptual element found in the first or primary portion of CET formed under rule 12a, and the secondary portion, respectively. In row 2 of GUI 400, under rule 12a, the primary element of the CET is an "nn" element, which is a noun, and the secondary element in the CET is a "v" element, which is a verb. Under the column Num 408, the 26th CIRN named 37a 410 identifies the elements involved in a question such as "Who laughed?" The first element is the question or variable "who" and the second element is "verb." Also, under column CirnB we can see the CIRN (12a) that the system will use to match the CIRN 37a.

Figure 5:
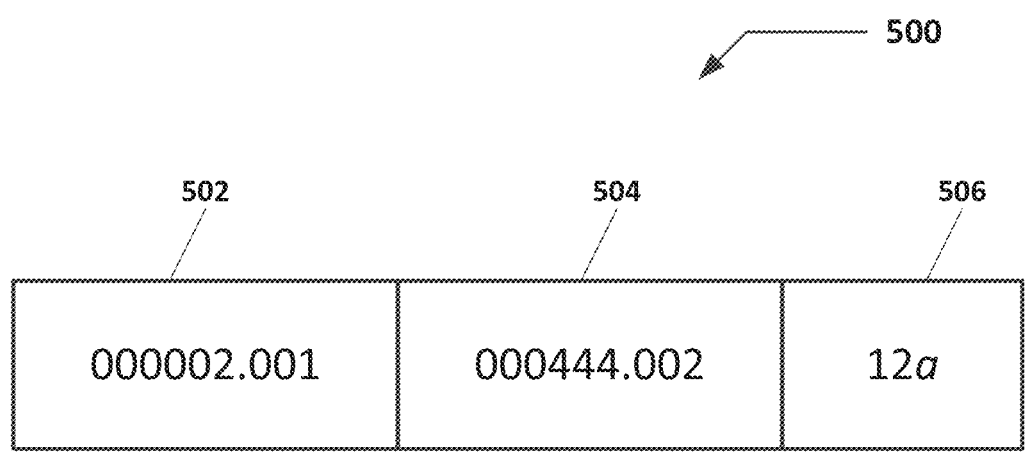
FIG. 5 is a schematic depiction of an example of an index associated with an indexed pair in accordance with the present invention.

Turning to FIG. 5, a schematic depiction of an example of a CET in accordance with the present invention is shown in FIG. 1. A pair of CNIs associated with words is represented by a numerical representation 502 and 504. In the current example, the first CNI 502 is that of a word with a meaning represented by "2" with a text form associated with "0.001" and second CNI 504 is that of a word with meaning 444 with the text form associated with "0.002". Both CNIs are associated or grouped by CIRN rule 506, "12a" in the current example. The numerical representation of the words by CNIs may originate from the Conceptual Index Dictionary (160 FIG. 2) that has predetermined associations between words and numerical identifiers or representation (i.e. CNIs).

Figure 6:
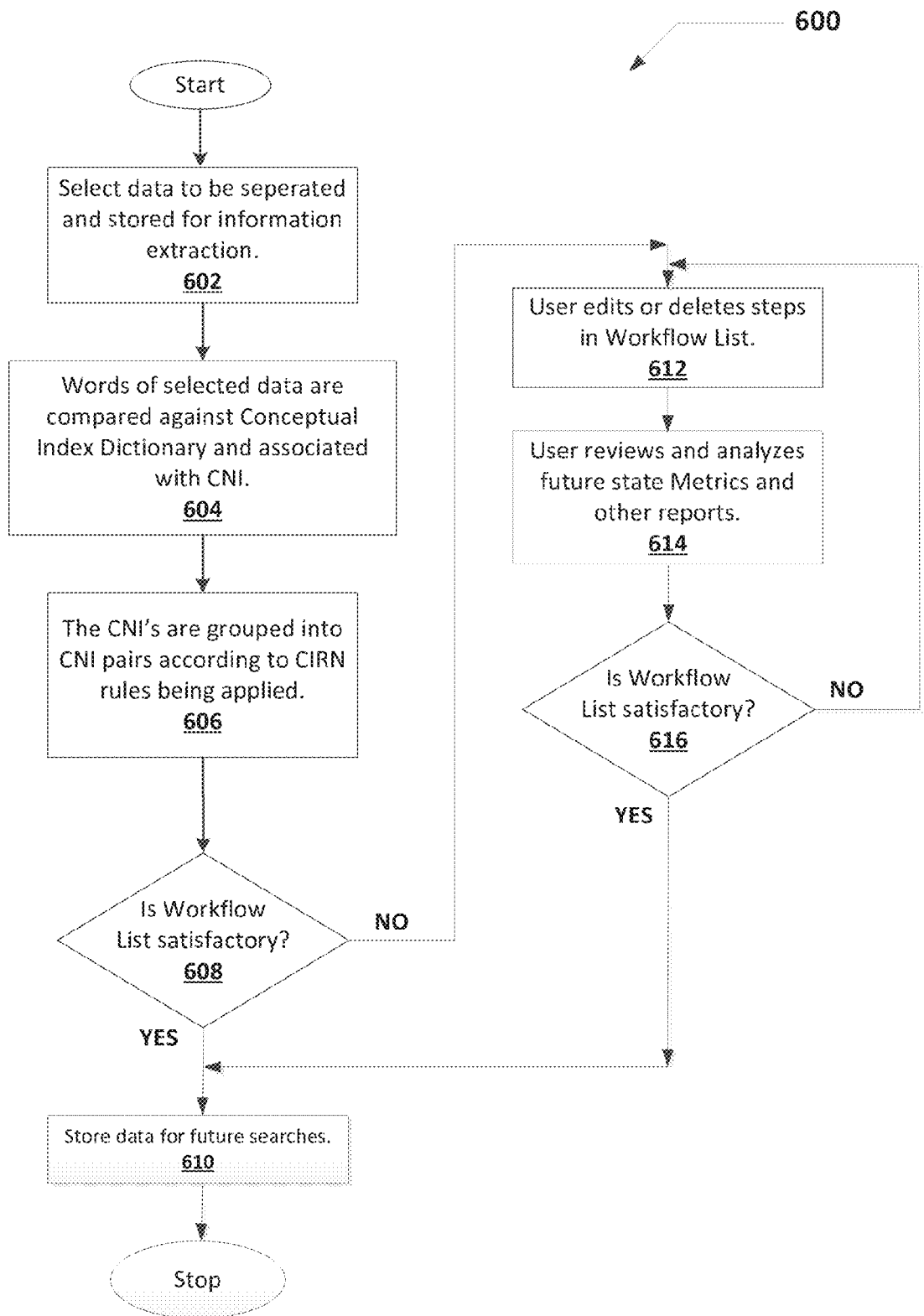
FIG. 6 is a flow diagram of an approach for using a system for grouping and extracting information from data corpora in accordance with an example implementation of the present invention.

Turning to FIG. 6, a flow diagram of a method of using a system for grouping and extracting information from data corpora in accordance with an example implementation of the present invention is shown. The approach starts in step 602 with the data, such as text separated into grammatical units, such as sentences. In step 604, the separated data is then subdivided and categorized via a conceptual index dictionary and associated CNI. The results of the associated CNIs are further processed according to CIRN rules 606. If the results are satisfactory in step 608, then results may be stored in a database as processed data for future searches in step 610. Otherwise in step 612, associations and associated CNIs may be edited or deleted to resolve non-grouped CNIs or other ambiguities. The results of the associations may then be viewed along with metrics in online and/or report formats in step 614. If the results are satisfactory in step 616, then results may be stored in a database as processed data for future searches in step 610. Otherwise in step 612, associations and associated CNIs may be edited or deleted again or further refined. Once the initial data has been stored in step 610, it may be queried or searched. The search or query is processed in a similar manner as the initial data using the conceptual dictionary.

Turning to FIGS. 7A-7D, schematic depictions of an example of a process of answering a question using a query of a database in accordance with the present invention are shown. This process may be performed by the Extraction Logic module 310 of FIG. 2, operating on Tallied Indexed CETs database 320. FIGS. 7A-7C are schematic depictions of the three different groups of CETs 700, 702, 704, in the format as described in FIG. 5, associated with three sentences stored in the Tallied Indexed CETs database 320. With the first sentence 700, "John called Tom," a CNI from the conceptual index dictionary for "John" is determined by the processor to be 100.123; for "called" 500.123, and a rule 12a from CET Logic (220, FIG. 1) (see 506 for an explanation of rule 12a) formed the CET of "John" and "called." A CNI from the conceptual index dictionary is also identified by the processor for "Tom" 300.123 and a CET of "Tom" and "called" is identified by rule 06a (see FIG. 4) as a noun that is being acted upon by the verb or in other words, the object noun of the transitive verb.

Similarly, in FIG. 2B the second sentence 702; "Mary called Tom" is processed by a processor and CNIs from the conceptual index dictionary are assigned and a group is made according to the rules that have been defined. The CNI for "Mary is 312.123 and "called" is 500.123, which are grouped via rule 12a. Similarly, the CNI for "Tom" is 300.123 (note that this is the same as in 700) and "called" is again 500.123, which are grouped via rule 06a. In FIG. 3C the third sentence 704, "Tom called Mary" is similarly processed with the CNI for "Tom" being 300.123 and "called" being 500.123 grouped via rule 12a, and rule 06a grouping CNI for "Mary" which is 312,123 and "called," which is 500.123. Once all the data has been processed using the conceptual index dictionary, query of the processed data may be made.

For example, in FIG. 7D, a query 706 "who called Mary?" is processed using the conceptual index dictionary. The variable "who" is identified, and the CNI for "called" is identified 500.123. The relationship between the variable "who" and "called" is identified as meeting rule 12a's requirements, while rule 06a was identified as being associated with the CNI of "Mary" 300.123 and the CNI for "called" 500.123. Thus, rather than searching large sets, independent CNIs or CETs may be searched rapidly to see what associations matches the rules and CNIs of the query 706. The results or answer 708 is shown in FIG. 7E where the function "who" is matched to any CNI that is grouped with the CNI of human which is fulfilled by the CNI of "Tom" 300.123. This demonstrates how CNIs, CETs and rules are used to efficiently find matches and retrieve data. This is in contrast to traditional approaches that resort to word or pattern matching data of original documents or inputted text, or using multiple indexes of the data or text of the original documents.

In operation, a processor or controller executes a process performed by the Extraction Logic module 310, and the CB-DCE system 100 may process the query 706 against the Tallied Indexed CETs database 320, which includes, among others, CETs 700, 702, 704. The Extraction Logic module 310 is able to answer the query by matching CETs 706 against CETs 704, giving the answer in the form of CNI 300.123 or its corresponding word "Tom". The Extraction Logic module 360 may then output the answer in the form of output 400 of FIG. 2.

Figure 8A:
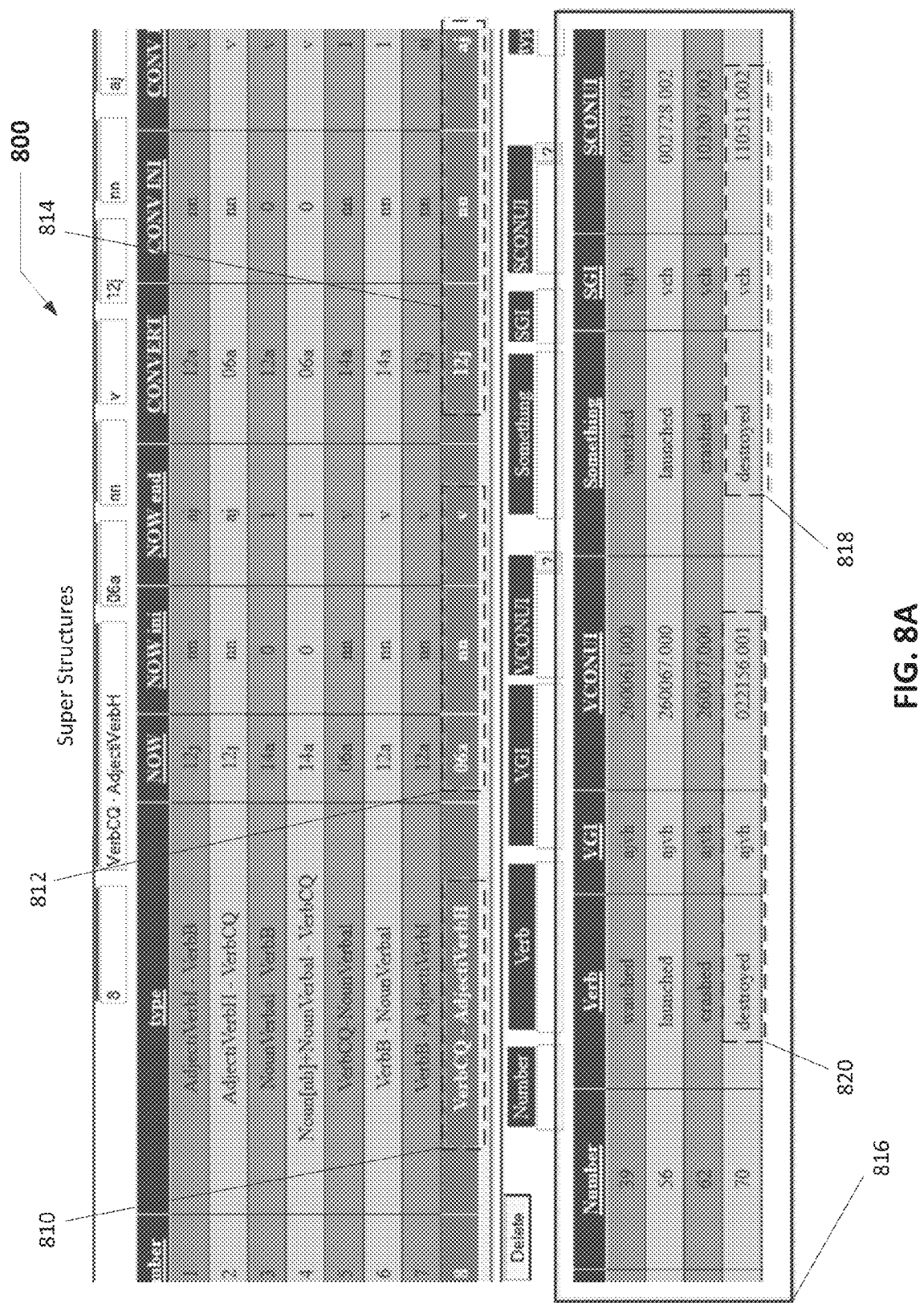
FIG. 8A is a diagram of "Super Structures" sored in the Conceptual Dictionary of FIG. 2 in accordance with the present invention as shown in FIG. 1.

Turning to FIG. 8A, a diagram 800 of "Super Structures" stored in the Super Structures Database (375, FIG. 1) in accordance with the present invention as shown in FIG. 1. In many of the world's languages, including English, verbs have adjective-forms and noun-forms. For example, in English dictionary as well as in the Conceptual Index Dictionary (360 FIG. 1), the word "destroyed" is a verb and an adjective. The description of the adjective-form "destroyed" relates to the verb "destroyed" (the verb in past tense). In similar fashion, other words like "walking" have three grammatical forms including, a verb (i.e., Mary is walking), adjective (i.e., walking Mary) and noun (i.e., the walking of Mary); and all these forms are semantically related to one another. Super Structures' purpose is to equate these different grammatical forms with each other. In this fashion, Super Structures can equate verbs with their corresponding nouns, and nouns with their corresponding adverbs (i.e., human and humanly), other nouns with their corresponding adjectives (i.e., emotions of humans [noun] with human [adjective] emotions) and vice versa. For example, Super Structures make a search for "the destruction of missiles" (destruction is the noun-form of the verb-form destroy) equal to a search for "destroyed missiles" (destroyed is the adjective-form of the verb-form destroy) and equal to a search for "destroyed the missiles" (destroyed is the verb-form itself).

In the diagram 800 of FIG. 8A, an exemplary Super Structure 810 is depicted which equates a transitive verb with its adjective-form. In this same row, the first group 812 is a type 06a and comprises the grammatical elements noun (the object of the verb) and the verb-form. In the same row, the second group 814 which is of type 12j comprises the previous noun (the subject of the adjective) and the adjective-form of the verb. In the Sub Table 816 in the last row, the verb 818 or "destroyed" is depicted with its CNI in association with its corresponding adjective-form 820 or "destroyed" and its CNI. In this fashion, the verb and its adjective can replace or equate each other along with their corresponding CETs.

Figure 8B:
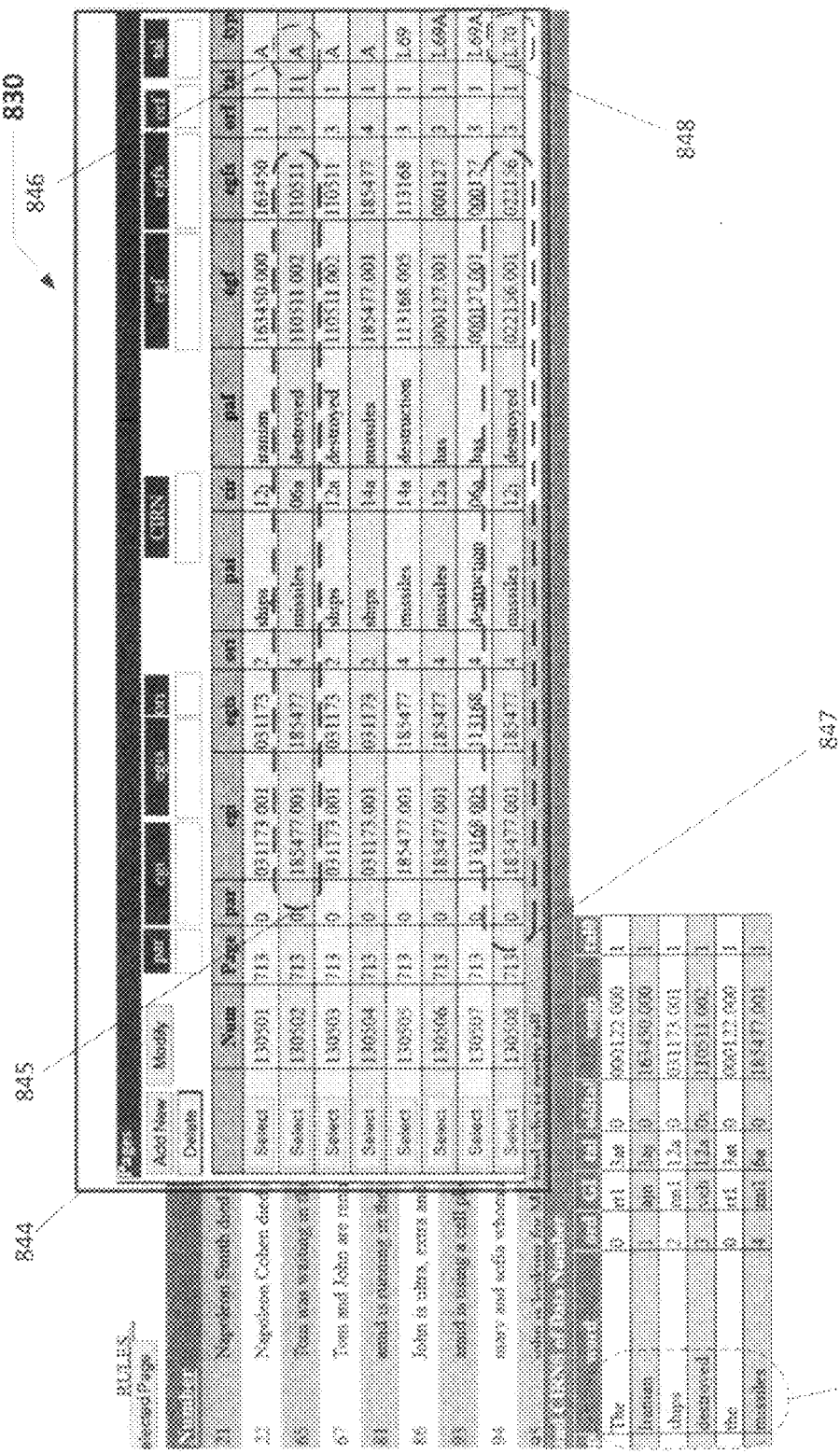
FIG. 8B is a diagram that depicts a sentence processed by Super Structures of FIG. 8A in accordance with the present invention as shown in FIG. 1.

In FIG. 8B, an exemplary GUI 830 of a sentence processed by Super Structures of FIG. 8A is depicted. The sentence 840 "the Iranian ships destroyed the missiles" is depicted vertically with each of its separated elements. The table 844 shows many CETs which resulted from processing the sentence using the present implementation of the invention in FIG. 1. The second row of table 844 shows a "06" type CET 845 that groups the CNI of missiles (the object of the sentence) and the CNI of destroyed (the verb in the sentence). In the same row, the character "A" 846 identifies this group as being original (meaning that it comes directly from the processing of the original sentence). The bottom row 847 of table 844 depicts a new CET type 12j comprising the CNI of missiles (the object from the original sentence) and the CNI of the adjective "destroyed" (the adjective form of the verb destroyed). In the same row of table 844, the last column depicts the characters "L70" 848 which identifies the CET as being the result of a corresponding Super Structure.

Figure 9A:
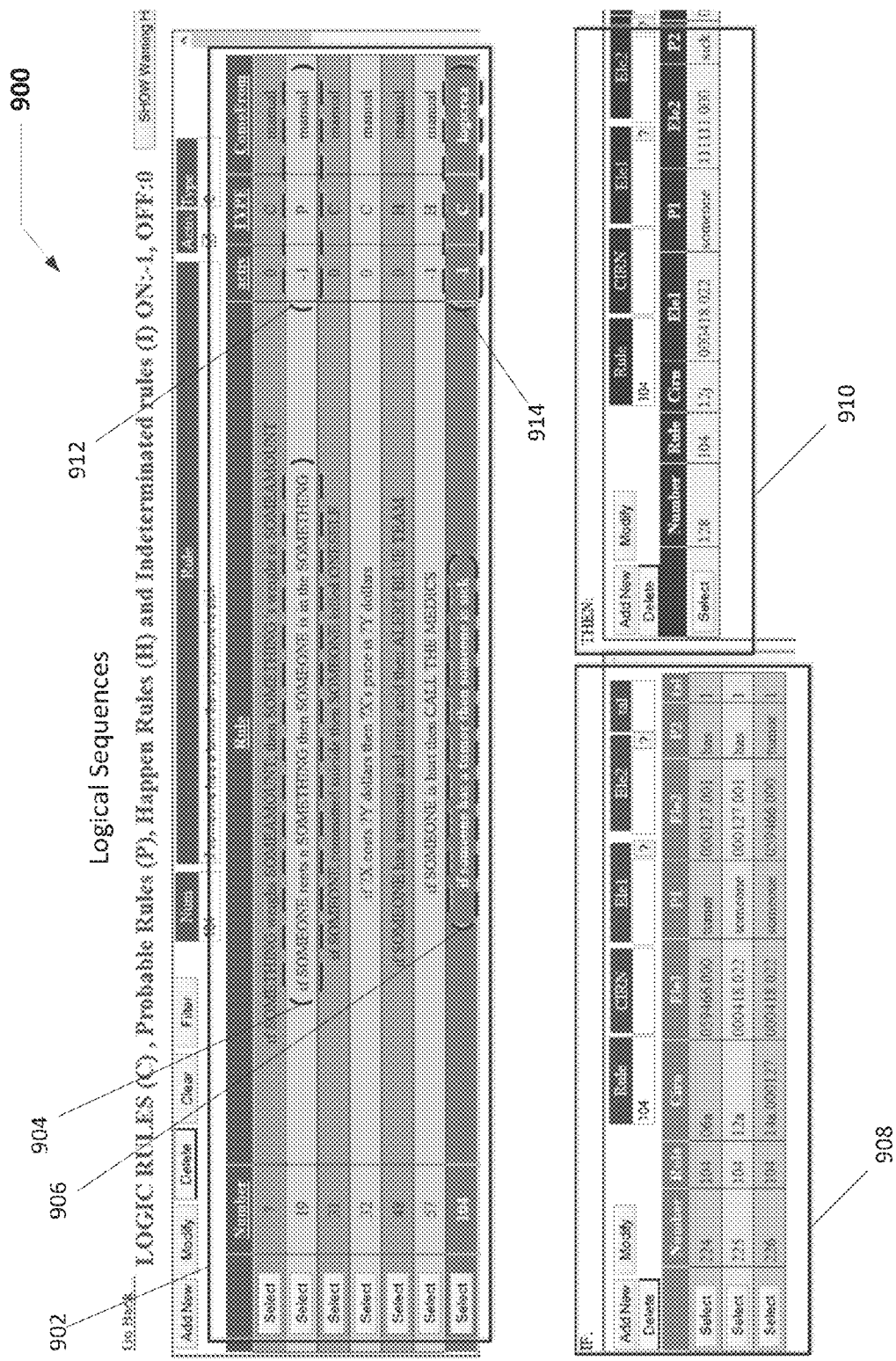
FIG. 9A is a diagram that depicts a table and sub tables of logical Sequencing CIRN rules in accordance with the present invention as shown in FIG. 1.

Turning to FIG. 9A, an exemplary GUI 900 depicts a table 902 and sub tables 908-910 that illustrate Logical Sequences (FIG. 1 380) in accordance with an example implementation. Logical Sequences, like Inductions and Deductions in the field of Logic, have the purpose of relating events in time. Notably, relating events that occur in prior time, in the present (parallel) or in the future are events that could be probable, factual or other. For example, in the second row of table 902, a Logical Sequence 904 in natural language says "if someone rents a something, then someone is in the something." In the same row in table 902, under the columns "activ, TYPE, and ComeFrom" the data 912 depicts the characters "−1, P, and manual" respectively. The character "−1" signifies that its Logical Sequence 904 is turned on, character "P" signifies that this Logical Sequence 904 is "probable," and the word "manual" signifies that this Logical Sequence 904 was generated manually by a user or externally. In the bottom row of table 902, the last Logical Sequence 906 in natural language that says "if someone has a tumor, then someone is sick." In the same row, under the columns "active, TYPE, and ComeFrom" the Data 914 depicts the characters "−1, C and logicrea" respectively. The character "−1" signifies that this Logical Sequence 906 is turned on, the character "C" signifies that this Logical Sequence 906 is factual (in contrast to the previous which was probable), and the word "logicrea" signifies that this Logical Sequence 906 was generated by the CB-DCE (100, FIG. 1) system including inferences, processed documents or others. Table 908 contains the different CETs that the sentence "if someone has a tumor" that CB-DCE (FIG. 1 100) automatically generated. Table 910 comprises the CET from the sentence "someone is sick" that the CB-DCE (100, FIG. 1) generated. In this fashion, "John is sick" becomes a logical sequence of "John has a tumor" or vice versa and the CETS of one sentence lead to the CET of the other sentence.

Figure 9B:
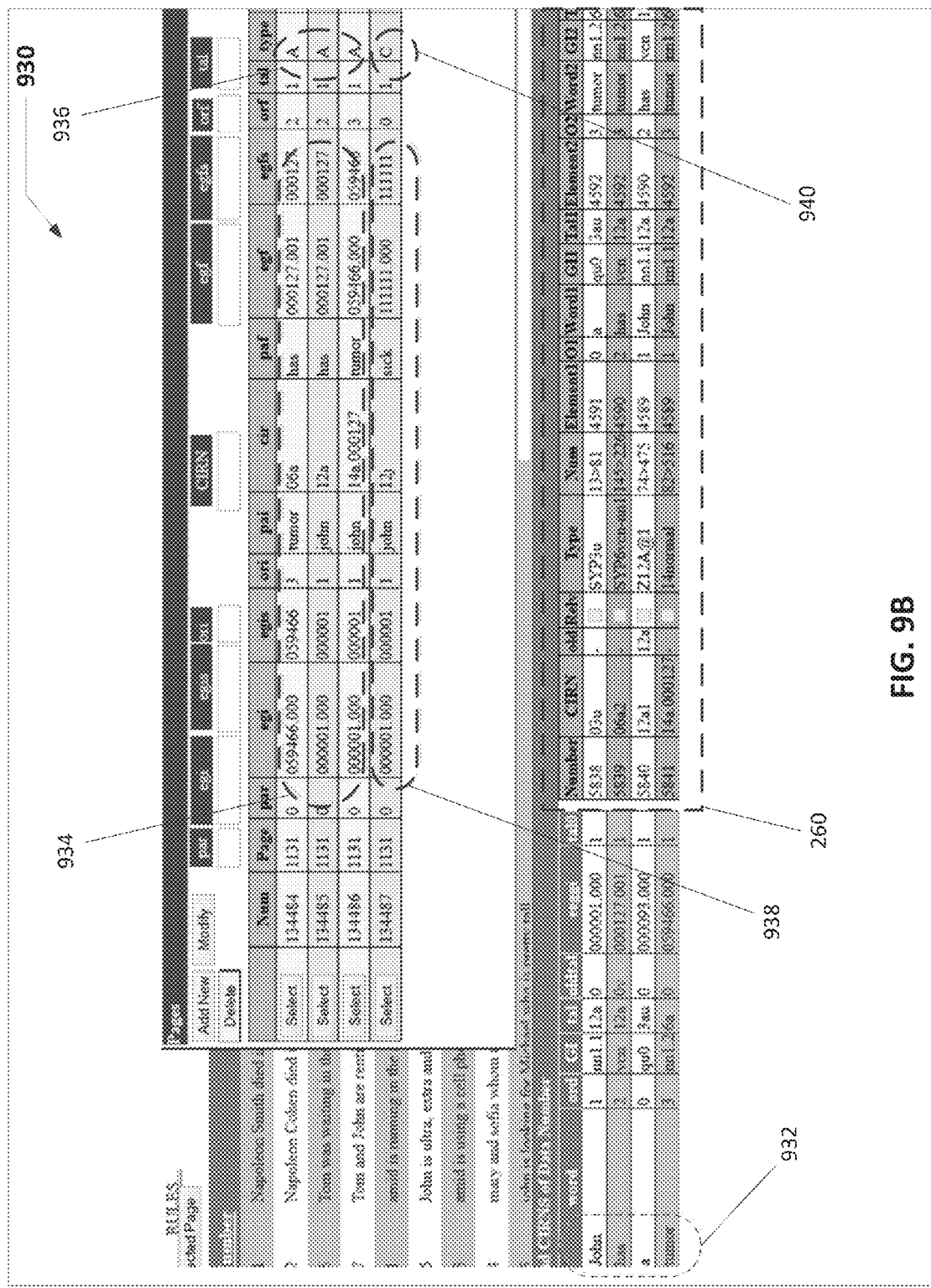
FIG. 9B is a diagram that depicts a document that was processed by Logical Sequences in accordance with the present invention as shown in FIG. 1.

Turning to FIG. 9B, an exemplary GUI 930 of a document that was processed by "Logical Sequences" of the CB-DCE system (100, FIG. 1) in accordance with the present invention is depicted. The original sentence "John has a tumor" 932 is displayed vertically; its elements have been processed by the sentence formation module (140, FIG. 1) and conceptualization module (150, FIG. 1) with the CNIs and other information being identified. The entries in Table 934 depict the CETs that have been derived from the original sentence. The entries in Table 260 depict the optional Indexed CETs Database 260 that was derived from the original sentence, including the first CET 03u which was deleted from Table 934. The groups' additional data "TYPE" 936 identifies all these CETs with the letter "A." The letter "A" signifies that these CETs originate from the original sentence. The logical sequence CET 938 was created by the "Logical Sequence" 903 from FIG. 9A (or 380, FIG. 1). In the same row, the CET's additional data 940 depicts the character "C." The character "C" signifies that this CET is factual. It is factual because if "John has tumor", then it is factually deductible that "John is sick". Thus, the logical sequence of "John has tumor" is "John is sick."

Figure 9C:
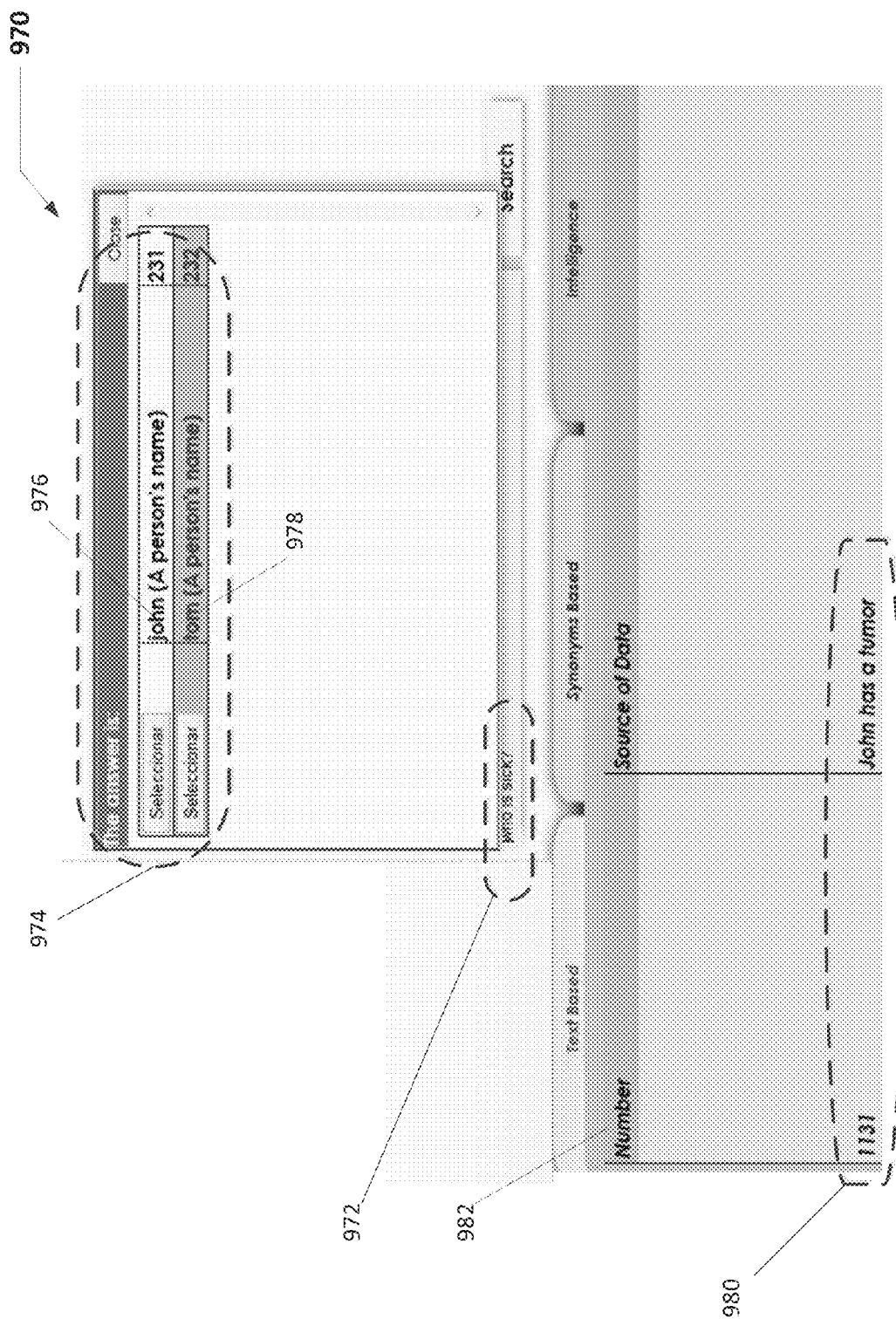
FIG. 9C is a diagram that depicts a graphical user interface (GUI) asking a user the Question "who is sick?" in accordance with the present invention as shown in FIG. 1.

In FIG. 9C, an exemplary GUI 970 of an interface answering the user's question "who is sick?" 972 is depicted in accordance with the present invention shown in FIG. 1. The Answer GUI 974 depicts two answers "John" 976 and "Tom" 978. Selecting "John" displays the Support GUI 980 that contains the documents that supports the answer "John is sick." As illustrated by FIG. 9C, the document has an identifying number under the column 982. The assigned identifying numbered or "1131" was assigned by the CB-DCE system (100, FIG. 1) when it processed the document that mentioned "John has a tumor."

Figure 10A:
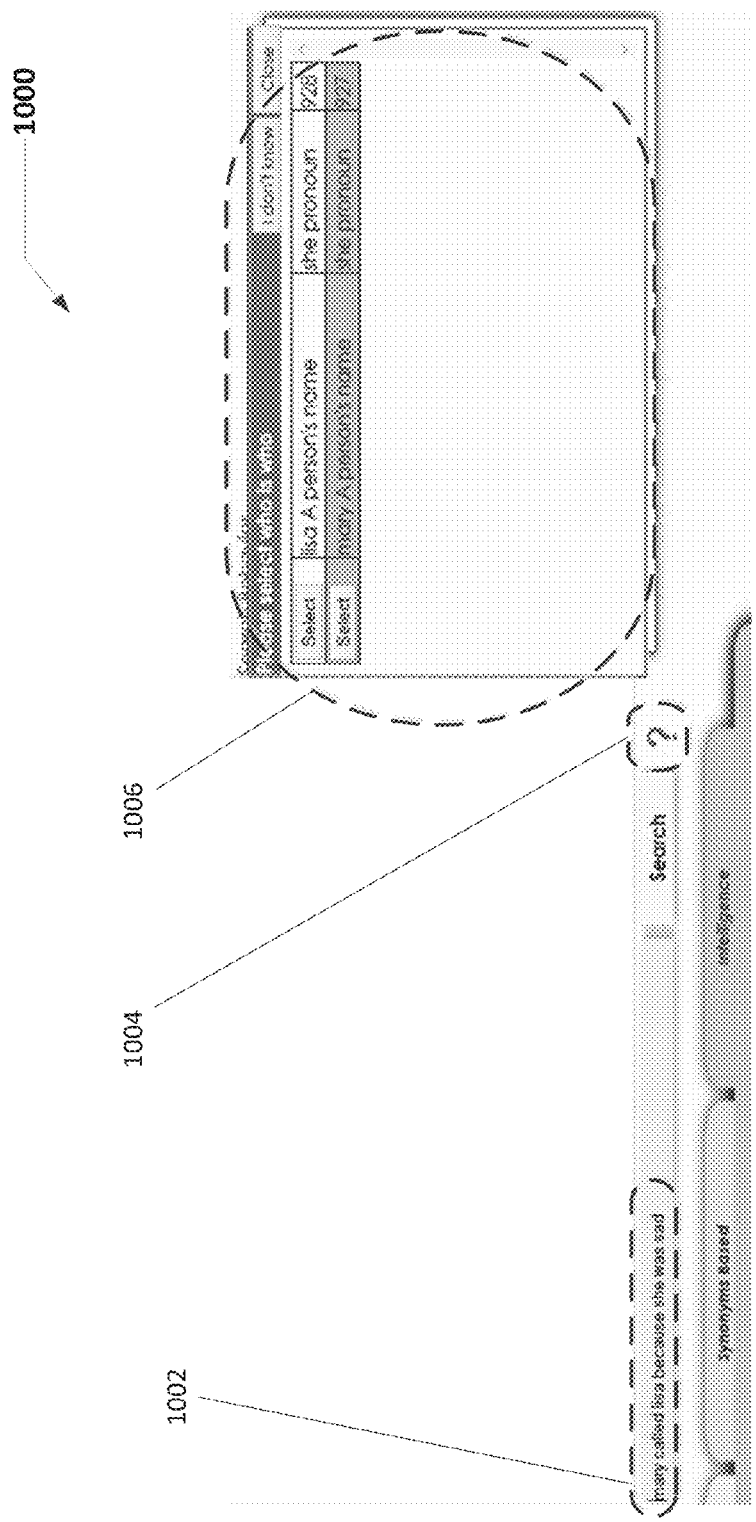
FIG. 10A is a diagram that depicts Pronoun Resolution in an ambiguous query in accordance with the present invention as shown in FIG. 1.

Turning to FIG. 10A, an exemplary GUI 1000 asking the user for Pronoun Resolution in an ambiguous query in accordance with the present invention as shown in FIG. 1 is depicted. The Ambiguous Query "Mary called Lisa because she was sad" 1002 is ambiguous because it is not clear who is sad (Mary or Lisa?). The Optional Warning Symbol "?" 1004 may alert the user of CB-DCE system 100 of the ambiguity of the pronoun. The Disambiguation GUI 1006 enables the user to select who "she" is in the ambiguous query or sentence. For example, selecting the "Lisa" option makes "she" a pronoun of "Lisa" and not Mary." As a result, the input (397 FIG. 1) allows the system to know that "she" is referring to Lisa. In contrast, by selecting the other option "Mary," makes "she" a pronoun of "Mary."

Figure 10B:
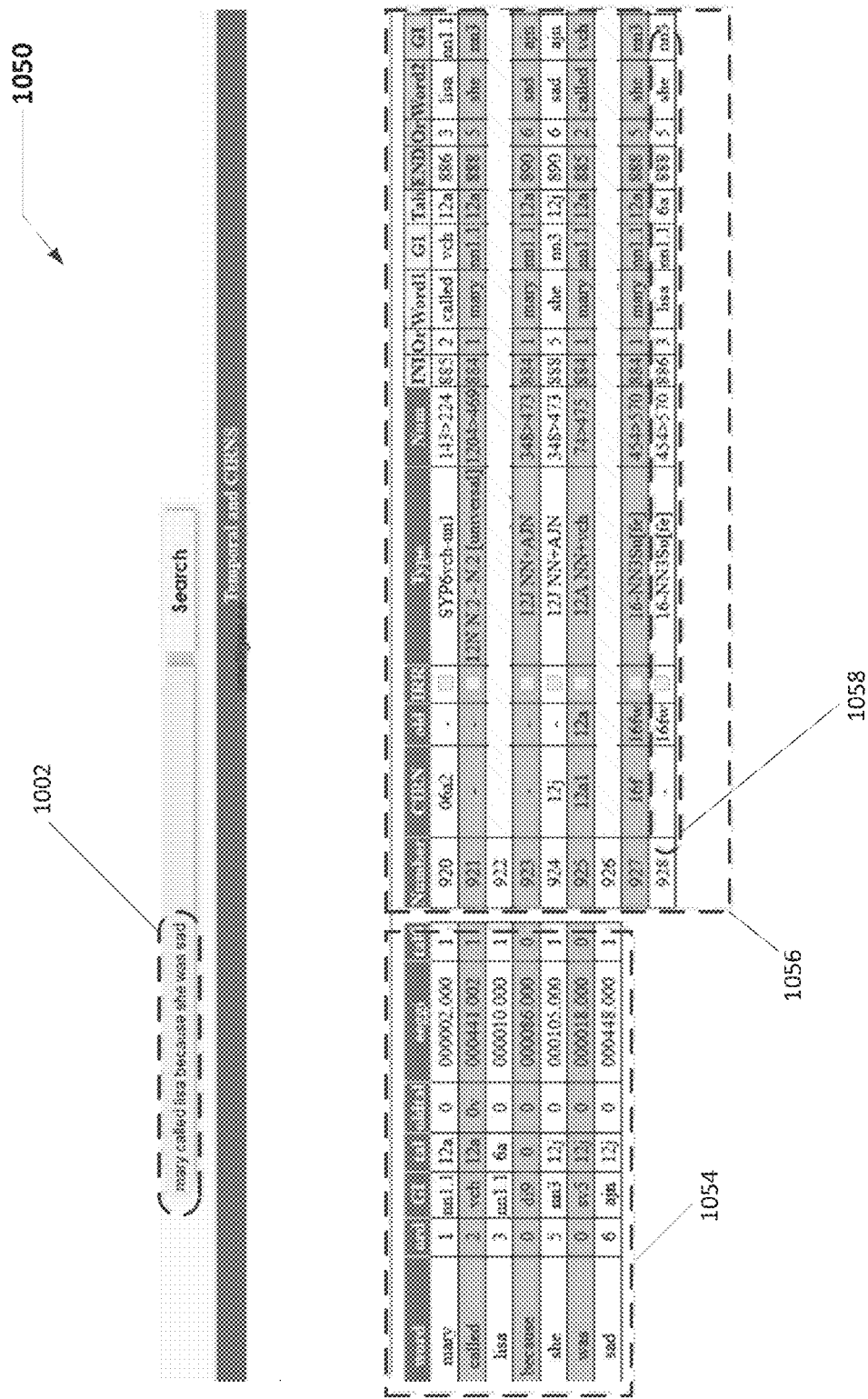
FIG. 10B is a diagram that depicts the processed Ambiguous Query of FIG. 10A in accordance with the present invention as shown in FIG. 1.

In FIG. 10B, an exemplary GUI 1050 of the processed Ambiguous Query 1002 of FIG. 10A in accordance with the present invention as shown in FIG. 1 is depicted. In this example, the user selected the option that "she" is a pronoun for "Mary." Table 1054 depicts vertically the different element of the Ambiguous Query 1002. The CETs Table 1056 depicts the different CETs that were created including an Erased Disambiguated CET 1058 which was removed after the selection of "she is Mary."

Figure 11:
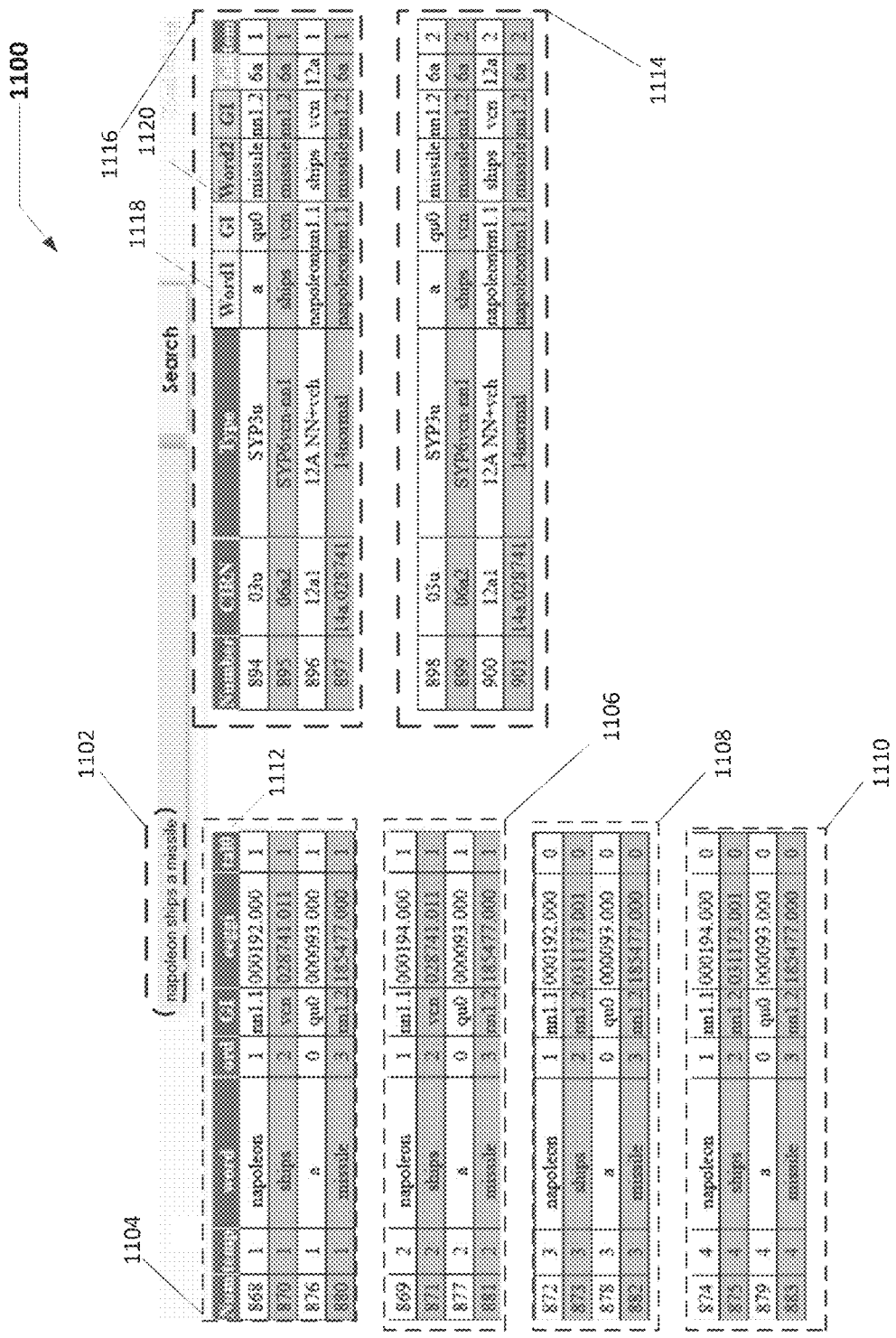
FIG. 11 is a diagram that depicts the disambiguation of a query in accordance with the present invention as shown in FIG. 1.

Turning to FIG. 11, an exemplary diagram 1100 of the disambiguation of a query in accordance with the present invention as shown in FIG. 1 is depicted. The Ambiguous Query "Napoleon ships a missile" 1102 is ambiguous because: a) "ships" can signify the vessels or the action of shipping; and b) "Napoleon" can signify the French Emperor or another person that is not the Emperor. As a result, the CB-DCE system 100 creates four different querying permutations. The first query permutation 1104 involves "ships" as a verb (CNI 028741.001) and Napoleon (CNI 000192.000) as the Emperor of France. The second query permutation 1106 includes "ships" as the verb (CNI 028741.001) and "Napoleon" (with CNI 000194.000) as a person but not the Emperor of France. The third query permutation 1108 involves "ships" (CNI 031173.001) as vessels and Napoleon (CNI 000192.000) as the Emperor of France. The Fourth Query permutation 1110 involves ships (CNI 031173.001) as vessels and Napoleon (CNI 000194.000) as a person that is not the Emperor of France.

In the first query permutation 1104, under the column "tal0" 1112 the character "1" is the tally which is displayed in every row to the right of each corresponding CNI. This means that all the CETs of the First Permutation Cets 1116 are interconnected implementing the CNIs. Consequentially, this particular permutation is understandable or it is grammatically correct. For example, in the first query permutation 1104 the CNI 000192.000 (Napoleon the Emperor) is grouped with CNI 028741.011 (ships as verb) according to the CET type 12a1 in the First Permutation Cets 1116. Additionally, the CNI 028741.011 (ships the verb) is also grouped with CNI 185477.000 (missile) according to the CET type 06a2 in the First Permutations Cet 1116. Also, the CNI 185477.000 (missile) is grouped with the CNI 000093.000 (the preposition "a") according to the first CET type 03u in the First Permutations Cet 1116. Accordingly, if a CNI is tallied "1" and the CETs are used to identify the next CNI to be tallied, and these tallied CNIs are used to identify the same CNIs in other CETs, causing all CNI to be tallied. As a result, because all CNIs of the permutation were tallied, the First Query Permutation 1104 is understandable or valid.

The Second Query Permutation 1106 also shows, under the "Tal0" 1112 column, the character "1" meaning that this permutation or this query (using the ships as verb and napoleon as a person—not the emperor) is also understandable and valid. The Second Permutation CETs 1114 contain all the CETs that the Second Query Permutation 1114 had created. Like the analysis performed in the First Query Permutation 1104, the same analysis is performed for the Second Query Permutation 1106. Using the CETs in the Second Permutation CETs 1114 and tallying each CNI with the character "1" as other CNIs in the CETs are identified, the tallying procedure annotates every CNI with "1". This means that the Second Query Permutation is also understandable or grammatically correct. However, the Third Query Permutation 1108 and the Fourth Query Permutation 1110 depict, under in the column "tal0" 1112 the number "0." This means that although some CETs were formed by CIRN Rules, these CETs were not fully interconnected via CNIs, hence the reason why they don't show corresponding permutation CETs. Consequentially, both of these permutations are not understandable or are grammatically incorrect. Therefore the Third Query Permutation 1108 and the Fourth Query Permutation 1110 are discarded or saved in the Non-Tallied Pairs Database (340, FIG. 1). As a result, the queries that can be understood or are grammatically correct may be used to retrieve matching data from the Tallied Indexed Cets Database (320, FIG. 1).

Figure 12:
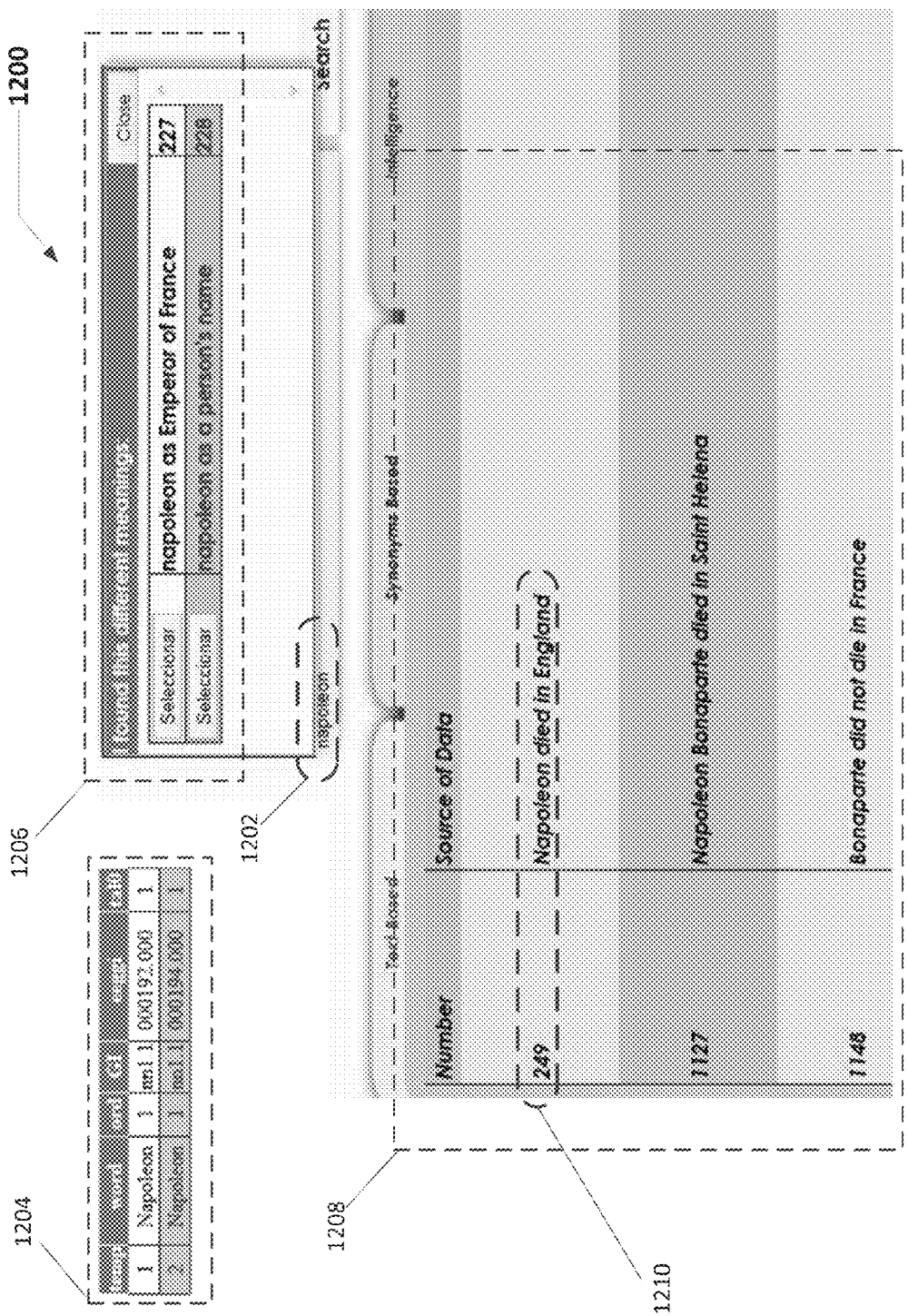
FIG. 12 is a diagram that depicts results in a Query Meaning graphical user interface of a search of a word that has multiple meanings in accordance with the present invention as shown in FIG. 1.

In FIG. 12, an exemplary diagram 1200 that depicts results in a Query Meaning 1206 graphical user interface of a search of a word that has multiple meanings in accordance with the present invention in FIG. 1 is shown. Similar to the example depicted in FIG. 11, in FIG. 12 the query, instead of an entire sentence, only involves a single word that has several meanings. The Ambiguous Query "Napoleon" 1202 creates the Multiple Query Table 1204 which comprises two different CNIs or meanings for Napoleon as describe in the Conceptual Index Dictionary (160, FIG. 1). As a result, the GUI Query Meanings 1206 is displayed. In this particular example, the searched results default to the meaning of the first CNI 000192.000 (French Emperor). Consequentially, the Selected Meaning Results 1208 displays all those documents wherein the word "Napoleon" signifies the French Emperor and not the other "Napoleon" (not the Emperor). In this fashion, selecting a meaning creates an input (397 FIG. 1) that allows the CBDEC system 100 to display results comprising the corresponding meanings. For Example, in the Selected Meaning Results 1208, the First Document 1210 displays the word "Napoleon." Without prior indication by the GUI Query Meanings 1206, it would be difficult for a reader to acknowledge that this Napoleon is describing the Emperor and not another person. This leads to the FIG. 13A and FIG. 13B, wherein the CB-DCE system 100 prompts a user to identify which "Napoleon" is mentioned in the identified sentence.

Figure 13A:
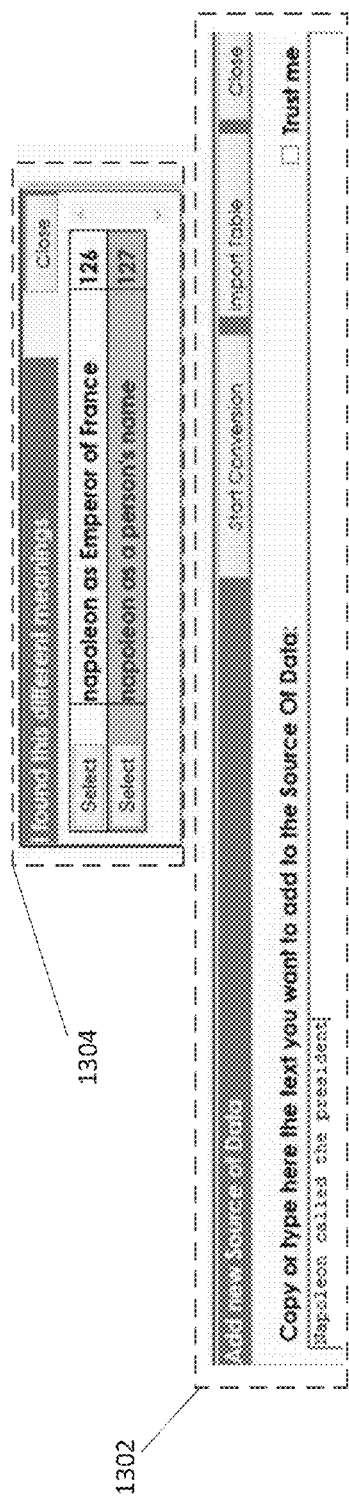
FIG. 13A and FIG. 13B are diagrams that depict the entry of ambiguous data in accordance with the present invention as shown in FIG. 1.
Figure 13B:
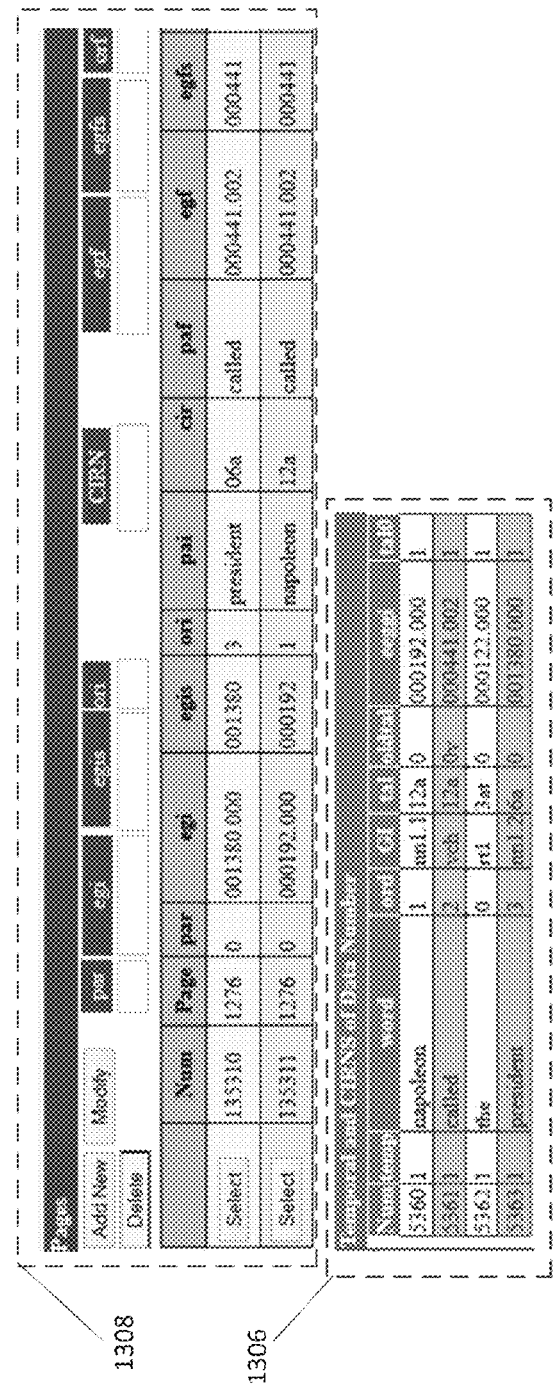

Turning to FIG. 13A and FIG. 13B, exemplary diagrams of ambiguous data entry in accordance with the present invention as shown in FIG. 1 are depicted. FIG. 13A depicts the Add New Source of Data GUI 1302 which as illustrated, contains the sentence "Napoleon called the president." This sentence is ambiguous because "Napoleon" has two different noun meanings (the Emperor and the non-emperor), and both meanings can be correct (both meanings of napoleon have created CETs that have interconnected and proved that both meanings are grammatically correct). Accordingly, the Select Meaning Entry GUI 1304 is displayed which prompts a user to select which meaning of "Napoleon" will be entered. In this fashion, the input (397 FIG. 1) of the selection allows the CB-DEC system 100 to choose which CNI or meaning would be entered. To exemplify the new data entry, in the following FIG. 13B it will be assumed that the user selected the meaning of "Napoleon" to be the Emperor of France.

In FIG. 13B, the Selected Meaning Permutation 1306 vertically displays the sentence "napoleon called the president" which the user had selected after the Select Meaning Entry GUI (1304, FIG. 13A) prompts the user the select a meaning for napoleon. As illustrated, the Selected Meaning Permutation 1306 comprises the CNI 000192.000 which corresponds to napoleon as the Emperor of France. The Document Table 1308 illustrates the CETs with their CNIs along with other information that was generated by the CB-DCE system 100 when the sentence "Napoleon called the president" was saved after the user answered or selected that "Napoleon signifies the Emperor."

Figure 14A:
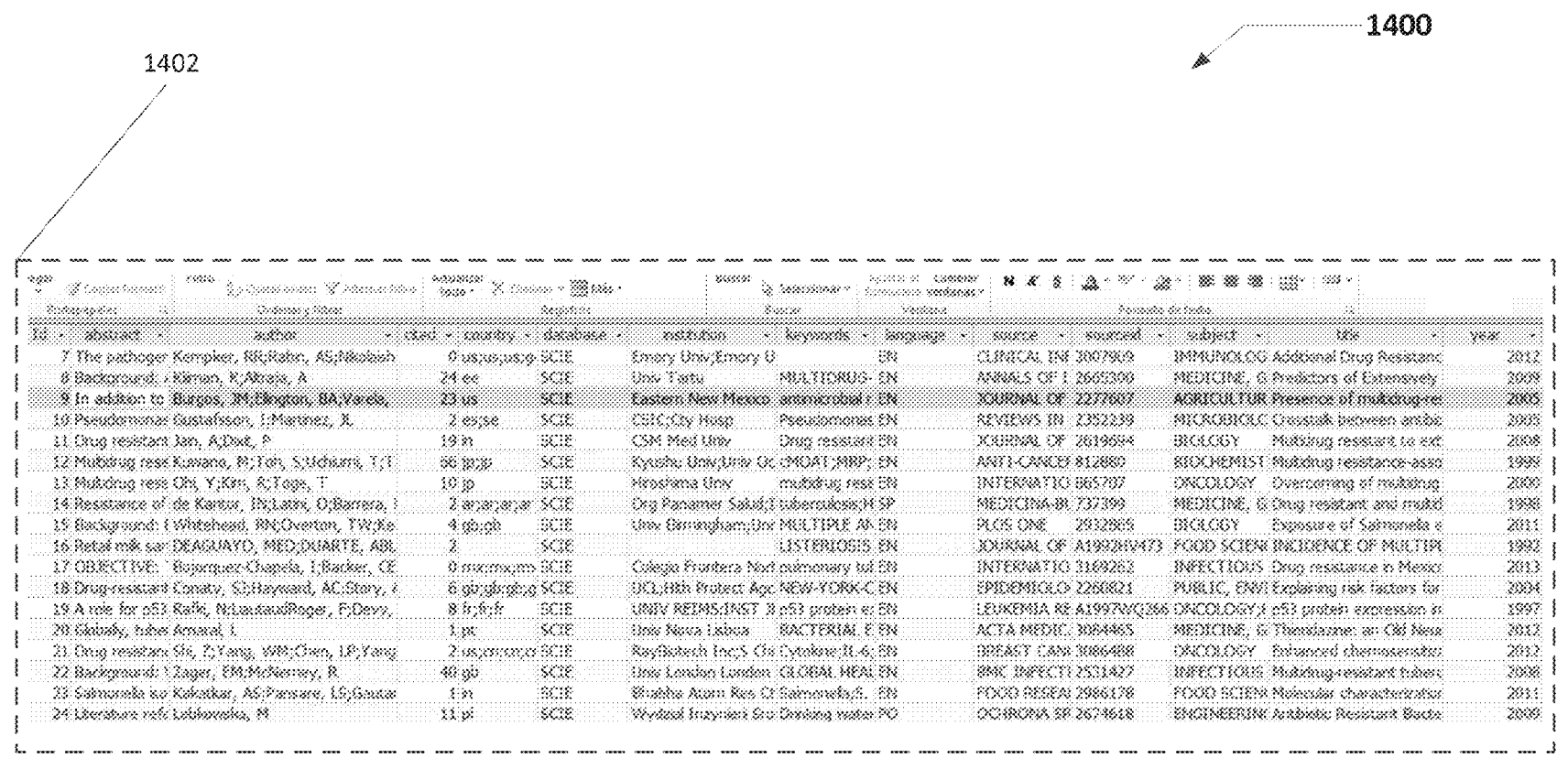
Figure 14B:
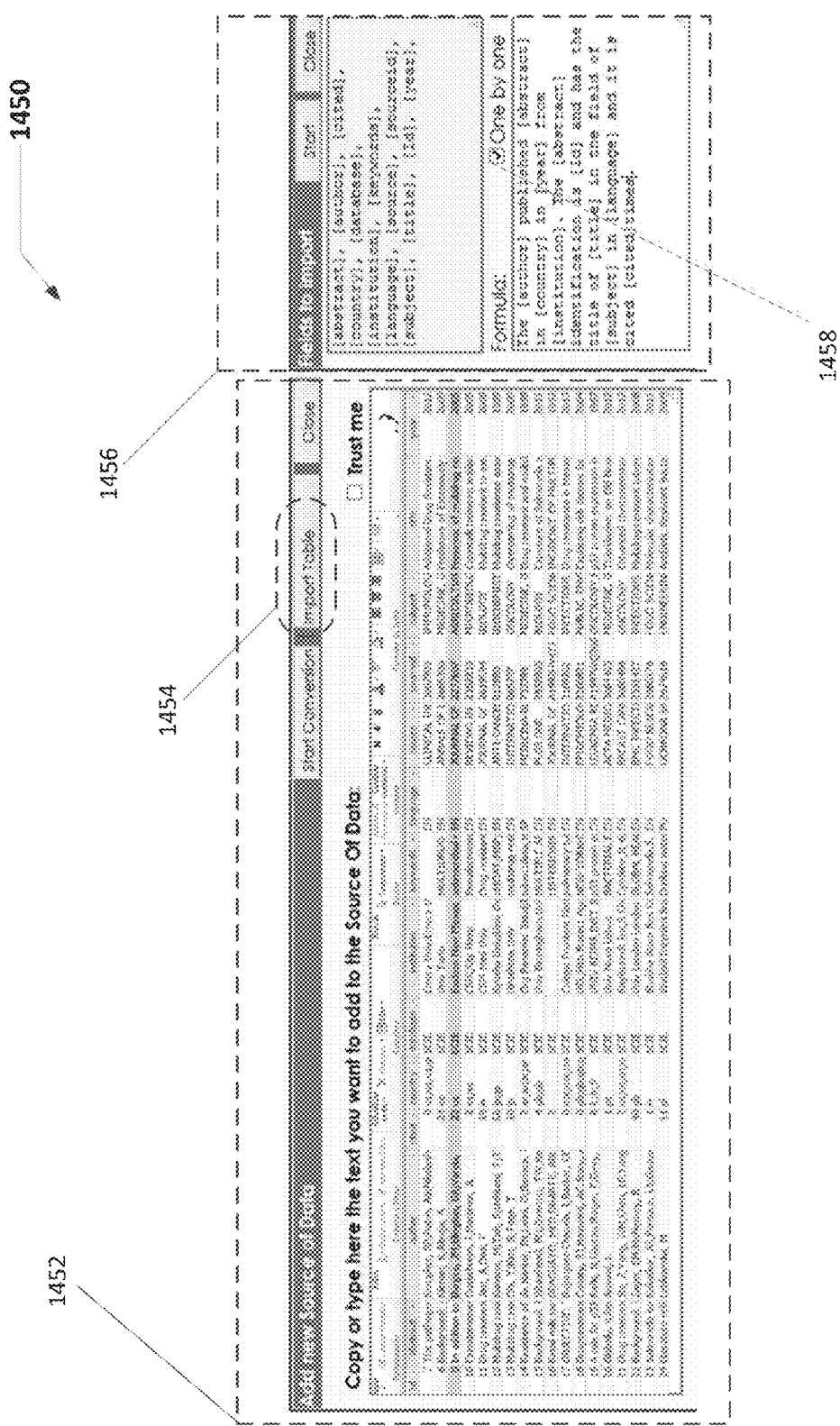
FIG. 14B is a diagram that depicts the Add New Data graphical user interface 1420 which displays the Entry Table shown in FIG. 14A in accordance with the present invention as shown in FIG. 1.

FIGS. 14A and 14B depict the entry of structured data such as a table. Turning to FIG. 14A a diagram 1400 of an Entry Table 1402 with table data that comprises many columns and many rows is depicted. In fact, this table may be considered ambiguous since many of the headings of the columns are not clear, nor the relationships that these columns may have with each other are known or comprehended. For example, the column titled "country": is it displaying the country of the institution, the country were the paper was published, or the nationality of the author?

In FIG. 14B, a diagram 1450 of the Add New Table Data GUI 1452 that displays the Entry Table 1402 shown in FIG. 14A in accordance with the present invention as shown in FIG. 1 is depicted. By optionally clicking the Import Table Button 1454 a folder containing Table 1402 (selectable by a user in the current implementation) is imputed into CB-DEC system 100. The upper section of Table Entry GUI 1456 displays the headings or titles of the columns from the table that is to be processed by the CB-DEC system 100. In the lower area or Formula section of the Table Entry GUI 1456, the user may type at least one sentence using natural language that explains the relation that exists between the different columns or headings of the table. For example, the user types several sentences into the Formula section of the GUI, including the sentence: "the [author] published [abstract] in [country] in [year] from [institution]." This exemplary Formula sentence will utilize the CNIs of every word from every corresponding column, and create several sentences in natural language for every row. The CB-DEC system 100 will later covert these Formula based sentences into their corresponding CETs which can then use to ingest the table's data. In fact, the selection of the "One by one" box 1458 allows user to stop, select, or ignore records or rows to be processed. As a result, the relationships that exist between the various columns are no longer ambiguous while allowing the Table to be queried or asked in natural language. In addition, to disambiguate the meaning of ambiguous words in different records, the CB-DEC system 100 may also check that the CNI of the category of the ambiguous word matches the CNI of the column's heading. For example, if the column heading says "machines" and the record says "ship" then the CNI of ship (the vessel) may be selected over the CNI of ship (the verb). Also, moving "One by one" allows the user to select a meaning of an ambiguous word in the event that under a heading there are several words that match the CNI of the heading. For example, under the heading "person" there is the word "napoleon" which has two meanings (CNI of emperor and CNI of person not emperor) that match the category of the heading.

Figure 15A:
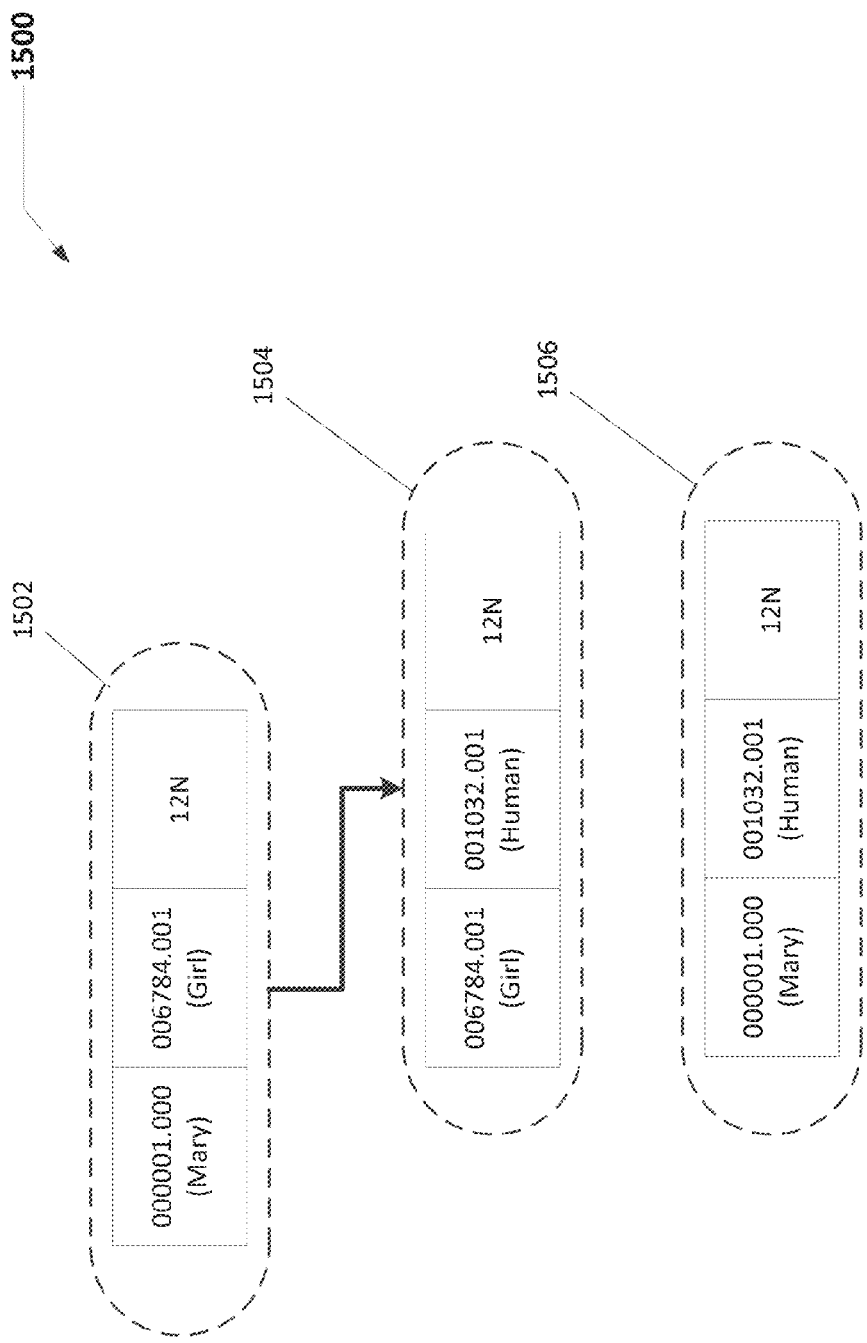
FIG. 15A is an illustration that shows multiple CNI groupings is depicted to show inferences and categorical in accordance with the present invention as shown in FIG. 1.

FIG. 15A-D shows inferences and Categorical Search. Turning to FIG. 15A, an illustration 1500 of multiple CETs 1502, 1504, and 1506 are depicted to illustrate inferences and categorical searching in accordance with the present invention. The First CET 1502 is a 12N type group comprising the CNI of the word "Mary" and the CNI of the word "Girl" which results from processing of a sentence "Mary is a girl." The Second CET 1504 is another 12N type group which resulted from processing the sentence "A girl is a human." The resulting inference or conclusion from these two CETs is displayed by the Deduction CET 1506 which in natural language would be the equivalent to: "Mary is a human." Implementing the order of the CNIs within each CET, the first CNI (Mary) of the First CET 1502 may replace the second CNI (girl) if and only if the second CNI is the first CNI in a Second CET 1504. Because this is true in the example, then the new Deduction CET 1506 is created comprising the first CNI of the First CET 1502 and second CNI of the Second CET 1504 which the CB-DEC system 100 was able to derive.

Figure 15B:
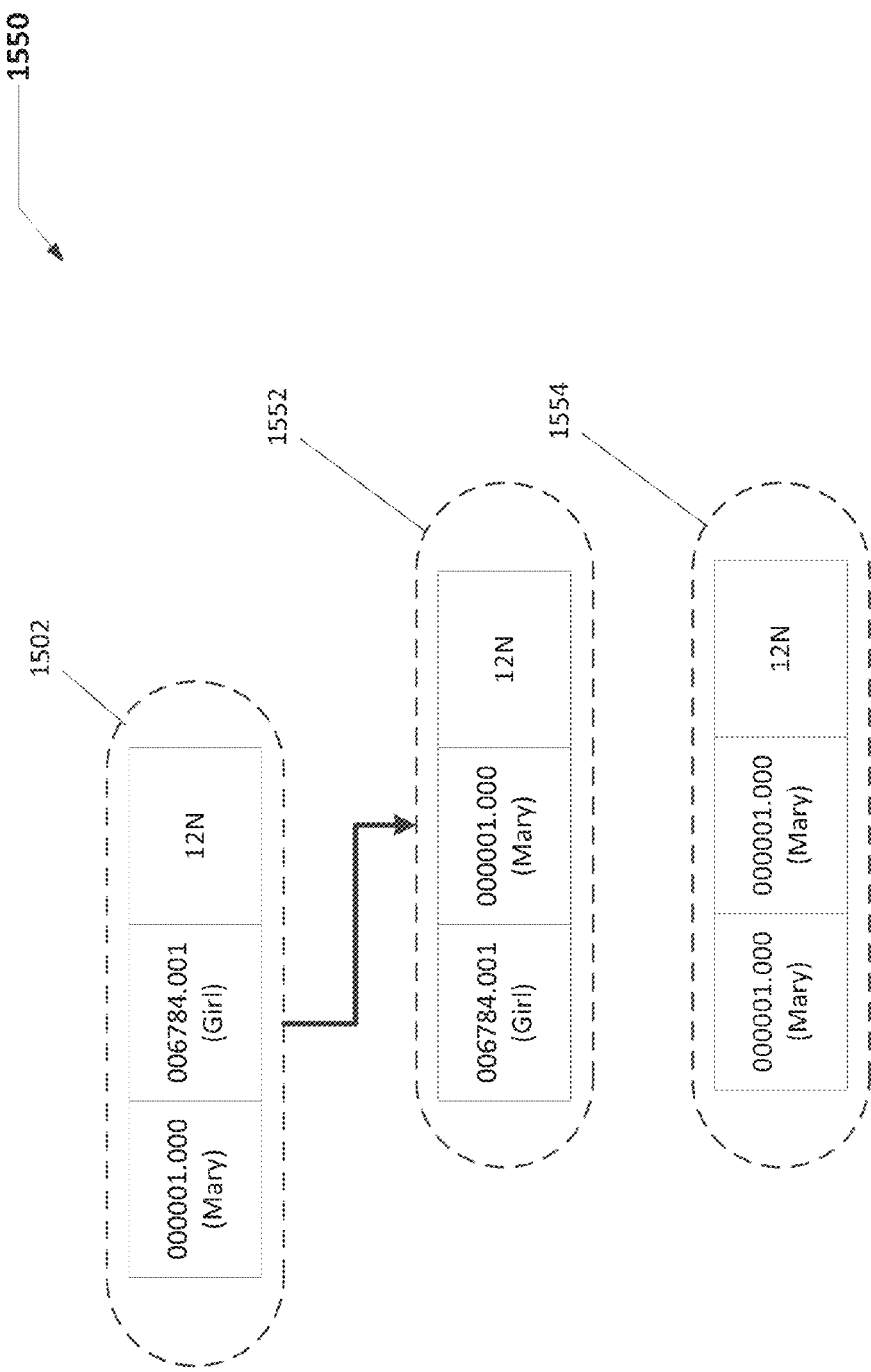
FIG. 15B is an illustration that shows a contradiction which is generated when an inference involves an incorrect statement or lie in accordance with the present invention as shown in FIG. 1.

In FIG. 15B, an exemplary illustration 1550 of a contradiction which is generated when an inference or conclusion uses an incorrect statement or a lie in accordance with the present invention as shown in FIG. 1 is depicted. The sentences in this example are: "Mary is a girl" and "a girl is Mary." Clearly, these two sentences are contrary to each other or one of these sentences is incorrect or a lie. According to the method describe in FIG. 15A, the first CNI (Mary) of the First CET 1502 replaces the second CNI (girl) if this second CNI is the first CNI on a Second CET 1552. As a result, the resulting Deduction CET 1554 is created which comprises the same CNI (Mary) in the first and second places within the CET. As a result, the Deduction CET 1554 has created or detected a contradiction, since no resulting CET should ever contain the same CNI in the first and second order.

Figure 15C:
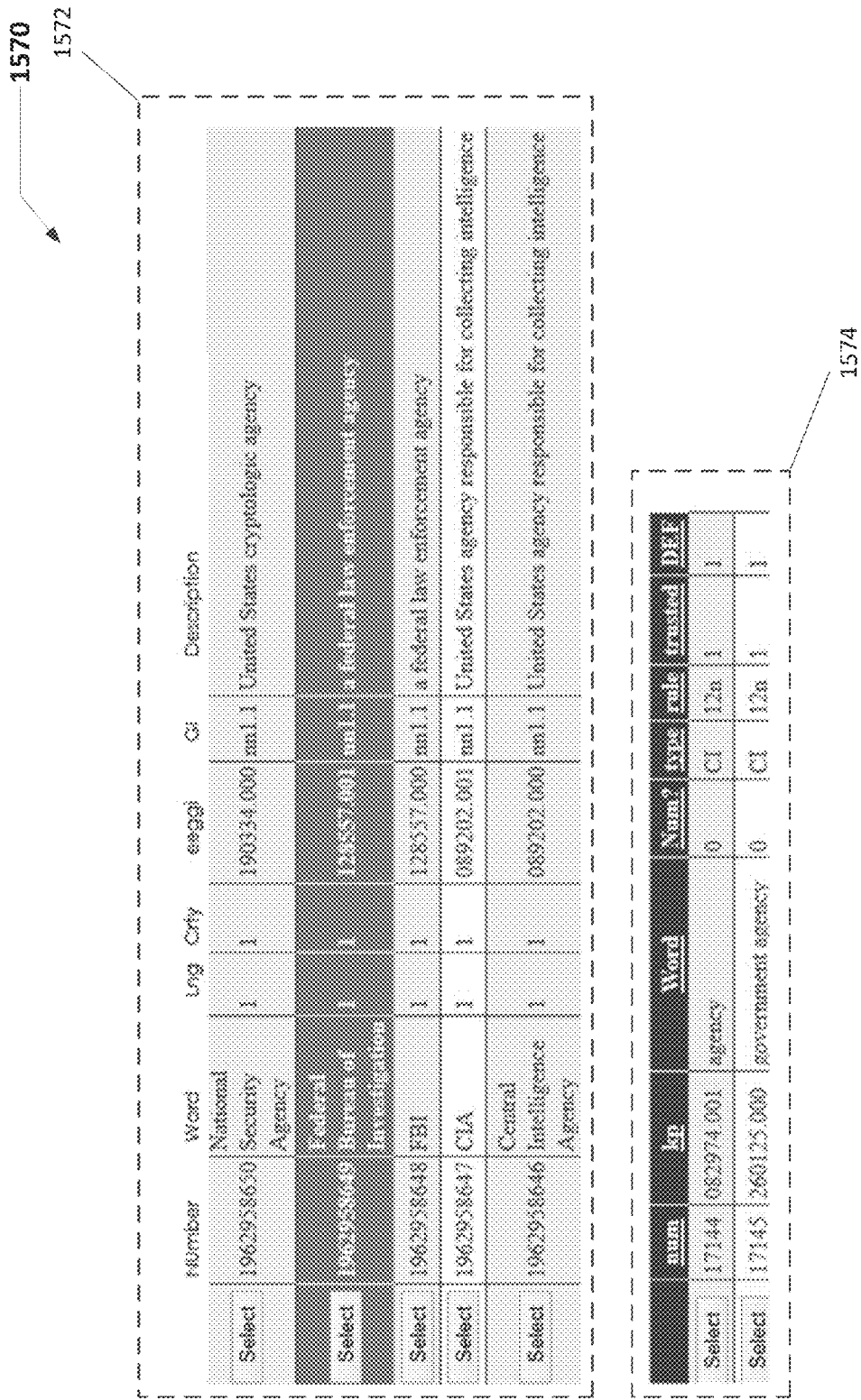
FIG. 15C depicts an illustration of a conclusion in accordant with the present invention as shown in FIG. 1.

Turning to FIG. 15C, an illustration 1570 of a conclusion in accordance with the present invention as shown in FIG. 1 is depicted. An exemplary Conceptual Index Dictionary GUI 1572 is shown for the word "Federal Bureau of Investigation" (FBI for short). The sub-Category GUI 1574 depicts the categories of 12N type that FBI (CNI 128557.001) has including the CNI 260125.000 (government agency) and the CNI 082974.001 (agency). Notably, as more sentences are processed, new 12N type CETs (category CETs) may be found which could add additional CNIs to be displayed by the Sub-category GUI 1574. For example, if the sentence "an agency is a thing" is processed later, then the CNI of "thing" would be displayed in the Sub-category GUI 1574.

Figure 15D:
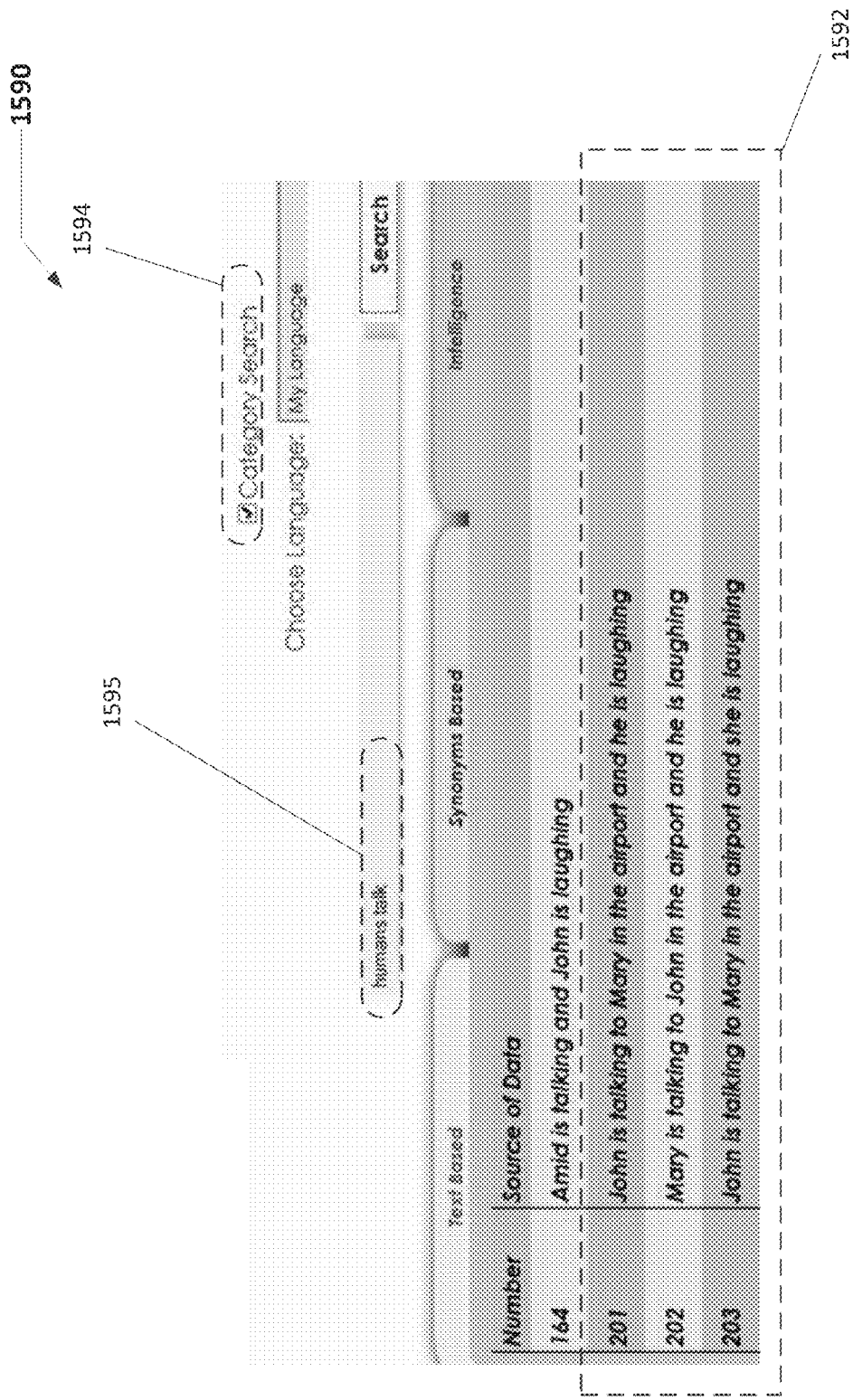
FIG. 15D is an illustration that depicts a category search 1595 in accordance with the present invention as shown in FIG. 1.

In FIG. 15D, an illustration 1590 of a category search 1595 in accordance with the present invention as shown in FIG. 1 is depicted. The Category Search is a search for "humans talk" 1595 and retrieves documents comprising "Mary talks" and "John talks" 1592 among other results. This is because Mary and John are humans. Essentially, the CNI of Mary and the CNI of human are ordered in a CET type 12N and the CNI of John and the CNI of human are ordered in another CET type 12N. Optionally, the Category Search Button 1594 enables the user to select the inclusion or exclusion of category-based results.

Figure 16A:
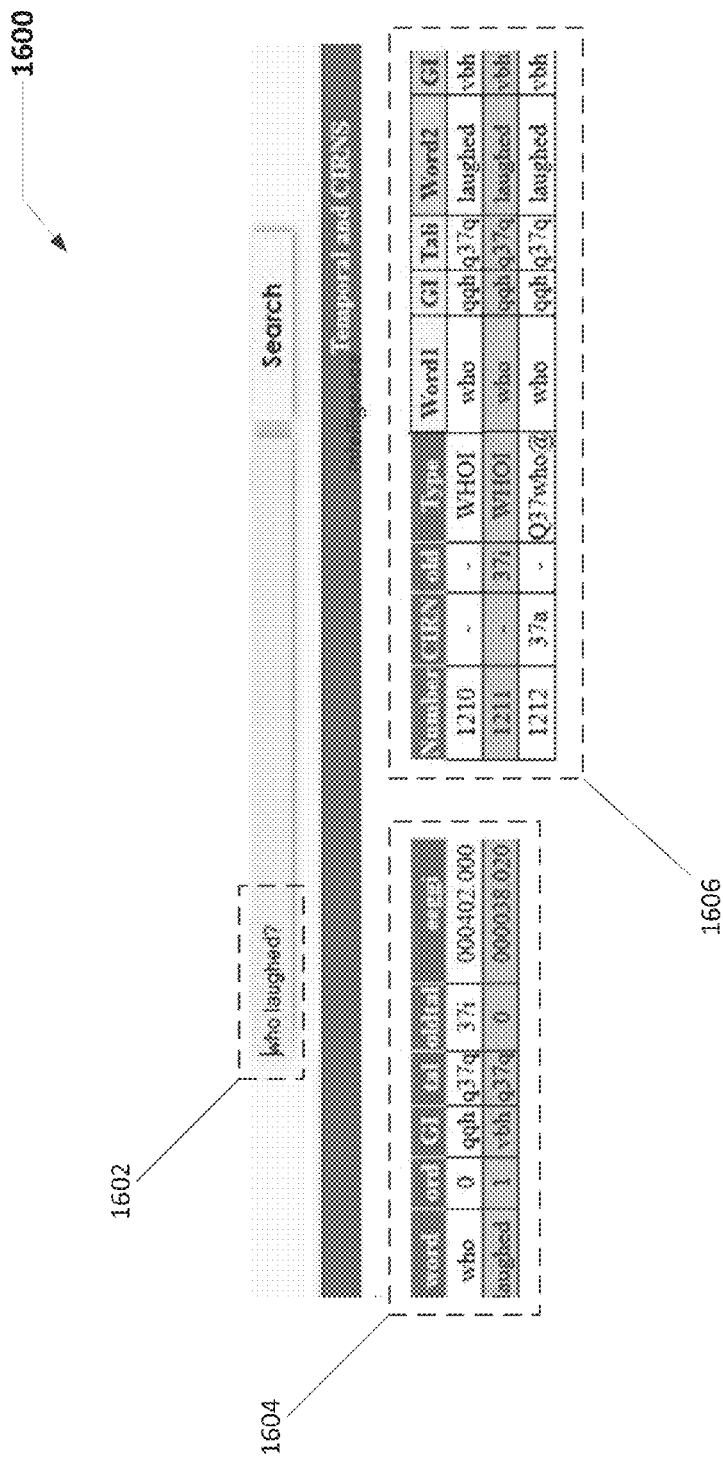
FIG. 16A is an illustration that depicts Question and Answering in accordance with the present invention as shown in FIG. 1.

Turing to FIG. 16A, an illustration 1600 of an example of Question and Answering in accordance with the present invention as shown in FIG. 1 is depicted. The Question 1602 or "who laughed" is looking for humans that have laughed or are laughing. The Question Table 1604 vertically depicts all the separated elements of the question including the CNIs, Grammatical identifiers (i.e. qqh and vbh) and other information derived by the CB-DCE system 100. The Question CETs Table 1606 contains all the CETs the question has created. The last row displays a CET type q37q that contains the variable who (CNI 000402.000), and the word laughed of CNI 000038.020 (a verb). Consequentially, any document that has a CET type 12a comprising a first CNI of a noun that has the category of human and has a second CNI 000038.020 (or other CNI greater or equal to 000038 or smaller and different of 000039.000) is a match and forms an answer.

Figure 16B:
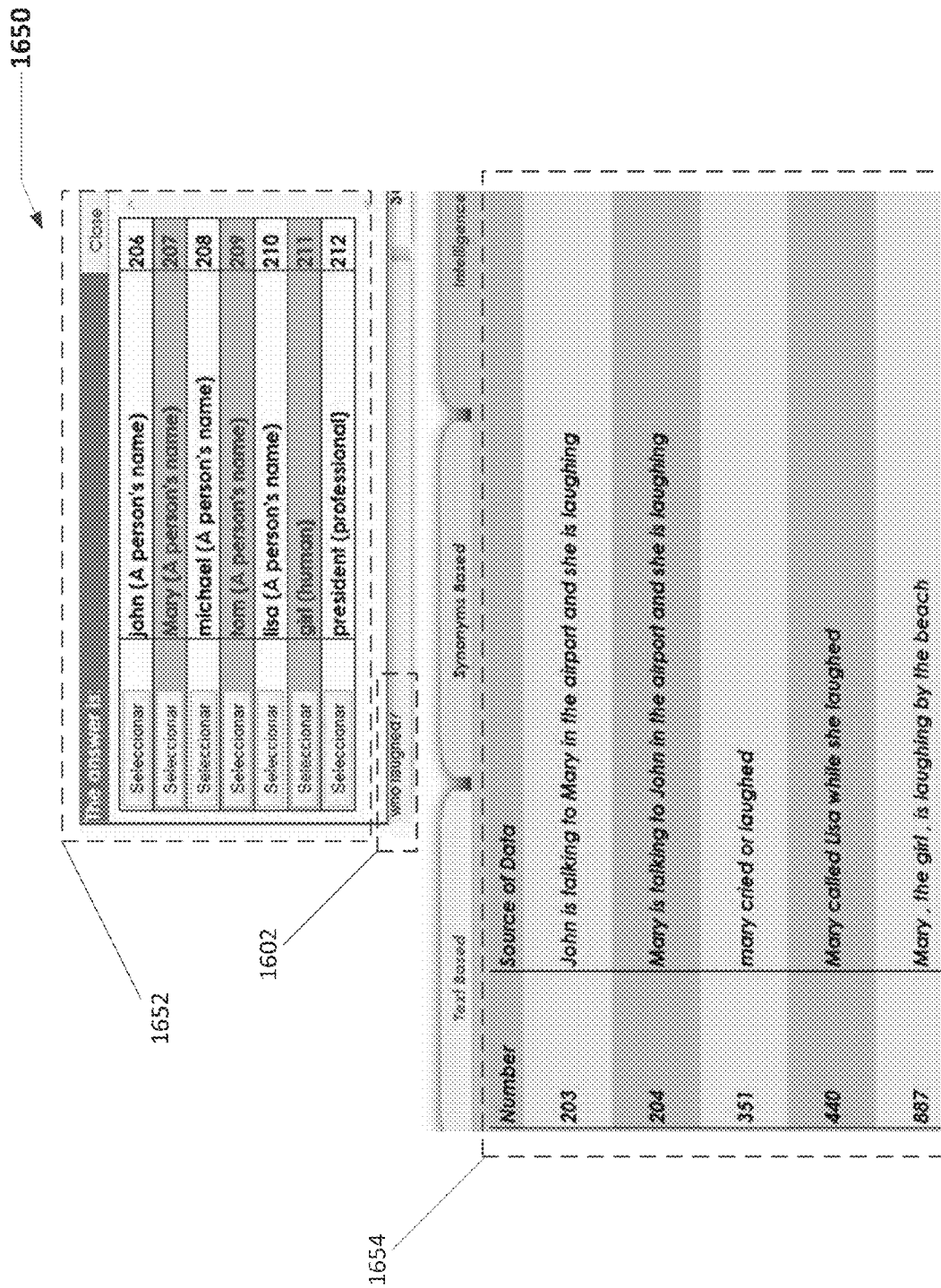
FIG. 16B is an illustration that depicts an exemplary answer the Question of FIG. 16A in accordance with the present invention as shown in FIG. 1.

In FIG. 16B, an illustration 1650 of an exemplary answer to the Question of FIG. 16A in accordance with the present invention as shown in FIG. 1 is depicted. To answer the Question 1602, the Several Answers GUI 1652 is displayed comprising several correct answers. For example, by selecting the second answer "Mary," the user may be presented with the Answers Support Display 1654. The Answers Supports Display 1654 displays all those documents supporting the answer wherein "Mary laughed." By selecting another answer, the corresponding documents associated with that answer will be displayed accordingly. In this fashion, the Exterior Input (391 FIG. 1) by the user results on a display containing documents or data that supports or confirms the answer in the Several Answers GUI 1652.

Figure 17A:
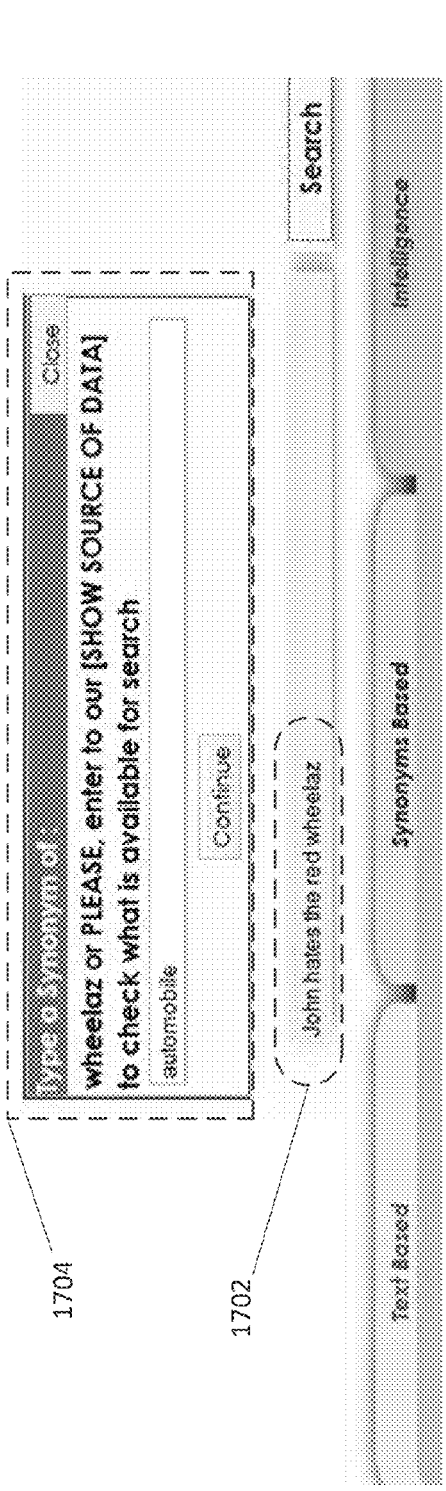
FIGS. 17A and 17B are illustrations that depict learning New Words through Synonyms in accordance with the present invention as shown in FIG. 1.
Figure 17B:
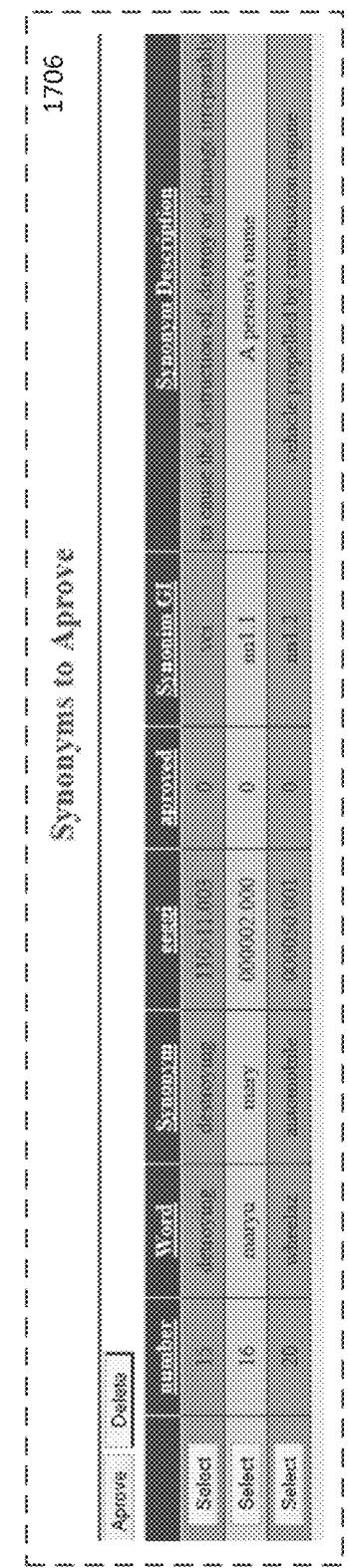

Turning to FIGS. 17A-B, exemplary illustrations of examples of learning New Words through Synonyms in accordance with the present invention as shown in FIG. 1 are depicted. The Query 1702 or "John hates the red wheelaz" contains an unknown new word "wheelaz" which is not present in the system's conceptual index dictionary (160, FIG. 1). As a result, the "Type a Synonym GUI" 1704 is presented to a user. The user is prompted to type a synonym of the unknown new word "wheelaz." In this example, the user responds by typing or entering the word "automobile." Accordingly, the CB-DCE system 100 then processes the Query 1702 using the CNI of automobile to find results and thus satisfy the user's query. Accordingly, the unknown new word "wheelaz" has being recorded in the Synonyms To Approve Table 1706 where it appears in the last row in association with the word and CNI of automobile. Simply by selecting and approving this record, the new word "wheelaz" is added by the system to the conceptual index dictionary (160, FIG. 1) including its new CNI which was generated by an Identifier Generator (393, FIG. 1) in accordance with the received user's input (397 FIG. 1). Notably, the new CNI which has a different range of decimals (a different CNI tail) of the CNI of automobile. In this fashion, the word wheelaz is now known for future usage.

Figure 18A:
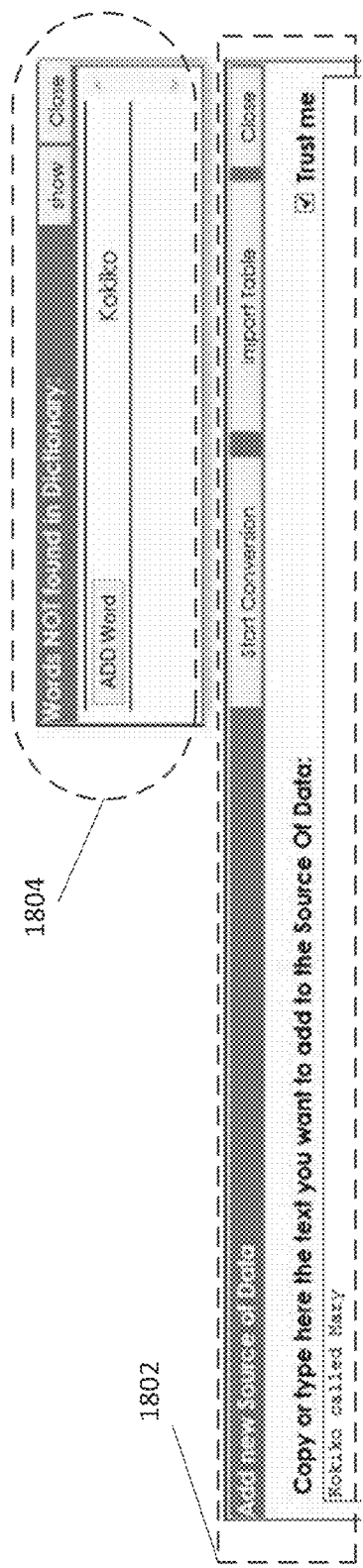
Figure 18B:
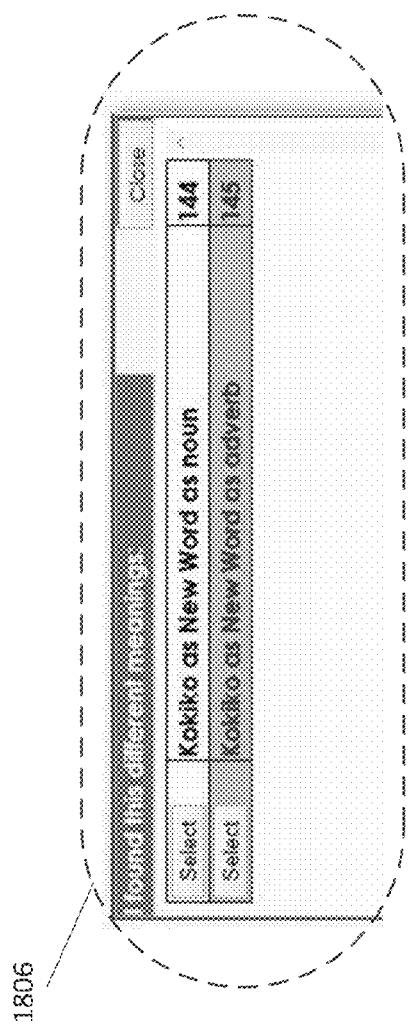

In FIGS. 18A and 18B, exemplary illustrations of learning and discovering New Words upon data entry in accordance with the present invention as shown in FIG. 1 are depicted. In FIG. 18A the Data Entry GUI 1802 contains a sentence that uses the new word "Kokiko" which is an unrecognized word (164 FIG. 1) when the system fails to find "Kokiko" in the current conceptual index dictionary (160 FIG. 1). As a result, the CB-DCE system 101 launches the Word Unknown GUI 1804. An optional procedure may be implemented in other example implementations of the invention for performing searches outside the system to find the meaning of "Kokiko." But in this example the CB-CDE system 100 attempts to discover the grammatical identification of "Kokiko" simply by assuming each known grammatical identification into "Kokiko" and then trying to process the sentence through the Pairing Module (240, FIG. 1) and the CET Logic Rules (220, FIG. 1) according to the present invention. For example, if "Kokiko" assumes the grammatical identification of a verb, the sentence "Kokiko called Mary" will not pass the CET Logic Rules (220, FIG. 1) or other procedures such as the Pairing Module (240, FIG. 1). Indeed, in English, no sentence can be assembled from a grammatical configuration such as "verb, verb and noun". In the next example, if "Kokiko" assumes the grammatical identification of adjective, the assumed sentence will not pass, for example, the CET Logic Rules or the Tallying Module (300, FIG. 1), simply because there is no proper sentence in the English language with a grammatical configuration of "adjective, verb, and noun".

However, if "Kokiko" is assumed to be a noun, then the Pairing Module (240, FIG. 1), CET Logic Rules (220, FIG. 1) and other procedures will "pass", meaning that "Kokiko" can indeed be the name (a noun) of something. Indeed, the English language supports the grammatical configuration "noun, verb and noun" with a transitive verb which the verb called is. In similar fashion, if "Kokiko" is assumed to be an adverb, the sentence will pass the CET Logic rules (220, FIG. 1) and others procedures, meaning that "Kokiko" may also be an adverb. In FIG. 18B, the Select Meaning GUI 1806 is shown that gives a user the option of selecting (397 FIG. 1) the correct grammatical identification for the word "Kokiko." In other implementations, the grammatical identification of a new word may be a preliminary process for searching the meaning or grammatical makeup of the new word outside the CB-DCE system 100 such as an Internet. Notably, this later implementation improves the changes of an automatic or semi-automatic system to find the correct meaning for kokiko (new words) in the event that kokiko (the new word) is itself a polysemous word (a word with several different grammatical identifications or meanings).

Turning to FIG. 18C, an exemplary illustration of an entry 1808 in the Conceptual Index Dictionary (160, FIG. 1) of the word "Kokiko" with the grammatical identification of a noun (nn1.1) is depicted. The new CNI 1810 or "999478.000" for the word "Kokiko" is depicted which was automatically generated after the user selected kokiko to be a noun which is one of the options that user was presented in FIG. 18B. Also, because "Kokiko" was processed in conjunction with other words and CET Logic rules (220, FIG. 1) of the English language, the language "Lang" column and country "Cntry"column show the characters 1, meaning that "Kokiko" belongs to an English and American Conceptual Index Dictionary.

Figure 19A:
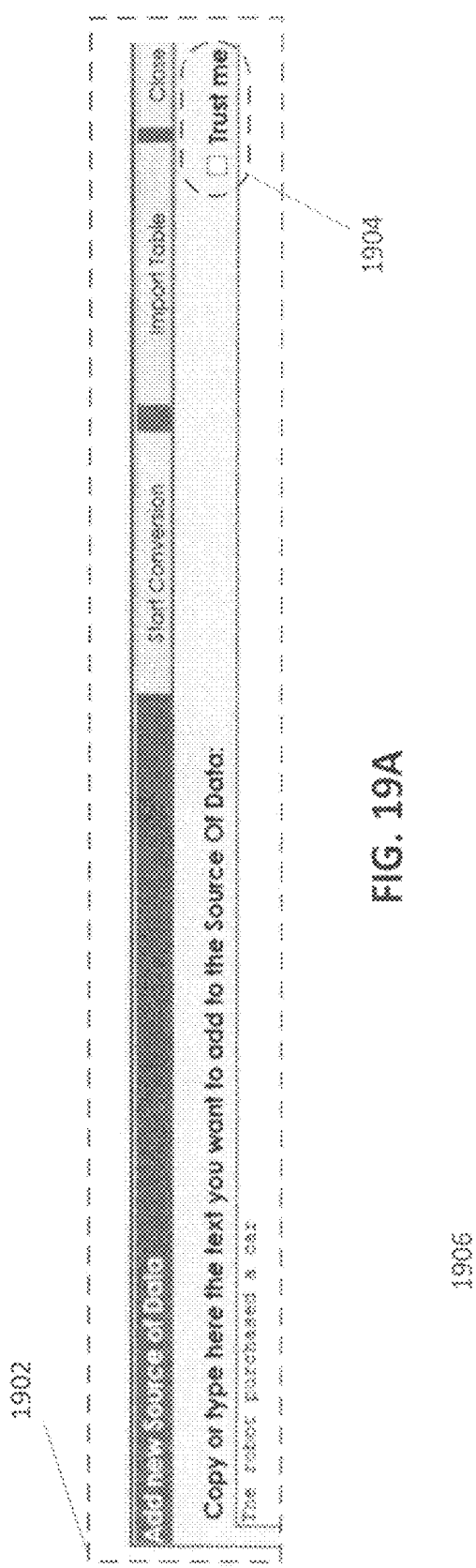
FIGS. 19A and 19B are illustrations that depicts a Data Entry GUI comprising the sentence "the robot purchased a car" and response in accordance with the present invention as shown in FIG. 1.
Figure 19B:
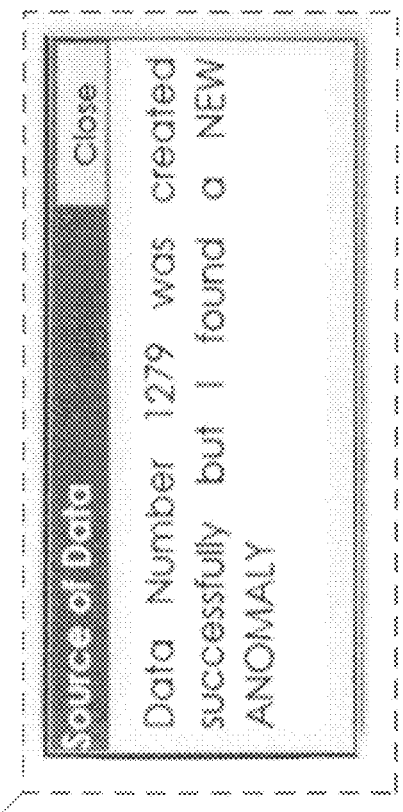
Figure 19C:
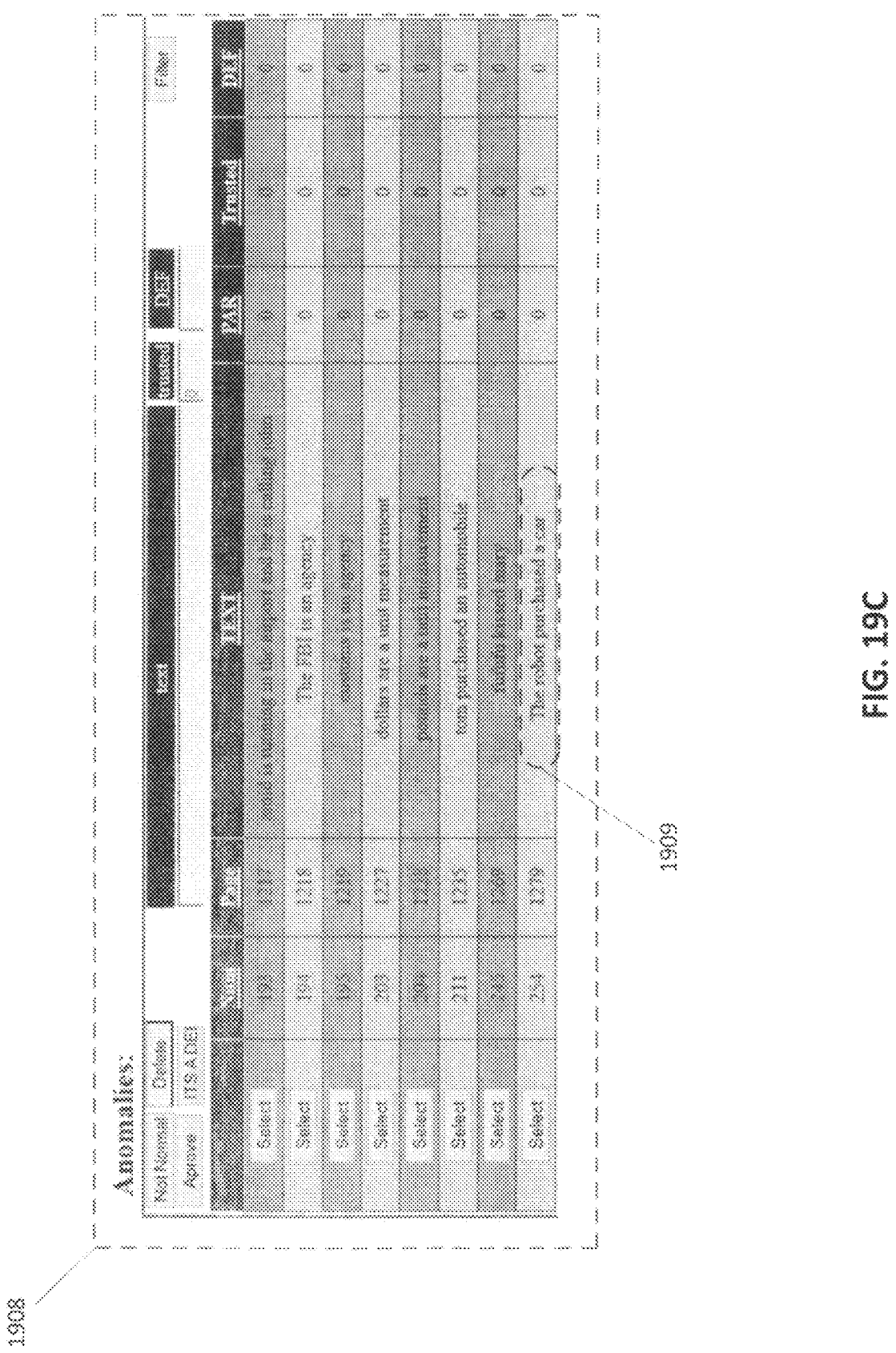
FIG. 19C is an illustration that depicts an Anomalies Table GUI comprising several anomalies that the CB-DCE system has identified overtime and is waiting for user to approve or disapprove is depicted in accordance with the present invention as shown in FIG. 1.

FIGS. 19A-19C depict examples of Anomalies and Self Learning. In FIGS. 19A and 19B, are illustrations of a Data Entry GUI 1902 comprising the sentence "the robot purchased a car" in and response 1906 in accordance with the present invention as shown in FIG. 1 is depicted. Because the Trust Check 1902 is off, when the document or sentence is processed, and the system creates all the corresponding CETs, the system will try to find if the recently created CETs already exist in the Tallied Indexed CETs Database (320, FIG. 1) from prior entries, deductions or other processes. If at least one of the CETs, like the CET that robot and purchase create, was not previously created, then this CET is new, and the Anomaly Alert 1906 may be displayed. Through the sentence "I found a new anomaly" the Anomaly Alert 1906 FIG. 19B alerts the user that not only was it able to process the sentence properly, but also that the sentence included information (CETs) that are new or had never being seen before in prior documents or conclusions.

Turning to FIG. 19C, an illustration of an Anomalies Table GUI 1908 comprising several anomalies that the CB-DCE system 100 has identified over time and that is waiting for an Exterior Input (393 FIG. 1) such as a user or an additional procedure to approve or disapprove is depicted. For example, the CB-DCE system 100 has never recorded that a "robot" can buy "cars" or machines, which is depicted in the latest Anomaly Sentence 1909. In this fashion, a user may quickly identify suspicious information like "the baby is in the backpack" which rises suspicion or requires immediate action or attention from an analyst or users. Notably, anomalies may be approved or disapproved by other procedures such as statistical analysis which could potentially be used to auto-approve information based on repetition.

Figure 20:
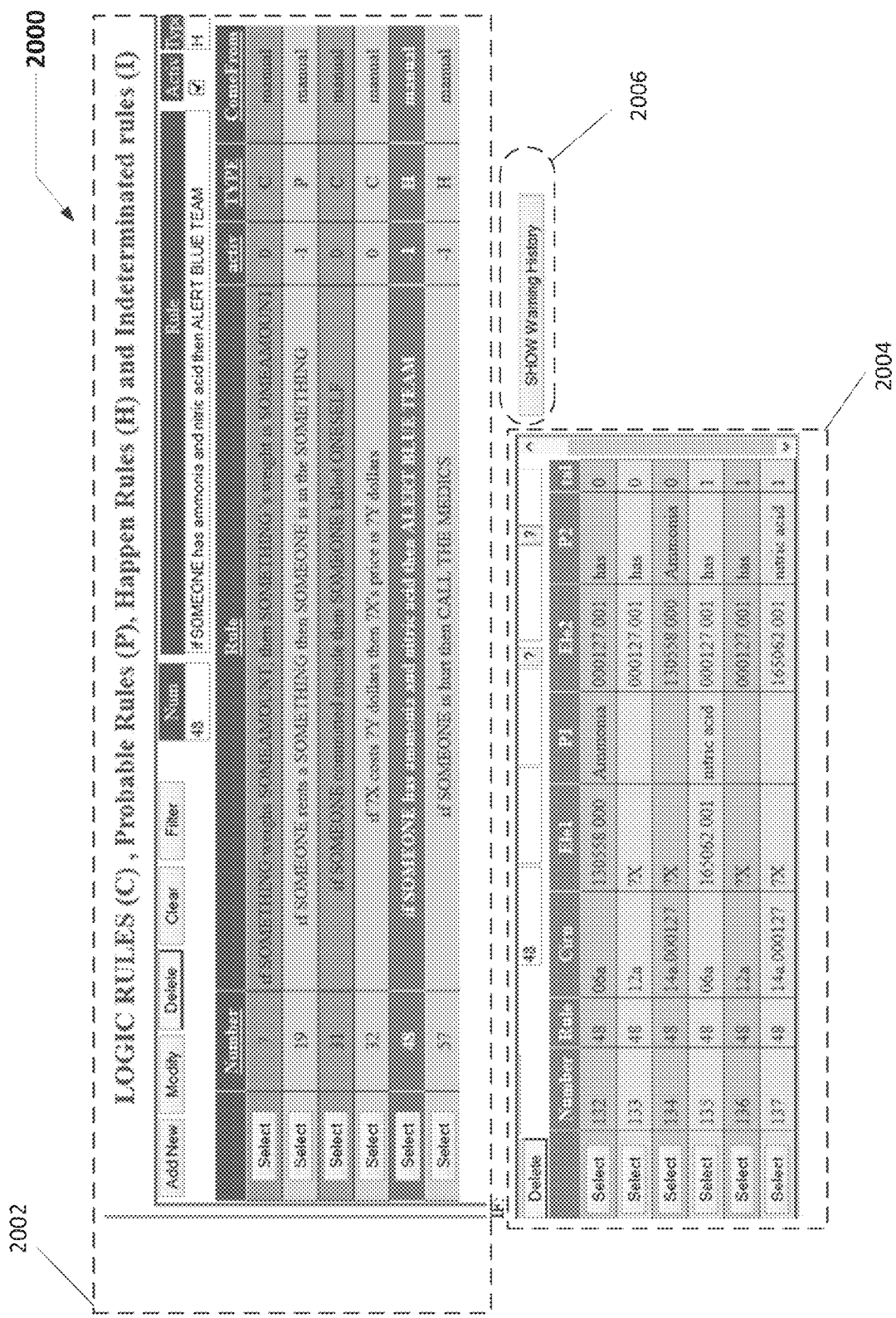
FIG. 20 is an illustration of the "If Happen Alarm Table" GUI, and the "Sub Alarm Table" in accordance with the present implementation of the invention of FIG. 1.

In FIG. 20, an illustration 2000 of the "If Happen Alarm Table" GUI 2002, and the "Sub Alarm Table" 2004 in accordance with the present implementation of the invention of FIG. 1 is depicted. The "If Happen Alarm Table" GUI 2002, and the "Sub Alarm Table" 2004 of another function of the CB-DCE system 100 herein introduced as "If Happen, Then Event." If Happen, Then Event" identifies specific events or occurrences and responds with specific protocols like alarms or warnings. For example, if an analyst or users wishes to be informed "if someone has ammonia and nitric acid," which are key chemicals to build a bomb, then through the "If Happen, Then Event" protocol, the analyst can request to receive, for example, an email, or produce an "Alert the Blue Team." Consequentially, the event may be triggered if the CB-DCE system 100 finds (in the past, present or future) the CETs that correspond to the possession of the chemicals mentioned in the Sub Alarm Table 2004. In this fashion, analysts and users can simply place a request, and when the request is found or fulfilled, the corresponding action, like an alarm, will be issued thus informing the analyst or user. The optional "Show Warning History" bottom 2006 may be displayed to allow users to view how many times a warning has been issued or ignored. Notably, other procedures may be implemented to make sure that alarms have not been ignored or deleted without management approval.

Figure 21:
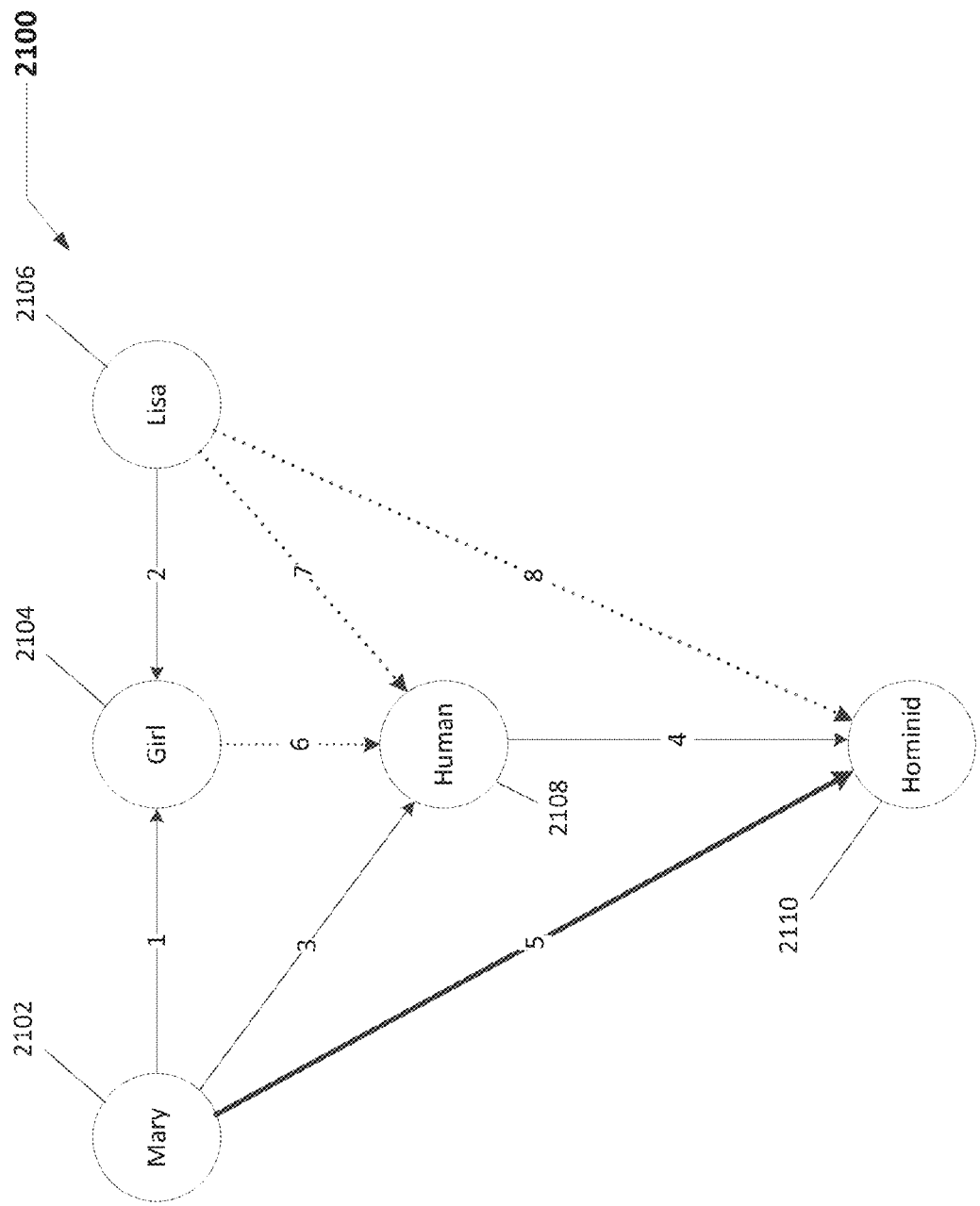
FIG. 21 is a diagram of a vector graph of four different sentences such as "Mary is a girl," "Lisa is a girl," "Mary is a human" and "Human is a Hominid" in accordance with the present implementation of the invention of FIG. 1

Turning to FIG. 21, a vector graph 2100 of four different sentences such as "Mary is a girl," Lisa is a girl," "Mary is a human" and "Human is a Hominid" in accordance with the present implementation of the invention of FIG. 1 is depicted. The CNIs of the associated words are depicted as nodes and the CETs that the nodes form are depicted as vectors between the nodes (arrows 1-8). Accordingly, the sentence "Mary is a girl," is depicted as the combination of the node Mary 2102, the node Girl 2104 and Vector 1 which also shows the order that the CNIs have within each CET. The sentence "Lisa is a girl" is represented by the node Lisa 2106, the node Girl 2104 and Vector 2 that also depicts the order that the CNIs follow within each CET. In similar fashion, the sentence "Mary is a human" is the depicted by the combination of the node Mary 2102, the node Human 2108 and Vector 3 that illustrates the order that the nodes or CNIs follow within the CET. The sentence "Human is a Hominid" is depicted by the combination of the node Human 2108, the node Hominid 2110 and its directional Vector 4. A deduction or conclusion of the previous four sentences is "Mary is a Hominid" which is depicted by the combination of the newly created Vector 5, the node Mary 2102 and the node Hominid 2110. In this fashion, resulting vectors, such as Vector 5, operate as conclusions of the vector system. However, if the Abduction Vector 6 is formed between the node Girl 2104 and the node Human 2108 which would spell "a girl is a human," none of the existing vectors (1-5 ) will be affected, their direction reversed or compromised. As a matter of fact, the new Vector 6 reinforces Vector 5 (the conclusion), incorporates the nodes Lisa 2106, node Girl 2104 and their Vector 2 (Lisa is a girl) while allowing additional vectors such as Vector 7 between Lisa 2106 and Human 2108 which spells "Lisa is a human" and Vector 8 between Lisa 2106 and Hominid 2110 which spells "Lisa is a hominid." As a result, the logical Abduction Vector 6, the resulting Vector 7, Vector 8 (and their corresponding sentences) can be used not only as proper assumptions but also as means to verify the truth of the original four sentences (nodes and vectors).

Figure 22:
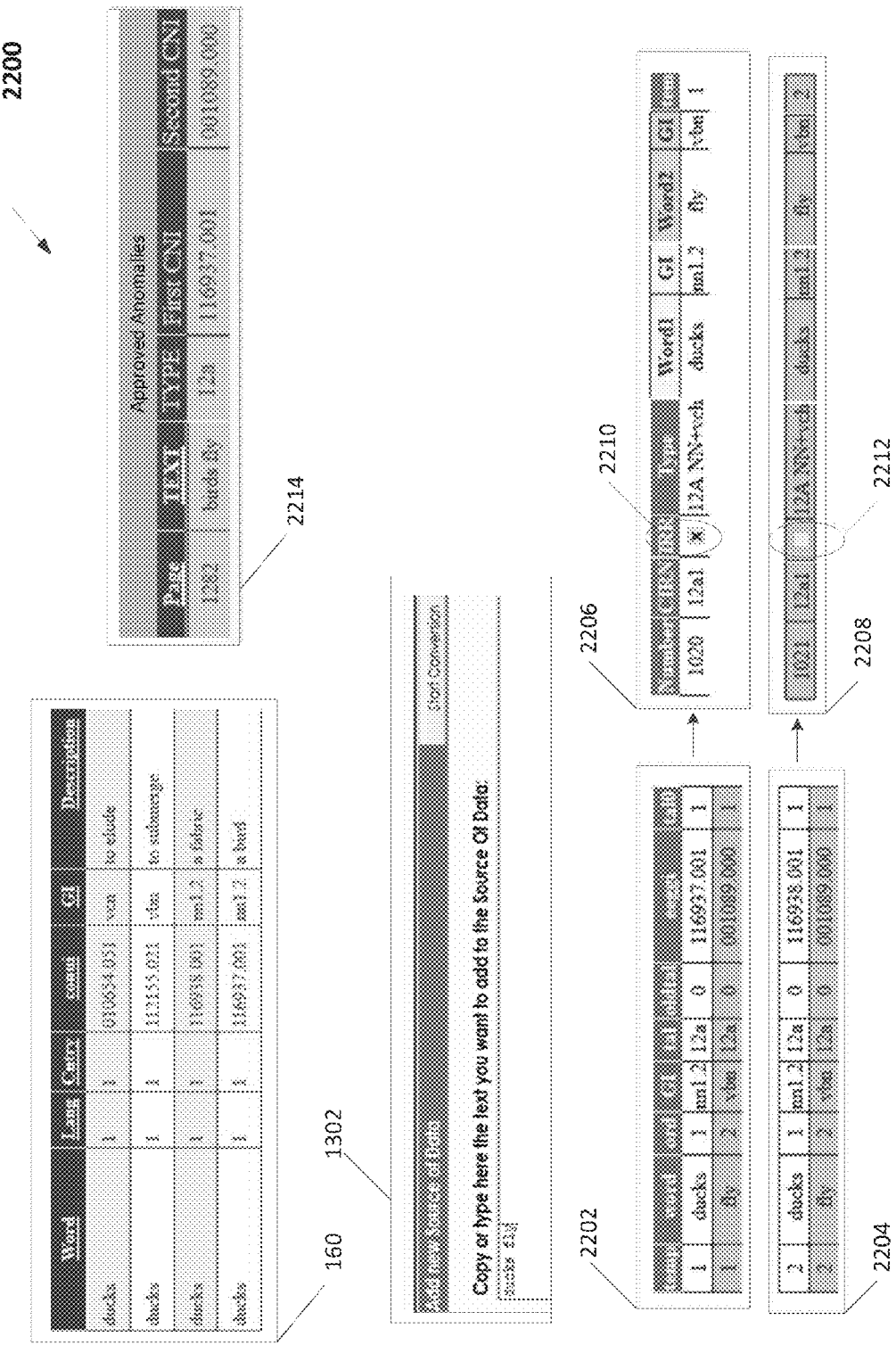
FIG. 22 is a diagram of multiple illustrations for disambiguating or selecting the meaning of words using anomalies is depicted in accordance with the present implementation of the invention of FIG. 1.

In FIG. 22, multiple illustrations 2200 for disambiguating or selecting the meaning of words using anomalies is depicted in accordance with the present implementation of the invention of FIG. 1 are depicted. The Conceptual Index Dictionary 160 contains several meanings for the word "ducks" including two verbs (to elude and submerge) and two nouns such as a fabric (CNI 116938.001) and a bird (CNI 116937.001). The record depicted in the Approved Anomalies GUI 2214 shows that the sentence "birds fly" and its corresponding CET were approved, meaning that if this CET (12*a;* 116937.001; 001089.000) is entered or processed in the future, this CET will no longer be considered anomalous or create an anomaly (it is now accepted knowledge or a normal CET). In the Add New Data GUI 1302 is the sentence "ducks fly." So when the sentence "ducks fly" is processed or entered, several permutations involving each of the different CNIs are created. Significantly, in this example, only two permutations such as the First Meaning Permutation (a bird) and the Second Meaning Permutation (a fabric) are shown. The other permutations where "ducks" are verbs are not included or displayed because they never passed the CET Logic rules (220, FIG. 1). The First Meaning Permutation 2202 involves the CNI 116937.001 (ducks as bird). The CET that the first permutation creates is displayed in its corresponding First CET Permutation 2206 that has its column IRR 2210 marked with "x." The reason why IRR 2210 is marked "x" is because a category search (like the search on FIG. 15D) of this CET comprising duck the bird and fly found a match in the CET comprising birds and fly in the Approved Anomalies 2214. On the other hand, the Second Meaning Permutation 2204 which involves the CNI 116938.001 (ducks as fabric), creates a different CET depicted in its corresponding Second CET Permutation 2208. As illustrated, this Second CET 2208 does not have its IRR column 2212 marked. The reason why the Second CET Permutation 2208 is not marked is because a category search of its CET (ducks the fabric and fly) did not find a previously approved CET. In other words, there are no approved CETs that show that fabric can fly. As a result, when the First CET Permutation 2206 competes for selection with the Second CET Permutation 2208, the First CET Permutation 2206 may be selected. In other words, the meaning for "ducks" equals "bird", wins over the meaning for "ducks" equaling "fabric" when their CNIs form CETs with the verb fly (CNI 001089.000). In this fashion, data that is already known wins over other data that creates anomalies (unknown data). This allows the system to disambiguate data automatically or semi-automatically (select the correct meanings or CNIs) by implementing previously approved or currently "normal" knowledge.

Turning to FIG. 23A, an illustration 2300 of an example of the CB-DCE system 100 solving a variation of the Einstein Puzzle (Zebra Puzzle) implementing permutations in accordance with the present implementation of the invention of FIG. 1 is depicted. The Exemplary Logic Puzzle 2300 has been simplified from its original version (The Einstein Puzzle) to ease the description of the CB-DCE system 100 solving the puzzle. In this simpler puzzle, there are three different colors of homes, three different individuals from different nationalities and three different animals in each house. The purpose of the puzzle is to answer in which house does the mouse lives? A number of clues are given to reason the location of the mouse.

Figure 23B:
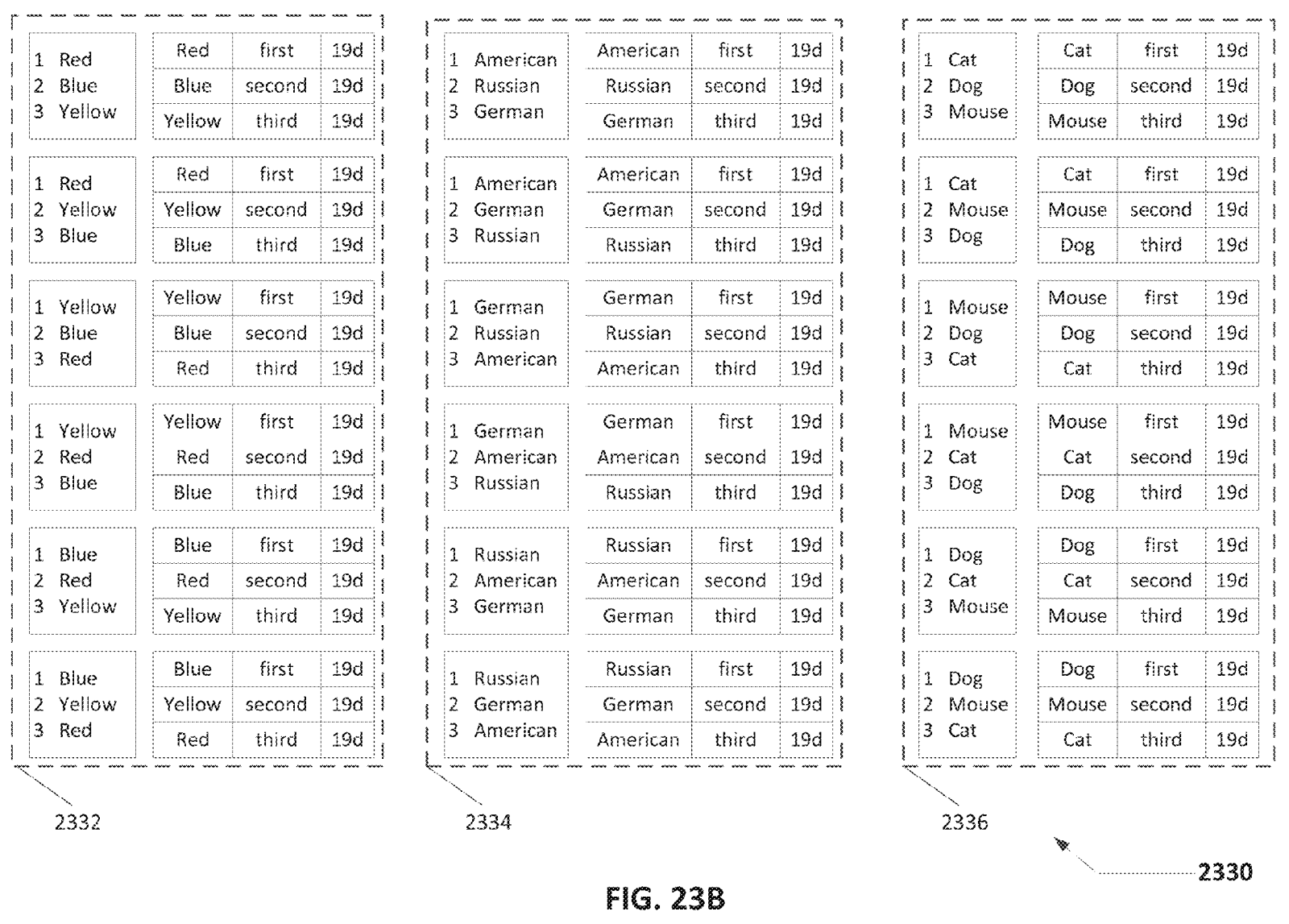

In FIG. 23B, an illustration 2330 of the permutations that the CB-DCE system 100 has created for each of the categories of the Puzzle in accordance with the present implementation of the invention of FIG. 1 is depicted. For example the color category 2332 forms six different permutations for three color homes (yellow, blue and red). The Nationalities Category 2334 also creates six different combinations or permutations for three nationalities (American, Russian and German). Finally, the Animal Category 2336 also contains six different permutations or combinations for three animals (mouse, cat and dog).

Figure 23C:
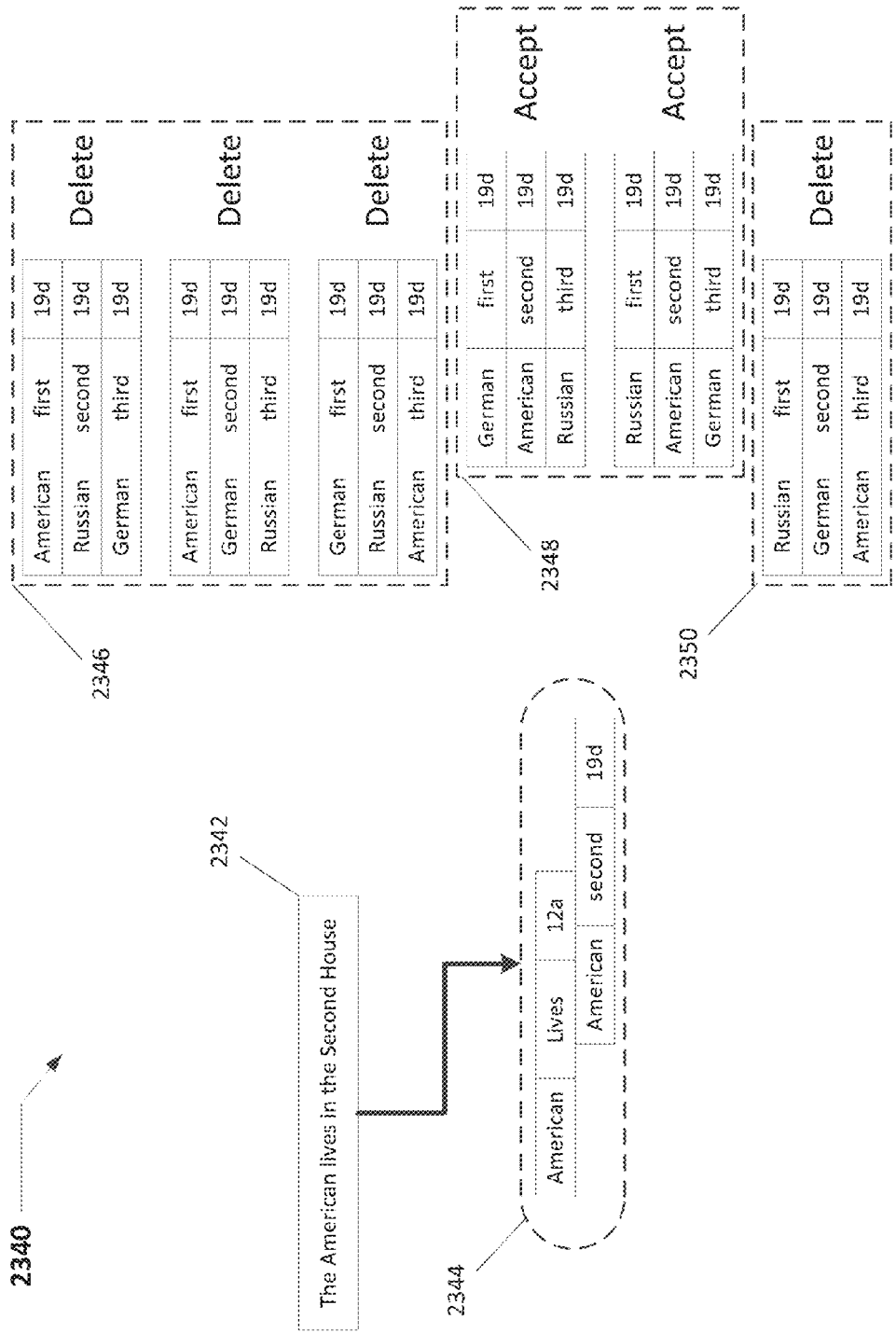
FIG. 23C is an illustration showing the conversion of the First Clue into its corresponding First CNI Group in accordance with the present implementation of the invention of FIG. 1.

Turning to FIG. 23C, an illustration 2340 of the First Clue 2342 and its corresponding First Clue CETs 2344 that the first clue generated in accordance with the present implementation of the invention of FIG. 1 is shown. As illustrated, the second CET in the First Clue CETs 2344 is a CET type 19*d* that comprises the word American (or its CNI) and the word Second (or its CNI). Because the first clue mentions that the American is in the Second House, then other permutations not comprising this CET (i.e. the American is in other houses) are removed from further analysis.

As a result, the first three permutations 2346 and the last permutation 2350 are removed. Consequentially, only the fourth and fifth permutations 2348 where the American and second are in a CETs type 19*d* remain in the system to continue the analysis.

Figure 23D:
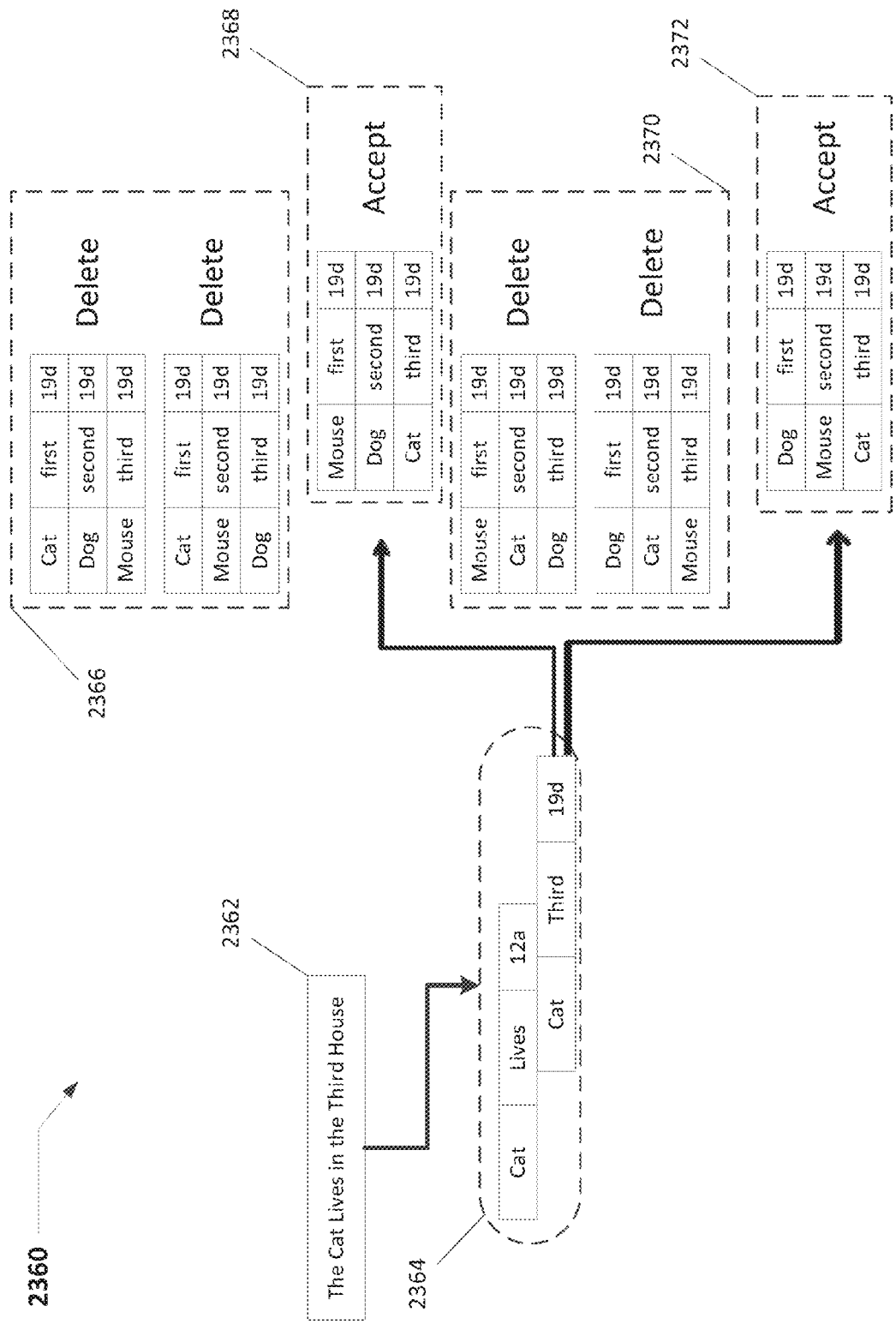
FIG. 23D is an illustration that shows the Second Clue of the puzzle converted into its corresponding Second CNI Group Clue in accordance with the present implementation of the invention of FIG. 1.

In FIG. 23D, an illustration 2360 of the Second Clue 2362 of the puzzle and its corresponding Second Clue CETs 2364 that the second clue generated in accordance with the present implementation of the invention of FIG. 1 is shown. As illustrated, the second CET in the Second Clue CETs 2364 is also another 19*d* type CET comprising the word Cat (or its CNI) and the word third (or its CNI). Because the clue says that the Cat is in the third house, then other permutation not comprising the same 19*d* CET of the clue are removed from further analysis. As a result, the first and second permutations 2366 and fourth and fifth permutations 2370 are removed. Consequentially, only the third permutation 2368 and sixth permutation 2372 remain in the system.

Figure 23E:
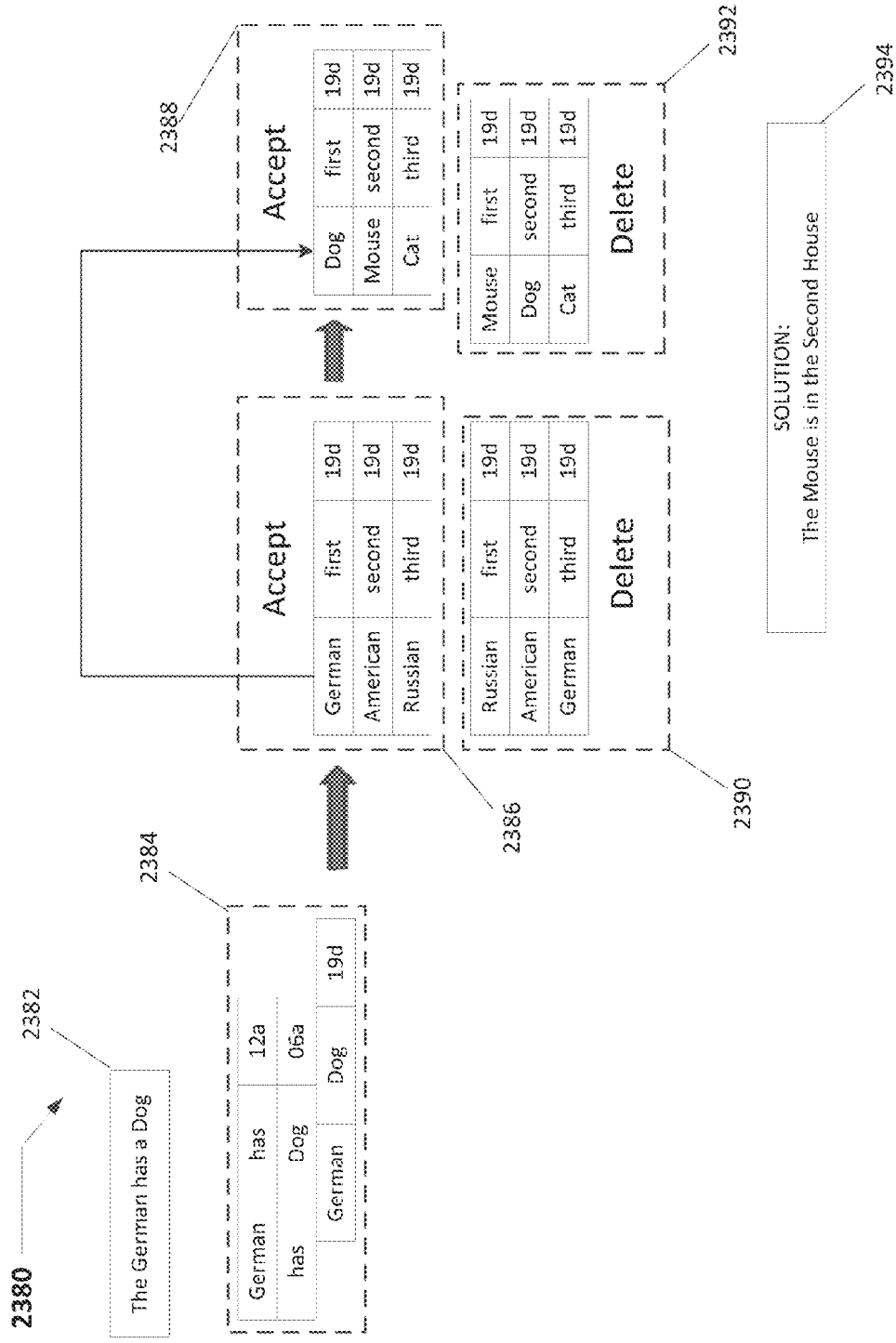
FIG. 23E is an illustration that displays the Third Clue of the puzzle converted into its corresponding Third CNI Group Clue in accordance with the present implementation of the invention of FIG. 1.

Turning to FIG. 23E, an illustration 2380 of the Third Clue 2382 of the puzzle and its corresponding Third CETs Clue 2384 in accordance with the present implementation of the invention of FIG. 1 is shown. As Illustrated, the third CET in the Third CETs Clue 2384 is also another 19*d* type group comprising the word German (or its CNI) and the word Dog (or its CNI). Because the clue says that the German and Dog share the same house, then all those permutations which do not allow a group or CET 19*d* to be formed between German and Dog (both have to be in the same house number), are removed from further analysis. As depicted, the First Remaining Nationality Permutation 2386 and the First Remaining Animal Permutation 2388 can have the German and the Dog in the same house or form a 19*d* type CET (in the first house). However, the Second Remaining Nationality Permutation 2390 has the German in the third house, and neither the First Remaining Animal Per-Mutation, nor the Second Remaining Animal Permutation has the Dog in the third house number. Therefore, the Second Remaining Nationality Permutation 2390 is also removed. Consequentially, the Second Remaining Animal Permutation has to be removed as well. As a result, only the First Remaining Nationality and the First Remaining Animal Permutation survive; meaning that the mouse must be in the second house as depicted in the Puzzle's Answer 2394.

Figure 24:
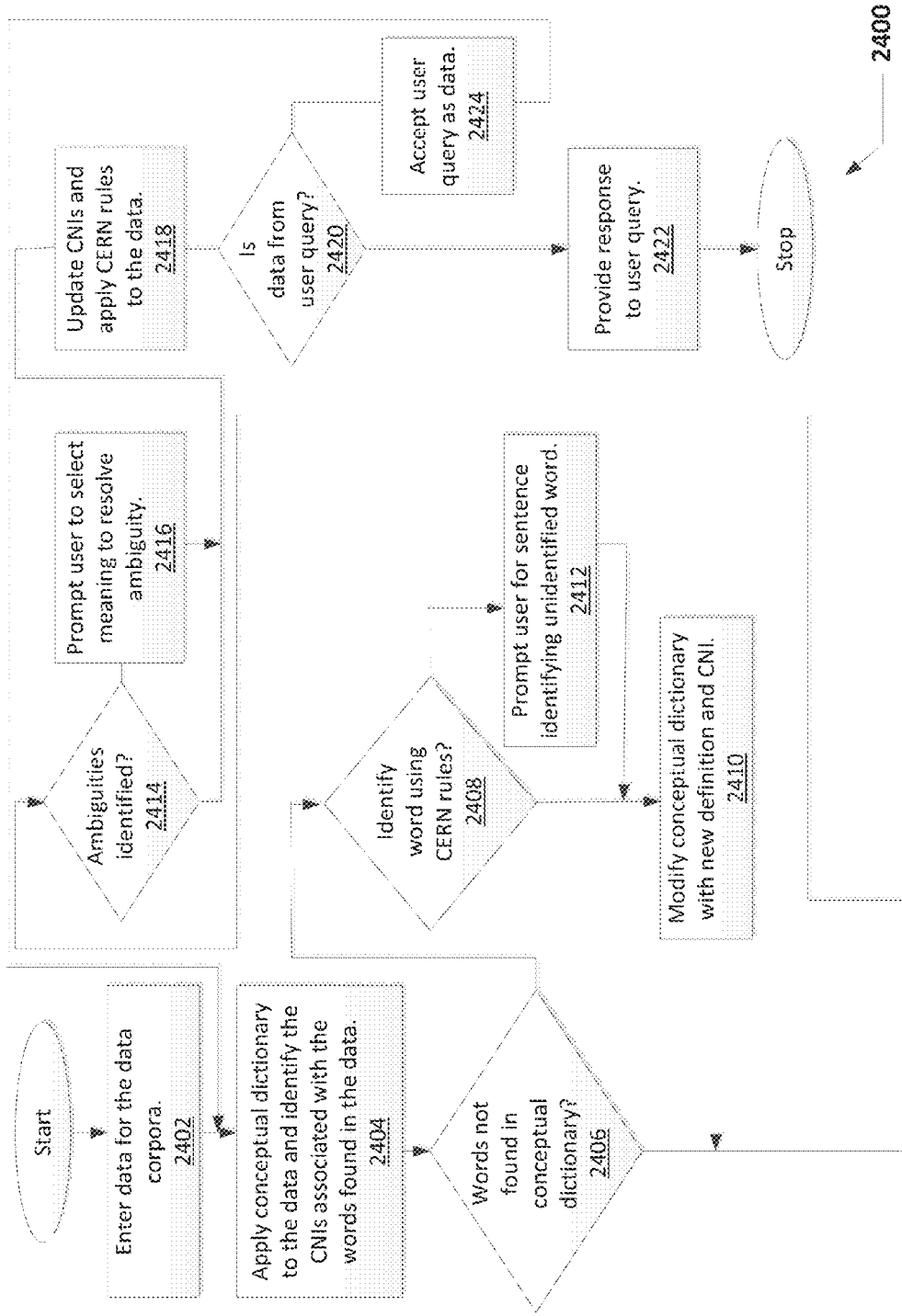
FIG. 24 is an illustration of a flow diagram of the operation of the CB-DCE system in accordance with the present implementation of the invention of FIG. 1.

In FIG. 24, an illustration 2400 of a flow diagram of the operation of the CB-DCE system 100 in accordance with the present implementation of the invention of FIG. 1 is depicted. Data is entered for the data corpora in step 2402. Data may be entered as text document or table data accessed by the CB-DCE system 100 and stored in the data corpora 110. The conceptualization module 150 applies the conceptual dictionary 160 to the data corpora 110 in step 2404. If words are not found in the conceptual dictionary 160 in step 2406, then CIRN rules may be applied to attempt to identify the word in step 2408. If identified in step 2408, it is added to the conceptual dictionary along with an associated CNI 2410, otherwise a user may be prompted by the CB-DCE system 100 to provide a definition or synonym for the word in step 2412. If an ambiguity is identified in step 2414, a user may be prompted to resolve the ambiguity in step 2416. The processing of the data then proceeds and the CNIs are updated in step 2418 in view of the input from the user in step 2416. If the data being processed is from a user query and the data corpora has been previously processed in step 2420, then the response to the user query is provided 2422. Otherwise in step 2420 the data corpora has been processed and the CB-DCE system 100 is ready for a user query that is entered in step 2224. The processing of the data corpora occurs as described in FIGS. 1-23. The flow diagram 24 is the general flow of the processing described in FIGS. 1-23.

Figure 25:
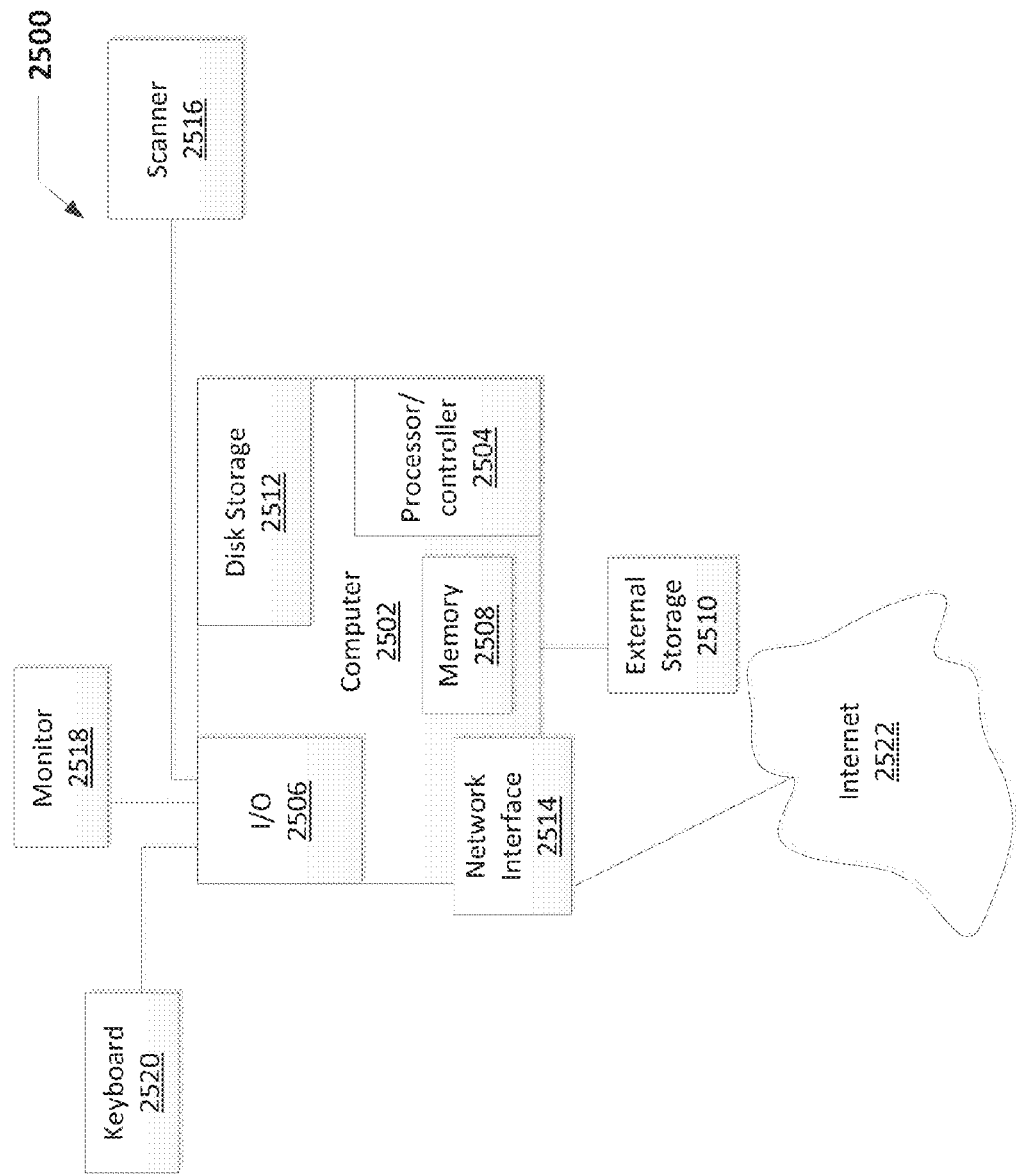
FIG. 25 is a diagram of a computer having a processor that executes a plurality of instructions for the CB-DCE system in accordance with the present implementation of the invention.

Turning to FIG. 25, a diagram 2500 of a computer 2502 having a processor 2504 that executes a plurality of instructions for the CB-DCE 100 system in accordance with the present implementation of the invention is illustrated. The computer 2502 may be a general purpose computer such as a laptop or desktop computer, minicomputer, mainframe, smart device such as cellular telephone or tablet to give but a few examples. It may have one or more processors or controller 2504 that may be a microprocessor, digital signal processor, embedded controller, reduced instruction set controller (RISC), microcontroller, digital state machine, analog circuits configured to function as a state machine, or a combination of digital circuits and analog circuits functioning as a state machine, to give but a few examples. The processor/controller 2504 may be in signal communication over one or more buses with memory input/output I/O interfaces 2506, memory 2508, external storage devices 2510, internal disk storage 2512, and a network interface 2514. The memory 2508 may be partitioned into data memory and program memory. The memory may be RAM, SDRAM, PROMs, EEPROMs, or other type of digital memory. The disk storage 2512 may be permanent or removable solid state or traditional hard disk drives, optical disks, removable disks, or SD type memory chips. The I/O 2506 may be a plurality of interfaces that include VGA, HDMI, audio, universal serial bus, SCSI, serial and/or parallel interface, to give but a few examples. The I/O 2506 may connect the computer 2502 with a keyboard 2520, monitor 2518, image scanner 2516, camera (not shown), etc. . . . The computer 2502 may also be connected to external storage 2510, such as the disk storage devices listed above, but connected external to the computer 2502. The external storage 2510 includes "cloud" connections across the internet to storage for the computer. A network interface 2514 may connect to one or more local or wide area networks including the internet.

The data corpora 110-130 may be stored in one or more databases or data stores on internal or external data storage 2516, 2510. In other implementations, the data corpora 110-130 may be stored remotely in a local network, wide area network, or even a distributed network. The modules of FIG. 1 may be stored in application memory located in memory 2508. Data corpora may also be entered or otherwise created by accessing content on the "World Wide Web" or scanning text data that is converted into digital text via object character recognition (OCR). Additionally, CET Logic 220 may also be stored in application memory 2514. In other implementations, the CET Logic 220 (rules) may be remotely stored and accessed. Such access of remote CET Logic 220 may be protected and require authentication and valid licenses.

The conceptual dictionary 160 may similarly be stored locally in internal or external disk storage 2516, 2510 or be located in a network, such as internet 2522. The conceptual dictionary 160 may require authentication and a valid license to be accessed. During execution of the instructions by processor/controller 2504 for the CB-DCE system 100, additional data structures or data stores may be created, modified, and/or removed. These additional data structures may reside in memory 2508, disk storage 2512, and/or external storage 2510.

It is appreciated by those skilled in the art that where the data files, databases, circuits, components, modules, and/or devices of, or associated with, the above-described CB-DCE is described as being in signal communication with each other, signal communication refers to any type of communication and/or connection between the data files, databases, circuits, components, modules, and/or devices that allows a circuit, component, module, and/or device to pass and/or receive signals and/or information from another circuit, component, module, and/or device. The communication and/or connection may be along any signal path between the data files, databases, circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

What is claimed is:

1. A method of extracting information from data corpora, the method comprising:
    identifying a data corpus accessible by a computer comprising grammatical sentences made up of a plurality of word elements;
    assigning conceptual numerical identifiers to the plurality of word elements by a processor, where the conceptual numerical identifiers each has a word portion and a meaning portion;
    grouping the conceptual numerical identifier based upon predetermined rules that group the conceptual numerical identifiers to form sets with conceptual sets logic, where the groupings of the conceptual numerical identifiers are stored in memory;
    applying additional rules to the groupings of the conceptual numerical identifiers by the processor that result in indexed groups of conceptual numerical identifier; and
    storing the indexed groupings of conceptual numerical identifier in a database, where the indexed groupings of conceptual numerical identifier may be queried with a grammatical sentence.

2. The method of claim 1, further includes accessing a conceptual dictionary to identify the conceptual numerical identifiers for word elements in the plurality of word elements.

3. The method of claim 1, where assigning conceptual numerical identifiers includes generating a user prompt to identify a meaning of an unidentified word element that is not in the conceptual dictionary.

4. The method of claim 1, where the predetermined rules include grammar rules.

5. The method of claim 4 further includes, inserting the unidentified word element into the conceptual database along with the conceptual numerical identifier associated with the word element in response to information entered in response to a user prompt.

6. The method of claim 1, where assigning conceptual numerical identifiers includes identifying ambiguity between word meanings and prompting a user to select a meaning in order for a selection to be made between conceptual numerical identifiers for word elements that have multiple definitions.

7. The method of claim 1, includes converting the grammatical sentence query into groups of conceptual numerical identifiers that are used to query the indexed groupings of conceptual numerical identifiers stored in the database.

8. The method of claim 7, further includes generating a result to the query, and
    converting the result back into a grammatically correct answer from the conceptual numerical identifiers.

9. A method of extracting information from data corpora, the method comprising:
    converting a query made up of a grammatical string into a plurality of word elements;
    assigning conceptual numerical identifiers to word elements in the plurality of word elements, such that the conceptual numerical identifiers identifies a specific word meaning to the word elements, where the conceptual numerical identifiers each has a word portion and a meaning portion;
    grouping the conceptual numerical identifiers based upon predetermined rules that group the conceptual numerical identifiers to form sets with conceptual sets logic, where the groupings of the conceptual numerical identifiers are stored in memory;
    applying additional rules to the groupings of the conceptual numerical identifiers by a processor that result in indexed grouping of numerical identifier; and
    accessing a database with the indexed groupings of numerical identifiers, where the database contains groupings of conceptual numerical identifiers associated with the data corpora in order to identify matches between a portion of the indexed groupings of numerical identifiers with the groupings of conceptual numerical identifiers associated with the data corpora.

10. The method of claim 9, where the predetermined rules include grammar rules.

11. The method of claim 9, further includes accessing a conceptual dictionary to identify the conceptual numerical identifiers for word elements in the plurality of word elements.

12. The method of claim 11, where grouping conceptual numerical identifiers includes generating a user prompt to identify a meaning of an unidentified word element that is not in the conceptual dictionary.

13. The method of claim 12 further includes, inserting the unidentified word element into the conceptual database along with the numerical identifier associated with the word element in response to information entered in response to the user prompt.

14. The method of claim 9, where assigning conceptual numerical identifiers includes identifying ambiguity between word meanings and prompting a user to select a meaning in order for a selection to be made between numerical identifiers for word elements that have multiple definitions.

15. The method of claim 1, further includes generating a result to the query, and
    converting the result back into a grammatical correct answer from the conceptual numerical identifiers.

16. A method of extracting information from data corpora, the method comprising:
    identifying a data corpus accessible by a computer comprising grammatical sentences made up of a plurality of word elements;

assigning conceptual numerical identifiers to the plurality of word elements by a processor, where the conceptual numerical identifiers each has a word portion and a meaning portion;

grouping the conceptual numerical identifiers into pairings of conceptual numerical identifiers based upon predetermined rules that group the conceptual numerical identifiers to form sets with conceptual sets logic, where the pairings are stored in memory;

applying additional rules to the pairings of the conceptual numerical identifiers by the processor that result in indexed pairs of conceptual numerical identifiers; and storing the indexed pairings of conceptual numerical identifiers in a database, where the indexed pairings of conceptual numerical identifier may be queried with a grammatical sentence.

17. The method of claim 16, further includes accessing a conceptual dictionary to identify the conceptual numerical identifiers for word elements in the plurality of word elements.

18. The method of claim 16, where assigning conceptual numerical identifiers includes generating a user prompt to identify a meaning of an unidentified word element that is not in the conceptual dictionary.

19. The method of claim 16, where the predetermined rules include grammar rules.

20. The method of claim 19 further includes, inserting the unidentified word element into the conceptual database along with the conceptual numerical identifiers associated with the word element in response to information entered in response to a user prompt.

21. The method of claim 16, where assigning conceptual numerical identifiers includes identifying ambiguity between word meanings and prompting a user to select a meaning in order for a selection to be made between conceptual numerical identifiers for word elements that have multiple definitions.

22. The method of claim 16, includes converting the grammatical sentence query into pairings of conceptual numerical identifiers that are used to query the indexed pairings of conceptual numerical identifiers stored in the database.

23. The method of claim 22, further includes generating a result of conceptual numerical identifiers to the query, and converting the result of conceptual numerical identifiers back into a grammatically correct answer.

24. A non-transitory machine-readable medium with machine readable instructions, that when executed result in a method of extracting information from data corpora, the instructions for the steps comprising:

identifying a data corpus accessible by a computer comprising grammatical sentences made up of a plurality of word elements;

assigning conceptual numerical identifiers to the plurality of word elements by a processor, where the conceptual numerical identifiers each has a word portion and a meaning portion;

grouping of the conceptual numerical identifiers based upon predetermined rules that group the conceptual numerical identifiers to form sets with conceptual sets logic, where the groupings of the conceptual numerical identifiers are stored in memory;

applying additional rules to the groupings the conceptual numerical identifiers by the processor that result in indexed groups of conceptual numerical identifiers; and storing the indexed groupings of conceptual numerical identifiers in a database, where the indexed groupings of conceptual numerical identifiers may be queried with a grammatical sentence.

25. The non-transitory machine-readable medium with machine readable instructions of claim 24, further includes instructions for accessing a conceptual dictionary to identify the conceptual numerical identifiers for word elements in the plurality of word elements.

26. The non-transitory machine-readable medium with machine readable instructions of claim 25, where assigning conceptual numerical identifiers includes generating a user prompt to identify a meaning of an unidentified word element that is not in the conceptual dictionary.

27. The non-transitory machine-readable medium with machine readable instructions of claim 24, where the predetermined rules include grammar rules.

28. The non-transitory machine-readable medium with machine readable instructions of claim 27 further includes instructions for inserting the unidentified word element into the conceptual dictionary along with the conceptual numerical identifier associated with the word element in response to information entered in response to a user prompt.

29. The non-transitory machine-readable medium with machine readable instructions of claim 24, where assigning conceptual numerical identifiers includes identifying ambiguity between word meanings and prompting a user to select a meaning in order for a selection to be made between conceptual numerical identifiers for word elements that have multiple definitions.

30. The non-transitory machine-readable medium with machine readable instructions of claim 25, includes instructions for converting the grammatical sentence query into groups of conceptual numerical identifiers that are used to query the indexed groupings of conceptual numerical identifiers stored in the database.

31. The non-transient machine readable media with machine readable instructions of claim 30, further includes:

instructions for generating a result to the query, and converting the result back into a grammatically correct answer from the conceptual numerical identifiers.

* * * * *